US012790503B2

(12) United States Patent
Monnard et al.

(10) Patent No.: US 12,790,503 B2
(45) Date of Patent: Nov. 10, 2026

(54) COATINGS COMPRISING SURFACE-REACTED CALCIUM CARBONATE AND AN OXYGEN SCAVENGER FOR IMPROVING FOOD SHELF LIFE

(71) Applicant: Omya International AG, Oftringen (CH)

(72) Inventors: Fabien Wilhelm Monnard, Aarburg (CH); Bettina Röcker, Bäch (CH); Stefanie Waller, Olten (CH); Jan Philipp Weihs, Düdingen (CH); Selcuk Yildirim, Wädenswil (CH); Rico Ménard, Jonschwil (CH)

(73) Assignee: Omya International AG, Oftringen (CH)

(*) Notice: Subject to any disclaimer, the term of this patent is extended or adjusted under 35 U.S.C. 154(b) by 536 days.

(21) Appl. No.: 18/262,514

(22) PCT Filed: Jan. 21, 2022

(86) PCT No.: PCT/EP2022/051345

§ 371 (c)(1),
(2) Date: Jul. 21, 2023

(87) PCT Pub. No.: WO2022/157309

PCT Pub. Date: Jul. 28, 2022

(65) Prior Publication Data

US 2024/0093043 A1 Mar. 21, 2024

(30) Foreign Application Priority Data

Jan. 25, 2021 (EP) .................................... 21153239
Feb. 15, 2021 (EP) .................................... 21157029

(51) Int. Cl.

| | |
|---|---|
| *C09D 7/48* | (2018.01) |
| *C08K 3/26* | (2006.01) |
| *C08K 5/13* | (2006.01) |
| *C08K 9/02* | (2006.01) |
| *C09D 7/62* | (2018.01) |
| *C09D 7/63* | (2018.01) |

(52) U.S. Cl.

CPC ................. *C09D 7/48* (2018.01); *C08K 5/13* (2013.01); *C08K 9/02* (2013.01); *C09D 7/62* (2018.01);

(Continued)

(58) Field of Classification Search

None

See application file for complete search history.

(56) References Cited

U.S. PATENT DOCUMENTS

2004/0020410 A1 2/2004 Gane et al.
2011/0077149 A1* 3/2011 Ichihara .............. B01J 20/0229 502/402

(Continued)

FOREIGN PATENT DOCUMENTS

EP 1550506 A1 7/2005
EP 2264108 A1 12/2010

(Continued)

OTHER PUBLICATIONS

International Search Report and Written Opinion issued in PCT/EP2022/051345 and mailed Apr. 7, 2022.

(Continued)

*Primary Examiner* — Jeffrey D Washville
(74) *Attorney, Agent, or Firm* — Heslin Rothenberg Farley & Mesiti P.C.

(57) ABSTRACT

The present invention relates to a kit for improving food shelf life comprising a sheet-like element component and an (Continued)

alkaline component. The sheet-like element component comprises a particulate filler comprising surface-reacted calcium carbonate, a binder and an oxygen scavenger. The oxygen scavenger is a compound comprising at least two phenolic hydroxyl groups, which can be deprotonated by the alkaline component, thus activating the oxygen scavenger. Further aspects of the present invention relate to an activated sheet-like element formed from the inventive kit, a process for the manufacture of a kit for improving shelf life, a process for the manufacture of a sheet-like element component, a process for activating the sheet-like element component, a supply device comprising the activated sheet-like element, a food packaging comprising the activated sheet-like element and the use of the kit or the activated sheet-like element in a food packaging and for prolonging food shelf life.

25 Claims, 2 Drawing Sheets

(52) U.S. Cl.
CPC .......... *C09D 7/63* (2018.01); *C08K 2003/265* (2013.01); *C08K 2201/006* (2013.01)

(56) References Cited

U.S. PATENT DOCUMENTS

| | | | | |
|---|---|---|---|---|
| 2018/0353930 A1* | 12/2018 | Rentsch | ............. B01J 20/28061 |
| 2018/0355183 A1* | 12/2018 | Rentsch | ................ C01F 11/185 |

FOREIGN PATENT DOCUMENTS

| | | | | |
|---|---|---|---|---|
| EP | 2264109 A1 | 12/2010 | |
| EP | 2305375 A1 | 4/2011 | |
| EP | 3192850 A1 | 7/2017 | |
| EP | 3366740 A1 | 8/2018 | |
| JP | H1015385 A | 1/1998 | |
| KR | 101935245 B1 | 1/2019 | |
| WO | WO-9927010 A1 * | 6/1999 | .............. C08K 7/26 |
| WO | 0039222 A1 | 7/2000 | |
| WO | 2004083316 A1 | 9/2004 | |
| WO | 2005121257 A2 | 12/2005 | |
| WO | 2009074492 A1 | 6/2009 | |
| WO | 2017121675 A1 | 7/2017 | |
| WO | 2016023937 A1 | 2/2018 | |

OTHER PUBLICATIONS

Cathy J. Ridgway et al., "On bulk density measurement and coating porosity calculation for coated paper samples," Nordic Pulp and Paper Research Journal, 2003, pp. 18, 24-31.

Patrick Gane et al., "Void Space Structure of Compressible Polymer Spheres and Consolidated Calcium Carbonate Paper-Coating Formulations", Industrial & Engineering Chemistry Research, 1996, vol. 35, No. 5, pp. 1753-1764.

Byung Joon Ahn et al., "Characterization and properties of LDPE film with gallic-acid-based oxygen scavenging system useful as a functional packaging material", Journal of Applied Polymer Science, Jul. 22, 2016, vol. 133, No. 43.

* cited by examiner

COATINGS COMPRISING SURFACE-REACTED CALCIUM CARBONATE AND AN OXYGEN SCAVENGER FOR IMPROVING FOOD SHELF LIFE

CROSS REFERENCE TO RELATED APPLICATIONS

This application is a U.S. National Phase filing under 35 U.S.C. § 371 of International Application No. PCT/EP2022/051345, filed Jan. 21, 2022, and published as WO 2022/157309 A1 on Jul. 28, 2022. PCT/EP2022/051345 claims priority from European patent application No. 21153239.5, filed Jan. 25, 2021 and European patent application No. 21157029.6, filed Feb. 15, 2021. The entire contents of each of these prior applications are hereby incorporated herein by reference.

The present invention relates to a kit for improving food shelf life comprising a sheet-like element component and an alkaline component, an activated sheet-like element formed therefrom, uses of the foregoing, a process for the manufacture of a kit for improving shelf life and a process for the manufacture of a sheet-like element component.

BACKGROUND

The presence of oxygen in food packaging can negatively affect the quality of a variety of oxygen sensitive foodstuffs. For example, the presence of oxygen in food packaging typically is associated with a loss of flavor in freshly roasted products such as coffee and nuts, as well as in spices and seasoned foods. Furthermore, oxygen causes degradation of vitamins, such as vitamin A, C and E, and of red colorants in berries, sauces and meat products. It also promotes growth of potentially harmful aerobic bacteria, promotes growth of mold in cheese, other dairy products and bakery products, accelerates browning of fruits and vegetables, and is responsible for the rancidification of fats and oils. In juices, like orange juice, oxygen contributes to vitamin C degradation. Thus, the presence of oxygen in food packaging is detrimental to edibility, the nutritional value, texture, aroma and color of foodstuffs, which decreases consumer acceptance and food shelf life. The food industry furthermore has to adapt to the consumers' demand for minimally processed foodstuffs, which contain few or no additives or preservatives, but at the same time maintain an acceptable or even increased shelf life. It represents an additional requirement that any provided technical solution for increasing the shelf life does not require complex packaging systems, i.e. the shelf life prolonging means should be simple to integrate into the packaging system.

Several approaches are known in the art for reducing the amount of oxygen present in a food packaging, for example vacuum packaging, modified atmosphere packaging (MAP), the use of oxygen-impermeable food packaging or the use of oxygen scavenging elements. In the case of MAP, a mixture of carbon dioxide and nitrogen (typically comprising from 30 to 50 vol.-% $CO_2$) is introduced into the food packaging. However, the residual oxygen concentration in the packaging atmosphere may remain as high as 5 vol.-% due to entrapped oxygen in the food matrix, oxygen permeation through the packaging material or insufficient sealing of the food packaging. The combined use of oxygen scavengers and MAP may provide for desirably low residual oxygen levels in the food packaging (preferably less than 0.5 vol.-% or even less than 0.1 vol.-%).

Oxygen scavenging elements are known in the prior art in the form of sachets, carriers, plastic films, labels or plastic trays. Sachets, however, may accidentally rupture, thus spoiling the foodstuff with the contained oxygen scavenger, or may be regarded as 'foreign body', which causes non-acceptance of the food packaging. Therefore, sachets are uncommon, for example, in European countries. Alternatively, oxygen scavengers can be integrated into the packaging material. However, conventional film processing techniques, such as casting, extruding or pressing, are typically performed at high temperatures, e.g., about 200° C. At these temperatures, the stability of oxygen scavengers may be negatively affected. Furthermore, the oxygen scavengers, which are integrated into the film may be less accessible for the contained oxygen, which may compromise its oxygen scavenging activity.

Carriers for oxygen scavengers are known in the art. For example, EP1550506 A1 discloses a carrier for an oxygen scavenger based on active carbon and calcium silicate. EP3192850 A1 and WO2017121675 A1 relate to calcium carbonate-based carriers for oxygen-scavenging compounds.

Most commonly, the oxygen scavenger is based on iron powder contained in sachets. However, a number of issues are associated therewith. Iron-containing sachets pose a health risk to consumers due to accidental ingestion, cannot be used for liquid products, may ignite upon heating in a microwave and are detected by metal detectors in packaging lines. Furthermore, the presence of water is required in order to activate the iron. Thus, the use of iron-containing oxygen scavengers is typically limited to food packagings whose atmosphere contains at least 65% relative humidity (rH). For lower humidity applications, hygroscopic sodium chloride has to be added, which, however, eventually dries out the food product, thus assisting in the deterioration of food quality.

As an alternative, palladium-based oxygen scavengers have been suggested, which are, however, expensive and are deactivated by sulfur components that are especially found in meat products. Furthermore, the maximally acceptable amount of $H_2$ within the packaging limits the label capacity of such type of scavengers. Sulfite-based oxygen scavengers may contribute to odor and to the deterioration of the aroma of the foodstuff, whereas aluminum-based oxygen scavengers can be easily deactivated. In addition, oxidizable polymers have been suggested as oxygen scavengers.

Furthermore, natural compounds, for example, polyphenols, plant extracts, tocopherol and ascorbic acid, have been suggested as oxygen scavengers for food packaging applications. For example, Ahn et al. (Journal of Applied Polymer Science 2016, 44138, doi: 10.1002/app.44138) describe an LDPE film co-extruded with an oxygen scavenging system consisting of gallic acid (2,3,4-trihydroxybenzoic acid) and potassium carbonate, which adsorbed oxygen from ambient air at 95% rH. Similarly, Pant et al. (Materials 2017, 10, 489, doi: 10.3390/mal 0050489) disclose thermoformed trays comprising a bio-based polyethylene layer comprising gallic acid and sodium carbonate, which adsorbed oxygen from an oxygen/nitrogen mixture (20/80 vol.-%) at 75% rH and above. Similarly, EP2305375 A1 relates to an oxygen absorbent film comprising a thermoplastic polymer, gallic acid, a transition metal compound and optionally an alkali carbonate. Application KR101935245 B1 relates to an oxygen scavenging film comprising polyethylene, a phenolic compound and a sodium salt. Document JPH1015385 A concerns an oxygen-absorbing resin comprising a polymer, gallic acid and sodium carbonate.

The polyphenol-based oxygen scavenging elements of the prior art are, however, limited to high humidity applications. Furthermore, the present inventors surprisingly found that polyphenol-based oxygen scavengers of the prior art are deactivated by the presence of carbon dioxide, which makes them unsuitable for MAP applications. However, MAP is a highly common technique, e.g., in meat packaging applications, where a low residual amount of oxygen is particularly desirable in order to reduce discoloration and microbial contamination of the foodstuff.

In view of the above, there is a need for food-safe oxygen scavengers, which overcome the above-mentioned drawbacks, and in particular are compatible with low humidity food packaging and MAP.

Accordingly, it is an objective of the present invention to provide a food-safe oxygen scavenger, which efficiently reduces the amount of oxygen in a food packaging, preferably also at low relative humidity and/or in the presence of carbon dioxide. The oxygen scavenger should be easy to handle and to incorporate in the food packaging.

These and other objectives can be solved by the inventive kit, the inventive activated sheet-like element, the inventive processes, the inventive supply device, the inventive food packaging and the inventive uses.

SUMMARY OF THE INVENTION

According to a first aspect of the present invention, a kit for improving food shelf life is provided. The kit comprises

- a) a sheet-like element component having
  - a1) a coating layer comprising
    - i) a particulate filler in an amount from 25 to 70 wt.-%, based on the total dry weight of the coating layer,
      wherein the particulate filler comprises a surface-reacted calcium carbonate in an amount of at least 50 wt.-%, based on the total amount of the particulate filler,
      wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and
      wherein the surface-reacted calcium carbonate has a specific surface area in the range from 20 to 200 $m^2/g$, as measured by the BET method,
    - ii) a polymeric binder in an amount from 5 to 25 wt.-%, based on the total dry weight of the coating layer, and
    - iii) at least one oxygen scavenger in an amount from 25 to 70 wt.-%, based on the total dry weight of the coating layer,
      wherein the at least one oxygen scavenger is a compound having at least one phenyl ring bearing at least two phenolic hydroxyl groups and at least one group R, wherein two of the at least two phenolic hydroxyl groups are arranged on the at least one phenyl ring in an ortho or para fashion relative to each other, and wherein R is selected from the group consisting of a hydrogen atom, a hydroxyl group, an alkoxy group, an aryloxy group, an amino group, an alkyl group, an aryl group and a —Y—$R^1$ group, preferably wherein R is a —Y—$R^1$ group, wherein
      —Y is selected from the group consisting of a direct bond, a linear or branched alkylene group having from 1 to 6 carbon atoms, and a —CH═CH— group, preferably Y is a direct bond, and
      —$R^1$ is an alkoxycarbonyl group, an aryloxycarboxyl group or an essentially fully deprotonated carboxyl group, and
  - a2) a substrate layer, and
- b) an alkaline component comprising a base having a $pK_b$ value of 6 or lower.

The inventors surprisingly found that the coating layer of the sheet-like element of the inventive kit provides a specific porous structure due to the interplay of the contained compounds. The surface-reacted calcium carbonate has a high BET surface area and a high porosity and inter alia is able to host the oxygen scavenger. The oxygen scavenger is a polyphenolic compound capable of reacting with oxygen, once activated. The amount of binder is selected in order to allow for sufficient adhesion and even distribution of the coating layer on the substrate layer, wherein the pores of the surface-reacted calcium carbonate remain accessible. The relative amounts of the particulate filler, the binder and the oxygen scavenger are selected such that the coating layer maintains a porous structure. Thus, the alkaline component, which is intended to be mixed with water to form an aqueous alkaline component, can be added to the sheet-like element and is deposited within the pores thereof, whereby the oxygen scavenger of the sheet-like element is activated due to at least partial deprotonation of the phenolic hydroxyl groups. Subsequently, the activated sheet-like element can be placed into a food packaging in order to scavenger oxygen. Therefore, the sheet-like element can be stored prior to its activation without requiring hermetical shielding from moisture and/or oxygen, further simplifying its use.

In addition, the coating layer is physically separated from the foodstuff and does not contaminate the foodstuff, as opposed to a powder of a porous carrier material loaded with the oxygen scavenger. Said loaded powders tend to be distributed throughout the entire food packaging. Since the oxygen scavenger does not have to be processed together with the polymer mixture in an extrusion step in order to incorporate it into the packaging, it is also avoided that the oxygen scavenger is processed under high temperatures and that a part of the oxygen scavenger remains inaccessible to oxygen.

Furthermore, the present inventors found that the ability of the coating layer to host high amounts of water from the aqueous alkaline component allows for an improved oxygen scavenging activity even at low humidity levels. In addition, it was surprisingly found that the activated sheet-like element essentially retains its oxygen scavenging activity in the presence of carbon dioxide, and can be used in combination with MAP.

A second aspect of the invention relates to an activated sheet-like element formed from the inventive kit by adding to the coating layer of the sheet-like element component the alkaline component, wherein the activated sheet-like element comprises reaction products of the at least one oxygen scavenger with the base, wherein preferably the alkaline component is added in an amount such the base is added in an amount of at least 0.01 molar equivalents, preferably at least 0.02 molar equivalents, more preferably at least 0.05 molar equivalents, even more preferably at least 0.1 molar equivalents, based on the molar amount of the oxygen scavenger, and/or the alkaline component is added in an amount from 10 to 70 wt.-%, preferably 20 to 65 wt.-% and more preferably from 35 to 60 wt.-%, based on the total weight of the coating layer.

As outlined above, the activated sheet-like element is able to efficiently scavenge oxygen also at low relative humidity and/or in the presence of carbon dioxide. Furthermore, the present inventors found that it is sufficient to add the base in relatively small, substoichiometric (i.e., catalytic) amounts, relative to the oxygen scavenger.

A third aspect of the present invention relates to a process for the manufacture of a kit for improving food shelf life. The process comprises the steps of:

a) providing a particulate filler comprising a surface-reacted calcium carbonate in an amount of at least 50 wt.-%, based on the total amount of the particulate filler,
   wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and
   wherein the surface-reacted calcium carbonate has a specific surface area in the range from 20 to 200 $m^2/g$, preferably 50 to 120 $m^2/g$, as measured by the BET method,
b) providing at least one oxygen scavenger being a compound having at least one phenyl ring bearing at least two phenolic hydroxyl groups and at least one group R, wherein two of the at least two phenolic hydroxyl groups are positioned on the at least one phenyl ring in an ortho or para fashion relative to each other, and wherein R is selected from the group consisting of a hydrogen atom, a hydroxyl group, an alkoxy group, an aryloxy group, an amino group, an alkyl group, an aryl group and a —Y—$R^1$ group, preferably wherein R is a —Y—$R^1$ group, wherein
   —Y is selected from the group consisting of a direct bond, a linear or branched alkylene group having from 1 to 6 carbon atoms, and a —CH═CH— group, preferably Y is a direct bond, and
   —$R^1$ is an alkoxycarbonyl group, an aryloxycarboxyl group or an essentially fully deprotonated carboxyl group,
c) providing a polymeric binder,
d) providing a substrate layer comprising one or more individual substrate layers or a food packaging comprising the substrate layer,
e) mixing, in the order set out herein, the oxygen scavenger of step b), the particulate filler of step a) and the polymeric binder of step c) to obtain a coating composition,
f) applying the coating composition of step e) onto the substrate layer of step d) to obtain a sheet-like element precursor,
g) drying the sheet-like element precursor obtained in step f) to obtain a sheet-like element component,
h) providing an alkaline component comprising a base having a $pK_b$ value of 6 or lower, and optionally
i) mixing the alkaline component of step h) with water to obtain an aqueous alkaline component comprising the base and water, wherein preferably
   the pH of the aqueous alkaline component is at least 8, more preferably at least 10, even more preferably at least 11, and most preferably at least 12 and/or
   the aqueous alkaline component comprises the base in an amount from 1 wt.-% to 75 wt.-%, more preferably 5 wt.-% to 60 wt.-%, and most preferably 10 to 35 wt.-%, based on the total weight of the aqueous alkaline component.

In a fourth aspect of the present invention, a process for the manufacture of a sheet-like element component is provided. The process comprises the steps of:

a) providing a particulate filler comprising a surface-reacted calcium carbonate in an amount of at least 50 wt.-%, based on the total amount of the particulate filler,
   wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and
   wherein the surface-reacted calcium carbonate has a specific surface area in the range from 20 to 200 $m^2/g$, preferably 50 to 120 $m^2/g$, as measured by the BET method,
b) providing at least one oxygen scavenger being a compound having at least one phenyl ring bearing at least two phenolic hydroxyl groups and at least one group R, wherein two of the at least two phenolic hydroxyl groups are positioned on the at least one phenyl ring in an ortho or para fashion relative to each other, and wherein R is a —Y—$R^1$ group, wherein
   —Y is selected from the group consisting of a direct bond, a linear or branched alkylene group having from 1 to 6 carbon atoms, and a —CH═CH— group, preferably Y is a direct bond, and
   —$R^1$ is an essentially fully deprotonated carboxyl group
c) providing a polymeric binder,
d) providing a substrate layer comprising one or more individual substrate layers or a food packaging comprising the substrate layer,
e) mixing, in the order set out herein, the oxygen scavenger of step b), the particulate filler of step a), and the polymeric binder of step c) to obtain a coating composition,
f) applying the coating composition of step e) onto the substrate layer of step d) to obtain a sheet-like element precursor, and
g) drying the sheet-like element precursor obtained in step f) to obtain a sheet-like element component, wherein step b) of providing the at least one oxygen scavenger comprises the sub-steps of
b1) providing at least one oxygen scavenger precursor being a compound having at least one phenyl ring bearing at least two phenolic hydroxyl groups and at least one group R, wherein two of the at least two phenolic hydroxyl groups are positioned on the at least one phenyl ring in an ortho or para fashion relative to each other, and wherein R is a —Y—$R^1$ group, wherein Y is selected from the group consisting of a direct bond, a linear or branched alkylene group having from 1 to 6 carbon atoms, and a —CH═CH— group, preferably Y is a direct bond, and
   R1 is a carboxyl group,
b2) providing a basic compound, and
b3) reacting the carboxyl group of the oxygen scavenger precursor of step b1) with the basic compound of step b2) to obtain the oxygen scavenger.

The present inventors found that a compound having at least one phenyl ring bearing at least two phenolic hydroxyl groups and at least one group R can be used as the oxygen scavenger of the present invention. However, it was surprisingly found that, if such compound comprises a carboxyl group (—COOH), as is frequently the case for naturally occurring polyphenols, the carboxyl group reacts with the surface-reacted calcium carbonate of the particulate filler, thereby destroying its pores and diminishing the oxygen scavenging activity of the so-obtained activated sheet-like element. The inventors surprisingly found that this can be avoided if such carboxyl group is transformed into an essentially fully deprotonated carboxyl group by reaction with a basic compound prior to being incorporated in the inventive sheet-like element component.

A fifth aspect of the present invention relates to a process for activating the inventive sheet-like element component of the inventive kit. The process comprises the steps of j) mixing the alkaline component with water to obtain an aqueous alkaline component comprising the base and water, and k) applying the aqueous alkaline component onto at least a part of the surface of the coating layer, wherein preferably the alkaline component is added or applied in an amount such that the base is added in an amount of at least 0.01 molar equivalents, preferably at least 0.02 molar equivalents, more preferably at least 0.05 molar equivalents, even more preferably at least 0.1 molar equivalents, based on the molar amount of the oxygen scavenger, and/or the alkaline component is added in an amount from 10 to 70 wt.-%, preferably 20 to 65 wt.-% and more preferably from 35 to 60 wt.-%, based on the total weight of the coating layer, and/or application step k) is performed by inkjet printing, spraying, coating, and/or dripping.

In a sixth aspect of the present invention, a supply device comprising the activated sheet-like element is provided, wherein the supply device protects the activated sheet-like element from oxygen and preferably comprises a roll, a stack, a magazine, or a packaging, such as a box.

The inventive sheet-like element can be provided in a pre-activated form, wherein it is protected by the inventive supply device from oxygen.

A seventh aspect of the present invention relates to a food packaging comprising the inventive activated sheet-like element, wherein the coating layer is present within the food packaging.

An eighth aspect of the present invention relates to the use of the inventive kit and/or the inventive activated sheet-like element in a food packaging.

A ninth aspect of the present invention relates to the use of the inventive kit and/or the inventive activated sheet-like element for prolonging food shelf life.

Advantageous embodiments of the present invention are defined in the corresponding dependent claims.

DETAILED DESCRIPTION

Figure 1:
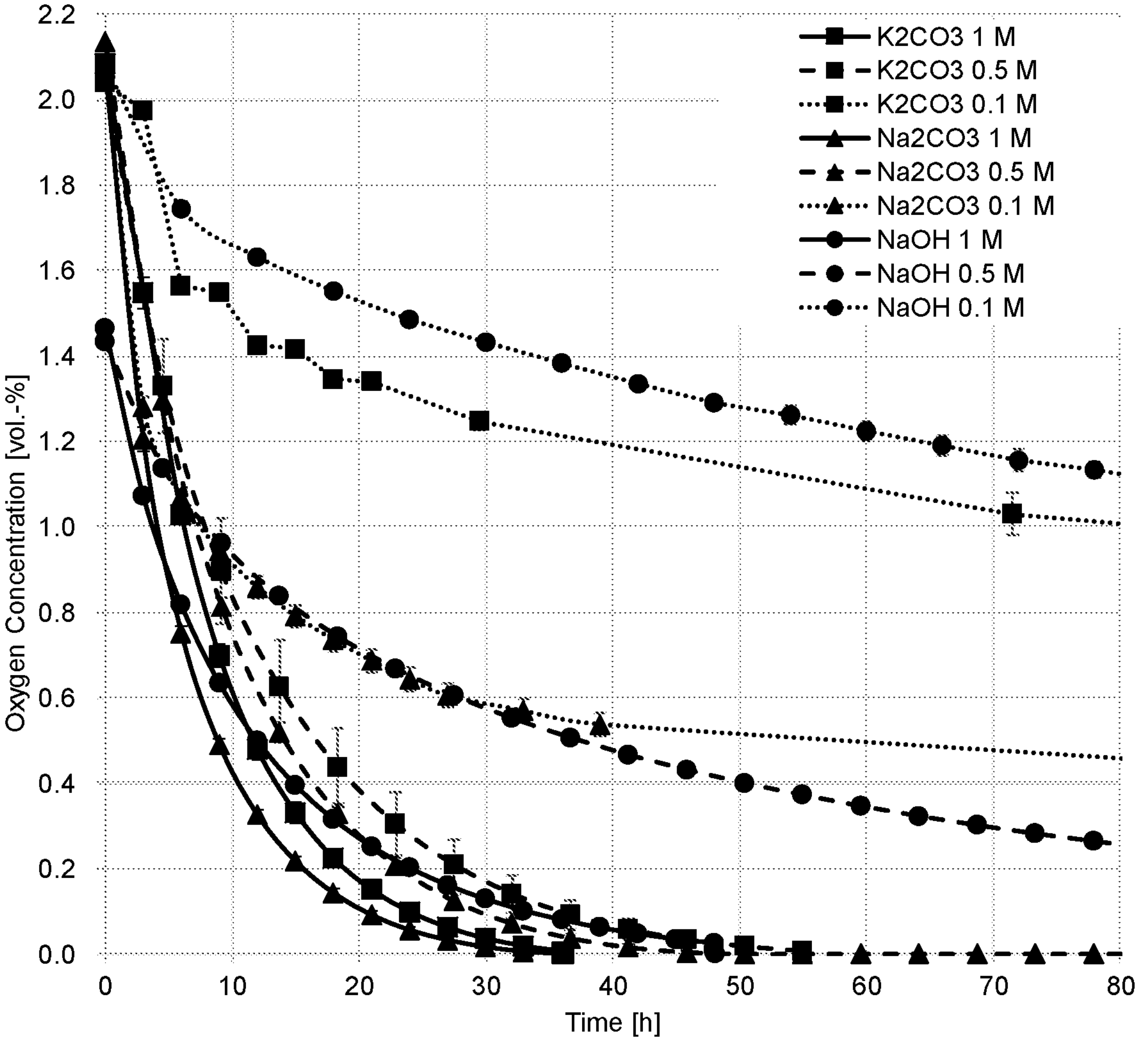
FIG. 1 is a graph of the oxygen scavenging rate (OSR) of various alkaline solutions (Oxygen Concentration [vol.-%] v Time (h)).

FIG. 1 shows the oxygen scavenging rate (OSR) of an activated sheet-like element comprising an inventive gallic acid-based coating layer at a coating weight of 22 g/m2. The sheet was activated with different aqueous alkaline solutions made from $K_2CO_3$, $Na_2CO_3$ or NaOH at different concentrations. The OSR refers to the total amount of oxygen scavenged (in mL) during the time of measurement (in days) per gram of calcium gallate (CGA).

Figure 2:
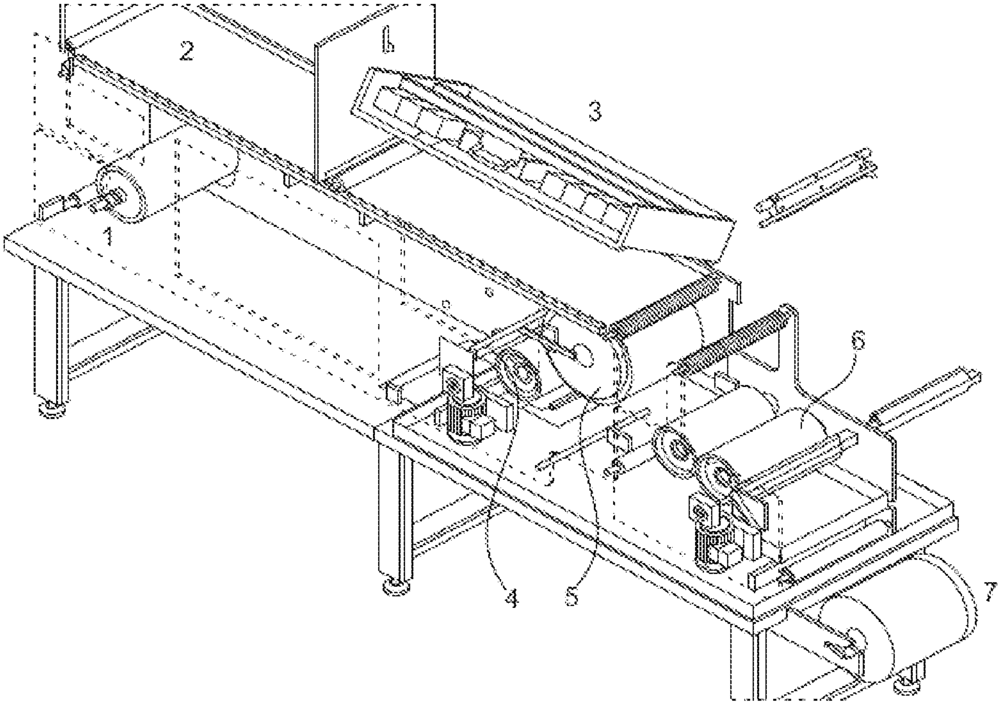
FIG. 2 is an illustration of an exemplary continuous laboratory coater for coating a sheet-like element.

FIG. 2 shows an exemplary continuous laboratory coater for coating a sheet-like element. In FIG. 2, (reference number 1=rewinding, 2=hot air dryer, 3=IR-dryer, 4=Rod/Blade, 5=Unwinding (for rod/blade), 6=metering size press, and 7=unwinding (for metering size press).

It should be understood that for the purposes of the present invention, the following terms have the following meanings.

The kit being "suitable for improving food shelf life" means that the kit and its components, when placed in the food packaging, do not negatively affect the edibility of the foodstuff contained in the food packaging. Thus, any compound used in the sheet-like element of the present invention is a food-safe compound, i.e., a compound that does not release any or any significant amounts of toxic or noxious substances or pathogenic microorganisms into the foodstuff.

The "improvement of food shelf life" is to be understood broadly in that at least one of the properties of the foodstuff in a food packaging, preferably texture, color, taste, nutritional value and/or edibility, is retained for a longer period of time, compared to identical foodstuff in an identical food packaging not containing the inventive activated sheet-like element. The terms "improving", "prolonging" or "increasing" food shelf life are used synonymously herein.

A "pathogenic microorganism" is understood to be at least one strain of bacteria and/or at least one strain of yeast and/or at least one strain of mould, which may be present in a foodstuff that, when ingested, may cause a foodborne illness.

A "surface-reacted calcium carbonate" according to the present invention is a reaction product of ground natural calcium carbonate (GNCC) or precipitated calcium carbonate (PCC) treated with carbon dioxide and one or more $H_3O^+$ ion donors, wherein the carbon dioxide is formed in situ by the $H_3O^+$ ion donors treatment and/or is supplied from an external source. An $H_3O^+$ ion donor in the context of the present invention is a Brønsted acid and/or an acid salt.

The "particle size" of surface-reacted calcium carbonate herein, if not explicitly stated otherwise, is described as volume-based particle size distribution $d_x$(vol), or $d_x$. Therein, the value $d_x$(vol) represents the diameter relative to which x % by volume of the particles have diameters less than $d_x$(vol). This means that, for example, the $d_{20}$(vol) value is the particle size at which 20 vol. % of all particles are smaller than that particle size. The $d_{50}$(vol) value is thus the volume median particle size, also referred to as average particle size, i.e. 50 vol. % of all particles are smaller than that particle size and the $d_{98}$(vol) value, referred to as volume-based top cut particle size, is the particle size at which 98 vol. % of all particles are smaller than that particle size.

Volume median particle size $d_{50}$ is evaluated herein using a Malvern Mastersizer 3000 Laser Diffraction System. The $d_{50}$ or $d_{98}$ value, measured using a Malvern Mastersizer 3000 Laser Diffraction System, indicates a diameter value such that 50% or 98% by volume, respectively, of the particles have a diameter of less than this value. The raw data obtained by the measurement are analysed using the Mie theory, with a particle refractive index of 1.57 and an absorption index of 0.005.

If a particle size is given herein as weight-based particle size, then, e.g., the $d_{20}$(wt) value is the particle size at which 20 wt.-% of all particles are smaller than that particle size. The $d_{50}$(wt) value is thus the weight median particle size, i.e. 50 wt.-% of all particles are smaller than that particle size and the $d_{98}$(wt) value, referred to as weight-based top cut particle size, is the particle size at which 98 wt.-% of all particles are smaller than that particle size.

The weight-based median particle size $d_{50}$(wt) and top cut $d_{98}$(wt) are measure by the sedimentation method, which is an analysis of sedimentation behaviour in a gravimetric field. The measurement is made with a Sedigraph™ 5120 of Micromeritics Instrument Corporation, USA. The method and the instrument are known to the skilled person and are commonly used to determine particle size distributions. The measurement is carried out in an aqueous solution of 0.1 wt. % $Na_4P_2O_7$. The samples are dispersed using a high speed stirrer and sonication.

The "porosity" or "pore volume", when used in connection with the particulate filler and the surface-reacted calcium carbonate, refers to the intra particle intruded specific pore volume. The term "porosity" or "pore volume", when used in connection with the coating layer, refers to the total intruded specific pore volume being the sum of the total intra particle intruded specific pore volume, the total inter particle intruded specific pore volume and the total occlusion intruded specific pore volume.

In the context of the present invention, the term "pore" is to be understood as describing the space that is found between and/or within particles, i.e. that is formed by the particles as they pack together under nearest neighbour contact (interparticle pores), such as in a powder, a compact or a coating layer, and/or the void space within porous particles (intraparticle pores), and that allows the passage of liquids under pressure when saturated by the liquid and/or supports absorption of surface wetting liquids.

Throughout the present document, the term "specific surface area" (in $m^2/g$), which is used to define surface-reacted calcium carbonate or other materials, refers to the specific surface area as determined by using the BET method (using nitrogen as adsorbing gas), according to ISO 9277:2010.

An "oxygen scavenger" in the meaning of the present invention is considered a chemical or biological compound that is capable of reacting with oxygen, thus reducing the content of oxygen in the surrounding atmosphere. An "oxygen scavenging element" is considered as a component, such as a sachet, a carrier, a plastic film, a label or a plastic tray, which comprises the oxygen scavenger, either or both in a non-activated and an activated form. For example, the sheet-like element component and the activated sheet-like element of the present invention represent oxygen scavenging elements. The "oxygen scavenging activity" broadly refers to the capability of the oxygen scavenger or the oxygen scavenging element to react with oxygen, which reduces its amount in the surrounding atmosphere.

When in the following reference is made to a "sheet-like element", it is to be understood that said term encompasses both the sheet-like element component of the kit and the activated sheet-like element.

The "relative humidity" refers to the ratio of the partial pressure of water vapor to the equilibrium vapor pressure of water at the storage temperature of the foodstuff and/or the food packaging, e.g., about room temperature or 5±1° C.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that, e.g., an embodiment must be obtained by, e.g., the sequence of steps following the term "obtained" even though such a limited understanding is always included by the terms "obtained" or "defined" as a preferred embodiment.

When above or in the following reference is made to preferred embodiments or technical details of the inventive kit, it is to be understood that these preferred embodiments or technical details also refer to the inventive activated sheet-like element, the inventive processes, the inventive supply device, the inventive food packaging and the inventive uses, as far as applicable.

The Surface-Reacted Calcium Carbonate

The inventive kit, the inventive activated sheet-like element, the inventive processes, the inventive supply device, the inventive food packaging and the inventive uses involve the use of a surface-reacted calcium carbonate (SRCC).

The surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source.

A $H_3O^+$ ion donor in the context of the present invention is a Brønsted acid and/or an acid salt.

In a preferred embodiment of the invention the surface-reacted calcium carbonate is obtained by a process comprising the steps of: (a) providing a suspension of natural or precipitated calcium carbonate, (b) adding at least one acid having a $pK_a$ value of 0 or less at 20° C. or having a $pK_a$ value from 0 to 2.5 at 20° C. to the suspension of step (a), and (c) treating the suspension of step (a) with carbon dioxide before, during or after step (b). According to another embodiment the surface-reacted calcium carbonate is obtained by a process comprising the steps of: (A) providing a natural or precipitated calcium carbonate, (B) providing at least one water-soluble acid, (C) providing gaseous $CO_2$, (D) contacting said natural or precipitated calcium carbonate of step (A) with the at least one acid of step (B) and with the $CO_2$ of step (C), characterised in that: (i) the at least one acid of step B) has a $pK_a$ of greater than 2.5 and less than or equal to 7 at 20° C., associated with the ionisation of its first available hydrogen, and a corresponding anion is formed on loss of this first available hydrogen capable of forming a water-soluble calcium salt, and (ii) following contacting the at least one acid with natural or precipitated calcium carbonate, at least one water-soluble salt, which in the case of a hydrogen-containing salt has a $pK_a$ of greater than 7 at 20° C., associated with the ionisation of the first available hydrogen, and the salt anion of which is capable of forming water-insoluble calcium salts, is additionally provided.

"Natural ground calcium carbonate" (GCC) preferably is selected from calcium carbonate containing minerals selected from the group comprising marble, chalk, limestone and mixtures thereof. Natural calcium carbonate may comprise further naturally occurring components such as alumino silicate etc.

In general, the grinding of natural ground calcium carbonate may be a dry or wet grinding step and may be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the calcium carbonate containing mineral material comprises a wet ground calcium carbonate containing mineral material, the grinding step may be performed under conditions such that autogenous grinding takes place and/or by horizontal ball milling, and/or other such processes known to the skilled man. The wet processed ground calcium carbonate containing mineral material thus obtained may be washed and dewatered by well-known processes, e.g. by flocculation, filtration or forced evaporation prior to drying. The subsequent step of drying (if necessary) may be carried out in a single step such as spray drying, or in at least two steps. It is also common that such a mineral material undergoes a beneficiation step (such as a flotation, bleaching or magnetic separation step) to remove impurities.

"Precipitated calcium carbonate" (PCC) in the meaning of the present invention is a synthesized material, generally obtained by precipitation following reaction of carbon dioxide and calcium hydroxide in an aqueous environment or by precipitation of calcium and carbonate ions, for example $CaCl_2$) and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S—PCC), rhombohedral (R—PCC), hexagonal prismatic, pinacoidal, colloidal (C—PCC), cubic, and prismatic (P—PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried.

According to one embodiment of the present invention, the precipitated calcium carbonate is precipitated calcium carbonate, preferably comprising aragonitic, vateritic or calcitic mineralogical crystal forms or mixtures thereof.

Precipitated calcium carbonate may be ground prior to the treatment with carbon dioxide and at least one $H_3O^+$ ion donor by the same means as used for grinding natural calcium carbonate as described above.

According to one embodiment of the present invention, the natural or precipitated calcium carbonate is in form of particles having a weight median particle size $d_{50}$ of 0.05 to 10.0 μm, preferably 0.2 to 5.0 μm, more preferably 0.4 to 3.0 μm, most preferably 0.6 to 1.2 μm, especially 0.7 μm. According to a further embodiment of the present invention, the natural or precipitated calcium carbonate is in form of particles having a top cut particle size $d_{98}$ of 0.15 to 55 μm, preferably 1 to 40 μm, more preferably 2 to 25 μm, most preferably 3 to 15 μm, especially 4 μm.

The natural and/or precipitated calcium carbonate may be used dry or suspended in water. Preferably, a corresponding slurry has a content of natural or precipitated calcium carbonate within the range of 1 wt.-% to 90 wt.-%, more preferably 3 wt.-% to 60 wt.-%, even more preferably 5 wt.-% to 40 wt.-%, and most preferably 10 wt.-% to 25 wt.-% based on the weight of the slurry.

The one or more $H_3O^+$ ion donor used for the preparation of surface reacted calcium carbonate may be any strong acid, medium-strong acid, or weak acid, or mixtures thereof, generating $H_3O^+$ ions under the preparation conditions. According to the present invention, the at least one $H_3O^+$ ion donor can also be an acidic salt, generating $H_3O^+$ ions under the preparation conditions.

According to one embodiment, the at least one $H_3O^+$ ion donor is a strong acid having a $pK_a$ of 0 or less at 20° C.

According to another embodiment, the at least one $H_3O^+$ ion donor is a medium-strong acid having a $pK_a$ value from 0 to 2.5 at 20° C. If the $pK_a$ at 20° C. is 0 or less, the acid is preferably selected from sulphuric acid, hydrochloric acid, or mixtures thereof. If the $pK_a$ at 20° C. is from 0 to 2.5, the $H_3O^+$ ion donor is preferably selected from $H_2SO_3$, $H_3PO_4$, oxalic acid, or mixtures thereof. The at least one $H_3O^+$ ion donor can also be an acidic salt, for example, $HSO_4^-$ or $H_2PO_4$, being at least partially neutralized by a corresponding cation such as $Li^+$, $Na^+$ or $K^+$, or $HPO_4^{2-}$, being at least partially neutralised by a corresponding cation such as $Li^+$, $Na^+$, $K^+$, $Mg^{2-}$ or $Ca^{2-}$. The at least one $H_3O^+$ ion donor can also be a mixture of one or more acids and one or more acidic salts.

According to still another embodiment, the at least one $H_3O^+$ ion donor is a weak acid having a $pK_a$ value of greater than 2.5 and less than or equal to 7, when measured at 20° C., associated with the ionisation of the first available hydrogen, and having a corresponding anion, which is capable of forming water-soluble calcium salts. Subsequently, at least one water-soluble salt, which in the case of a hydrogen-containing salt has a $pK_a$ of greater than 7, when measured at 20° C., associated with the ionisation of the first available hydrogen, and the salt anion of which is capable of forming water-insoluble calcium salts, is additionally provided. According to the preferred embodiment, the weak acid has a $pK_a$ value from greater than 2.5 to 5 at 20° C., and more preferably the weak acid is selected from the group consisting of acetic acid, formic acid, propanoic acid, and mixtures thereof. Exemplary cations of said water-soluble salt are selected from the group consisting of potassium, sodium, lithium and mixtures thereof. In a more preferred embodiment, said cation is sodium or potassium. Exemplary anions of said water-soluble salt are selected from the group consisting of phosphate, dihydrogen phosphate, monohydrogen phosphate, oxalate, silicate, mixtures thereof and hydrates thereof. In a more preferred embodiment, said anion is selected from the group consisting of phosphate, dihydrogen phosphate, monohydrogen phosphate, mixtures thereof and hydrates thereof. In a most preferred embodiment, said anion is selected from the group consisting of dihydrogen phosphate, monohydrogen phosphate, mixtures thereof and hydrates thereof. Water-soluble salt addition may be performed dropwise or in one step. In the case of drop wise addition, this addition preferably takes place within a time period of 10 minutes. It is more preferred to add said salt in one step.

According to one embodiment of the present invention, the at least one $H_3O^+$ ion donor is selected from the group consisting of hydrochloric acid, sulphuric acid, *sulphurous* acid, phosphoric acid, citric acid, oxalic acid, acetic acid, formic acid, and mixtures thereof. Preferably the at least one $H_3O^+$ ion donor is selected from the group consisting of hydrochloric acid, sulphuric acid, *sulphurous* acid, phosphoric acid, oxalic acid, $H_2PO_4^-$, being at least partially neutralised by a corresponding cation such as $Li^+$, $Na^+$ or $K^+$, $HPO_4^{2-}$, being at least partially neutralised by a corresponding cation such as $Li^+$, $Na^+$, $K^+$, $Mg^{2+}$, or $Ca_{2+}$ and mixtures thereof, more preferably the at least one acid is selected from the group consisting of hydrochloric acid, sulphuric acid, sulphurous acid, phosphoric acid, oxalic acid, or mixtures thereof, and most preferably, the at least one $H_3O^+$ ion donor is phosphoric acid.

The one or more $H_3O^+$ ion donor can be added to the suspension as a concentrated solution or a more diluted solution. Preferably, the molar ratio of the $H_3O^+$ ion donor to the natural or precipitated calcium carbonate is from 0.01 to 4, more preferably from 0.02 to 2, even more preferably 0.05 to 1 and most preferably 0.1 to 0.58.

As an alternative, it is also possible to add the $H_3O^+$ ion donor to the water before the natural or precipitated calcium carbonate is suspended.

In a next step, the natural or precipitated calcium carbonate is treated with carbon dioxide. If a strong acid such as sulphuric acid or hydrochloric acid is used for the $H_3O^+$ ion donor treatment of the natural or precipitated calcium carbonate, the carbon dioxide is automatically formed. Alternatively or additionally, the carbon dioxide can be supplied from an external source.

$H_3O^+$ ion donor treatment and treatment with carbon dioxide can be carried out simultaneously which is the case when a strong or medium-strong acid is used. It is also possible to carry out $H_3O^+$ ion donor treatment first, e.g. with a medium strong acid having a $pK_a$ in the range of 0 to 2.5 at 20° C., wherein carbon dioxide is formed in situ, and thus, the carbon dioxide treatment will automatically be carried out simultaneously with the $H_3O^+$ ion donor treatment, followed by the additional treatment with carbon dioxide supplied from an external source.

In a preferred embodiment, the $H_3O^+$ ion donor treatment step and/or the carbon dioxide treatment step are repeated at least once, more preferably several times. According to one embodiment, the at least one $H_3O^+$ ion donor is added over a time period of at least about 5 min, preferably at least about 10 min, typically from about 10 to about 20 min, more preferably about 30 min, even more preferably about 45 min, and sometimes about 1 h or more.

Subsequent to the $H_3O^+$ ion donor treatment and carbon dioxide treatment, the pH of the aqueous suspension, measured at 20° C., naturally reaches a value of greater than 6.0, preferably greater than 6.5, more preferably greater than 7.0, even more preferably greater than 7.5, thereby preparing the surface-reacted natural or precipitated calcium carbonate as an aqueous suspension having a pH of greater than 6.0, preferably greater than 6.5, more preferably greater than 7.0, even more preferably greater than 7.5.

In a particular preferred embodiment the surface reacted calcium carbonate is a reaction product of natural ground calcium carbonate (GNCC) with carbon dioxide and phosphoric acid, wherein the carbon dioxide is formed in situ by the phosphoric acid treatment.

Further details about the preparation of the surface-reacted natural calcium carbonate are disclosed in WO0039222 A1, WO2004083316 A1, WO2005121257 A2, WO2009074492 A1, EP2264108 A1, EP2264109 A1 and US20040020410 A1, the content of these references herewith being included in the present application.

Similarly, surface-reacted precipitated calcium carbonate is obtained. As can be taken in detail from WO2009074492 A1, surface-reacted precipitated calcium carbonate is obtained by contacting precipitated calcium carbonate with $H_3O^+$ ions and with anions being solubilized in an aqueous medium and being capable of forming water-insoluble calcium salts, in an aqueous medium to form a slurry of surface-reacted precipitated calcium carbonate, wherein said surface-reacted precipitated calcium carbonate comprises an insoluble, at least partially crystalline calcium salt of said anion formed on the surface of at least part of the precipitated calcium carbonate.

Said solubilized calcium ions correspond to an excess of solubilized calcium ions relative to the solubilized calcium ions naturally generated on dissolution of precipitated calcium carbonate by $H_3O^+$ ions, where said $H_3O^+$ ions are provided solely in the form of a counterion to the anion, i.e. via the addition of the anion in the form of an acid or non-calcium acid salt, and in absence of any further calcium ion or calcium ion generating source.

Said excess solubilized calcium ions are preferably provided by the addition of a soluble neutral or acid calcium salt, or by the addition of an acid or a neutral or acid non-calcium salt which generates a soluble neutral or acid calcium salt in situ.

Said $H_3O^+$ ions may be provided by the addition of an acid or an acid salt of said anion, or the addition of an acid or an acid salt which simultaneously serves to provide all or part of said excess solubilized calcium ions.

In a further preferred embodiment of the preparation of the surface-reacted natural or precipitated calcium carbonate, the natural or precipitated calcium carbonate is reacted with the one or more $H_3O^+$ ion donors and/or the carbon dioxide in the presence of at least one compound selected from the group consisting of silicate, silica, aluminium hydroxide, earth alkali aluminate such as sodium or potassium aluminate, magnesium oxide, or mixtures thereof. Preferably, the at least one silicate is selected from an aluminium silicate, a calcium silicate, or an earth alkali metal silicate. These components can be added to an aqueous suspension comprising the natural or precipitated calcium carbonate before adding the one or more $H_3O^+$ ion donors and/or carbon dioxide.

Alternatively, the silicate and/or silica and/or aluminium hydroxide and/or earth alkali aluminate and/or magnesium oxide component(s) can be added to the aqueous suspension of natural or precipitated calcium carbonate while the reaction of natural or precipitated calcium carbonate with the one or more $H_3O^+$ ion donors and carbon dioxide has already started. Further details about the preparation of the surface-reacted natural or precipitated calcium carbonate in the presence of at least one silicate and/or silica and/or aluminium hydroxide and/or earth alkali aluminate component(s) are disclosed in WO2004083316 A1, the content of this reference herewith being included in the present application.

The surface-reacted calcium carbonate can be kept in suspension, optionally further stabilised by a dispersant. Conventional dispersants known to the skilled person can be used. A preferred dispersant is comprised of polyacrylic acids and/or carboxymethylcelluloses.

Alternatively, the aqueous suspension described above can be dried, thereby obtaining the solid (i.e. dry or containing as little water that it is not in a fluid form) surface-reacted natural or precipitated calcium carbonate in the form of granules or a powder.

The surface-reacted calcium carbonate has a BET specific surface area of 20 to 200 $m^2/g$, preferably 50 to 120 $m^2/g$ and more preferably 50 to 100 $m^2/g$, measured using nitrogen and the BET method. The BET specific surface area in the meaning of the present invention is defined as the surface area of the particles divided by the mass of the particles. As used herein, the specific surface area is measured by adsorption using the BET isotherm (ISO 9277:2010) using nitrogen gas and is specified in $m^2/g$.

It is furthermore preferred that the surface-reacted calcium carbonate has a volume median particle size $d_{50}$(vol) of 0.1 to 75 μm, preferably from 0.5 to 50 μm, more preferably from 1 to 40 μm, even more preferably from 1.2 to 30 μm, and most preferably from 1.5 to 15 μm.

It may furthermore be preferred that the surface-reacted calcium carbonate has a volume top cut particle size $d_{98}$(vol) of from 0.2 to 150 μm, preferably from 1 to 100 μm, more preferably from 2 to 80 μm, even more preferably from 2.4 to 60 μm, and most preferably from 3 to 30 μm.

The value $d_x$ represents the diameter relative to which x % of the particles have diameters less than $d_x$. This means that the dos value is the particle size at which 98% of all particles are smaller. The dos value is also designated as "top cut". The $d_x$ values may be given in volume or weight percent. The $d_{50}$ (wt) value is thus the weight median particle size, i.e. 50 wt.-% of all grains are smaller than this particle size, and the $d_{50}$ (vol) value is the volume median particle size, i.e. 50 vol.-% of all grains are smaller than this particle size.

Volume median grain diameter $d_{50}$ was evaluated using a Malvern Mastersizer 3000 Laser Diffraction System. The $d_{50}$ or $d_{98}$ value, measured using a Malvern Mastersizer 3000 Laser Diffraction System, indicates a diameter value such that 50% or 98% by volume, respectively, of the particles have a diameter of less than this value. The raw data obtained by the measurement are analysed using the Mie theory, with a particle refractive index of 1.57 and an absorption index of 0.005.

The weight median grain diameter is determined by the sedimentation method, which is an analysis of sedimentation behaviour in a gravimetric field. The measurement is made with a Sedigraph™ 5120, Micromeritics Instrument Corporation. The method and the instrument are known to the skilled person and are commonly used to determine grain size of fillers and pigments. The measurement is carried out in an aqueous solution of 0.1 wt.-% $Na_4P_2O_7$. The samples were dispersed using a high speed stirrer and sonicated.

The processes and instruments are known to the skilled person and are commonly used to determine grain size of fillers and pigments.

Preferably, the surface-reacted calcium carbonate has an intra-particle intruded specific pore volume in the range from 0.1 to 2.5 $cm^3/g$, more preferably from 0.2 to 2.2 $cm^3/g$, still more preferably from 0.4 to 2.0 $cm^3/g$ and most preferably from 0.6 to 1.8 $cm^3/g$, determined by mercury porosimetry measurement.

The specific pore volume is measured using a mercury intrusion porosimetry measurement using a Micromeritics Autopore V 9620 mercury porosimeter having a maximum applied pressure of mercury 414 MPa (60 000 psi), equivalent to a Laplace throat diameter of 0.004 μm (~4 nm). The equilibration time used at each pressure step is 20 seconds. The sample material is sealed in a 5 $cm^3$ chamber powder penetrometer for analysis. The data are corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p. 1753-1764).

The total pore volume seen in the cumulative intrusion data can be separated into two regions with the intrusion data from 214 μm down to about 1-4 μm showing the coarse packing of the sample between any agglomerate structures contributing strongly. Below these diameters lies the fine interparticle packing of the particles themselves. If they also have intraparticle pores, then this region appears bi-modal, and by taking the specific pore volume intruded by mercury into pores finer than the modal turning point, i.e. finer than the bi-modal point of inflection, the specific intraparticle pore volume is defined. The sum of these three regions gives the total overall pore volume of the powder, but depends strongly on the original sample compaction/settling of the powder at the coarse pore end of the distribution.

By taking the first derivative of the cumulative intrusion curve the pore size distributions based on equivalent Laplace diameter, inevitably including pore-shielding, are revealed. The differential curves clearly show the coarse agglomerate pore structure region, the interparticle pore region and the intraparticle pore region, if present. Knowing the intraparticle pore diameter range it is possible to subtract the remainder interparticle and interagglomerate pore volume from the total pore volume to deliver the desired pore volume of the internal pores alone in terms of the pore volume per unit mass (specific pore volume). The same principle of subtraction, of course, applies for isolating any of the other pore size regions of interest.

The intra-particle pore size of the surface-reacted calcium carbonate preferably is in a range of from 0.004 to 1.6 μm, more preferably in a range of from 0.005 to 1.3 μm, especially preferably from 0.006 to 1.15 μm and most preferably of 0.007 to 1.0 μm, determined by mercury porosimetry measurement.

In an exemplary embodiment, the surface-reacted calcium carbonate has a BET specific surface area of 20 to 200 $m^2/g$, preferably 50 to 120 $m^2/g$ and more preferably 50 to 100 $m^2/g$, and a volume median particle size $d_{50}$(vol) of 0.1 to 75 μm, preferably from 0.5 to 50 μm, more preferably from 1 to 40 μm, even more preferably from 1.2 to 30 μm, and most preferably from 1.5 to 15 μm.

In a particularly preferred embodiment of the present invention, the surface-reacted calcium carbonate is a reaction product of natural ground calcium carbonate with carbon dioxide and one or more $H_3O^+$ ion donors, wherein the carbon dioxide is formed in situ by the $H_3O^+$ ion donors treatment and/or is supplied from an external source, and wherein the one or more $H_3O^+$ ion donor is phosphoric acid.

Thus, in an exemplary embodiment of the present invention, the surface-reacted calcium carbonate is a reaction product of natural ground calcium carbonate with carbon dioxide and one or more $H_3O^+$ ion donors, wherein the carbon dioxide is formed in situ by the $H_3O^+$ ion donors treatment and/or is supplied from an external source, and wherein the one or more $H_3O^+$ ion donor is phosphoric acid, and wherein the surface-reacted calcium carbonate has a BET specific surface area of 20 to 200 $m^2/g$, preferably 50 to 120 $m^2/g$ and more preferably 50 to 100 $m^2/g$, and a volume median particle size $d_{50}$(vol) of 0.1 to 75 μm, preferably from 0.5 to 50 μm, more preferably from 1 to 40 μm, even more preferably from 1.2 to 30 μm, and most preferably from 1.5 to 15 μm.

It is appreciated that the surface-reacted calcium carbonate can be one or a mixture of different kinds of surface-reacted calcium carbonate(s). In one embodiment of the present invention, the surface-reacted calcium carbonate comprises, preferably consists of, one kind of surface-reacted calcium carbonate. Alternatively, the surface-reacted calcium carbonate comprises, preferably consists of, two or more kinds of surface-reacted calcium carbonates. For example, the surface-reacted calcium carbonate comprises, preferably consists of, two or three kinds of surface-reacted calcium carbonates. Preferably, the surface-reacted calcium carbonate comprises, more preferably consists of, one kind of surface-reacted calcium carbonate.

It is to be understood that the surface-reacted calcium carbonate as described herein comprises pores, which, when present in the inventive coating layer of any of the aspects of the invention, can host suitable high amounts of the oxygen scavenger. Furthermore, a portion of the intra particle pores, inter particle pores and coarse agglomerate pores of the surface-reacted calcium carbonate remains accessible for the aqueous alkaline composition, such that the sheet-like element can be easily activated by applying said aqueous alkaline composition in a sufficient amount.

The Particulate Filler

The inventive kit, the inventive activated sheet-like element, the inventive processes, the inventive supply device, the inventive food packaging and the inventive uses make use of a particulate filler. The particulate filler comprises a surface-reacted calcium carbonate in an amount of at least 50 wt.-%, based on the total amount of the particulate filler. The surface-reacted calcium carbonate is as defined hereinabove.

In a preferred embodiment of the present invention, the particulate filler comprises the surface-reacted calcium carbonate in an amount of at least 70 wt.-%, preferably at least 90 wt.-%, based on the total weight of the at least one particulate filler, and most preferably the particulate filler consists of the surface-reacted calcium carbonate.

Consequently, the particulate filler may comprise at most 50 wt.-%, preferably at most 30 wt.-%, and more preferably at most 10 wt.-% of at least one further particulate filler material. It is preferred that the at least one further particulate filler material has a weight median particle size $d_{50}$ in the range from 0.1 to 75 μm, preferably from 0.5 to 50 μm, more preferably from 1 to 40 μm, even more preferably from 1.2 to 30 μm, and most preferably from 1.5 to 15 μm.

In another embodiment of the present invention, the particulate filler comprises a surface-reacted calcium carbonate in an amount of at least 50 wt.-%, based on the total amount of the particulate filler, and comprises at least one further particulate filler material selected from the group consisting of dolomite, ground calcium carbonate, precipitated calcium carbonate, magnesium hydroxide, talc, gypsum, titanium dioxide, kaolin, silicate, mica, barium sulphate, calcined clay, non-calcined (hydrous) clay, bentonite and mixtures thereof. Preferably, the at least one further particulate filler material is selected from ground calcium carbonate, precipitated calcium carbonate and mixtures thereof. In said embodiment, it is particularly preferred that the particulate filler consists of the at least one further particulate filler material and the surface-reacted calcium carbonate. Thus, the particulate filler preferably consists of the surface-reacted calcium carbonate in an amount of at least 50 wt.-%, preferably at least 70 wt.-%, more preferably at least 90 wt.-%, based on the total amount of the particulate filler, and the at least one further particulate filler material selected from ground calcium carbonate, precipitated calcium carbonate and mixtures thereof.

According to one embodiment of the present invention, the ground calcium carbonate or precipitated calcium carbonate is in form of particles having a weight median particle size $d_{50}$ of 0.05 to 10.0 μm, preferably 0.2 to 5.0 μm, more preferably 0.4 to 3.0 μm, most preferably 0.6 to 1.2 μm, especially 0.7 μm. According to a further embodiment of the present invention, the natural or precipitated calcium carbonate is in form of particles having a weight-based top cut particle size $d_{98}$ of 0.15 to 55 μm, preferably 1 to 40 μm, more preferably 2 to 25 μm, most preferably 3 to 15 μm, especially 4 μm.

The Polymeric Binder

The inventive kit, the inventive activated sheet-like element, the inventive processes, the inventive supply device, the inventive food packaging and the inventive uses make use of a polymeric binder.

Any suitable polymeric binder may be used in the coating layer of the invention, wherein the binder according to the present invention should preferably be swellable. The skilled person knows how to provide suitable swellable binders, e.g., swellable latices. The binder should be selected such that the pores of the surface-reacted calcium carbonate are not clogged and remain accessible to the oxygen scavenger and the aqueous alkaline component.

For example, the polymeric binder may be a hydrophilic polymer such as, for example, polyvinyl alcohol, polyvinyl pyrrolidone, gelatin, cellulose ethers, polyoxazolines, polyvinylacetamides, partially hydrolyzed polyvinyl acetate/vinyl alcohol, polyacrylic acid, polyacrylamide, polyalkylene oxide, sulfonated or phosphated polyesters and polystyrenes, casein, zein, albumin, chitin, chitosan, dextran, pectin, collagen derivatives, collodian, agar-agar, arrowroot, guar, carrageenan, starch, tragacanth, xanthan, alginate or rhamsan and mixtures thereof. It is also possible to use other binders such as hydrophobic materials, for example, poly (styrene-co-butadiene), polyurethane latex, polyester latex, poly(n-butyl acrylate), poly(n-butyl methacrylate), poly(2-ethylhexyl acrylate), copolymers of n-butylacrylate and ethylacrylate, copolymers of vinylacetate and n-butylacrylate, and the like and mixtures thereof. Further examples of suitable binders are homopolymers or copolymers of acrylic and/or methacrylic acids, itaconic acid, and acid esters, such as e.g. ethylacrylate, butyl acrylate, styrene, unsubstituted or substituted vinyl chloride, vinyl acetate, ethylene, butadiene, acrylamides and acrylonitriles, silicone resins, water dilutable alkyd resins, acrylic/alkyd resin combinations, natural oils such as linseed oil, and mixtures thereof.

In a preferred embodiment of the present invention, the polymeric binder is an alkali-swellable binder. For the purposes of the present invention, an alkali-swellable binder is understood to be a polymeric binder, which, upon increasing the pH value, shows a significant increase in its Brookfield viscosity. Preferably, the viscosity of an aqueous solution comprising 50 wt.-% of the alkali-swellable binder, based on the total weight of the aqueous solution, and having a pH of 4, increases by at least 100%, preferably by at least 250%, more preferably by at least 500%, and most preferably by at least 750%, when measured by a Brookfield DV III Ultra viscometer at 24° C.±3° C. at 100 rpm using an appropriate spindle of the Brookfield RV-spindle set, if the pH value of the aqueous solution is increased from 4 to 10. A preferred alkali-swellable binder is polyacrylic acid or a salt or derivative thereof.

According to a preferred embodiment, the polymeric binder is selected from polyacrylic acid, salts thereof, derivatives thereof, starch, proteins, polyvinyl alcohol, styrene-butadiene latex, styrene-acrylate, polyvinyl acetate, polyolefines, ethylene acrylate, microfibrillated cellulose, microcrystalline cellulose, nanocellulose, cellulose, carboxymethylcellulose, bio-based latex, or mixtures thereof, and more preferably the polymeric binder is selected from the group consisting of polyacrylic acid, salts thereof, derivatives thereof, starch, proteins, styrene butadiene latex, polyvinyl alcohol, polyvinyl acetate and mixtures thereof, and most preferably the polymeric binder is polyacrylic acid or a salt or derivative thereof.

The polymeric binder is contained in the coating layer of any one of the aspects of the present invention in an amount from 5 to 25 wt.-%, preferably from 10 to 20 wt.-%, more preferably from 12 to 18 wt.-%, based on the total dry weight of the coating layer.

The polymeric binder is added in order to obtain a coating layer that can be evenly distributed on the substrate layer and adheres to the substrate layer. The amount of polymeric binder, which is added, is chosen high enough to allow for sufficient cohesion and adhesion of the layer, but low enough not to block or clog the pores of the surface-reacted calcium carbonate. In order to further improve adhesion, a primer layer may be provided between the substrate layer and the coating layer, as will be described hereinbelow.

Furthermore, the binder allows for fixing the coating layer of any one of the aspects of the present invention onto a substrate layer, e.g., by a coating process. Thus, the binder is selected so that the coating layer does not delaminate, e.g., during storage, loading of the aqueous alkaline component and/or usage of the sheet-like element or food packaging.

According to a particularly preferred embodiment, the polymeric binder is selected from polyacrylic acid, salts thereof, derivatives thereof, starch, proteins, polyvinyl alcohol, styrene-butadiene latex, styrene-acrylate, polyvinyl acetate, polyolefines, ethylene acrylate, microfibrillated cellulose, microcrystalline cellulose, nanocellulose, cellulose, carboxymethylcellulose, bio-based latex, or mixtures thereof, and more preferably the polymeric binder is selected from the group consisting of polyacrylic acid, salts thereof, derivatives thereof, starch, proteins, styrene butadiene latex, polyvinyl alcohol, polyvinyl acetate and mixtures thereof, and most preferably the polymeric binder is polyacrylic acid or a salt or derivative thereof; and the polymeric binder is contained in the coating layer of any one of the aspects of the present invention in an amount from 5 to 25 wt.-%, preferably from 10 to 20 wt.-%, more preferably from 12 to 18 wt.-%, based on the total dry weight of the coating layer.

The Oxygen Scavenger

The inventive kit, the inventive activated sheet-like element, the inventive processes, the inventive supply device, the inventive food packaging and the inventive uses make use of an oxygen scavenger. The oxygen scavenger is a compound having at least one phenyl ring bearing at least two phenolic hydroxyl groups and at least one group R,

- wherein two of the at least two phenolic hydroxyl groups are arranged on the at least one phenyl ring in an ortho or para fashion relative to each other, and
- wherein R is selected from the group consisting of a hydrogen atom, a hydroxyl group, an alkoxy group, an aryloxy group, an amino group, an alkyl group, an aryl group and a —Y–$R^1$ group. Therein,
- —Y is selected from the group consisting of a direct bond, a linear or branched alkylene group having from 1 to 6 carbon atoms, and a —CH═CH— group, preferably Y is a direct bond, and
- —$R^1$ is an alkoxycarbonyl group, an aryloxycarboxyl group or an essentially fully deprotonated carboxyl group. Particularly preferably, —$R^1$ is an essentially fully deprotonated carboxyl group.

In a preferred embodiment, R is a —Y–$R^1$ group as defined above.

A "phenolic hydroxyl group" refers to a hydroxyl group (—OH), which is directly bound to an aryl ring.

For the purposes of the present invention, two substituents being arranged on a phenyl ring in an "ortho fashion" means that said two substituents are attached to the phenyl ring in a 1,2-fashion, relative to each other. Analogously, two substituents being arranged on a phenyl ring in a "para fashion" means that said two substituents are attached to the phenyl ring in a 1,4-fashion. The relative position of the phenolic hydroxyl groups ensures that the oxygen scavenger is easily oxidizable, since a quinoid system can be formed.

The —CH═CH— group may be in the cis or the trans arrangement or a mixture thereof, and preferably is in the trans arrangement.

The amino group in the meaning of the present invention is the functional group —$NH_2$, wherein optionally one or both of the hydrogen atoms are replaced by one or two organyl groups selected independently from each other.

The alkyl group in the meaning of the present invention refers to a linear or branched, saturated organic compound composed of carbon and hydrogen having 1 to 28, preferably 8 to 26, more preferably 14 to 22, and most preferably 16 to 20 carbon atoms.

The aryl group in the meaning of the present invention is a phenyl group, which is optionally further substituted with one or more organyl groups and/or one or more functional groups.

An "organyl group" in the meaning of the present invention is any organic substituent group, regardless of functional type, having one free valence at a carbon atom, e.g. $CH_3CH_2$—, $ClCH_2$—, $CH_3C$(═O)—, 4-pyridylmethyl- (see IUPAC Gold Book, https://doi.org/10.1351/goldbook.004329).

A "functional group" refers to any substituent other than hydrogen, halide or an organyl group, notably a hydroxyl group, an amino group, a thiol group, an organyloxy group, an organylthio group, a phosphonate group, a phosphine group and a sulfonate group.

An "alkoxycarbonyl group" refers to the group —C(═O)—O—$R^2$, wherein $R^2$ represents an alkyl group, more preferably a methyl, ethyl, propyl, butyl, 2-ethylhexyl, octyl or dodecyl group.

An "aryloxycarbonyl group" refers to the group —C(═O)—O—$R^3$, wherein $R^3$ represents an aryl group, preferably a phenyl group.

An "essentially fully deprotonated" carboxyl group refers to a group derived from a free carboxylic acid (—C(═O)—OH), wherein the hydrogen atom has been essentially fully replaced by a counter ion, e.g., due to reaction with a base. The term "essentially fully replaced" or "essentially fully deprotonated" means that at least 50 mol-%, preferably at least 80 mol-%, more preferably at least 90 mol-%, even more preferably at least 95 mol-% and most preferably at least 98 mol-% of the hydrogen atoms of the carboxylic groups are replaced by said counter ion. The essentially fully deprotonated carboxyl group may be written as —C(═O)—O(H/M), wherein M represents the counter ion.

The counter ion is a cation preferably selected from the group consisting of ammonium, sodium, lithium, potassium, cesium, magnesium, calcium and mixtures thereof, more preferably selected from the group consisting of sodium, potassium, calcium, magnesium and mixtures thereof, and most preferably is a calcium cation.

An ammonium ion for the purposes of the present invention refers to an ion selected from the group consisting of $NH_4^+$, primary ammonium ions, secondary ammonium ions, tertiary ammonium ions and quaternary ammonium ions, preferably $NH_4^+$.

In other words, the at least one oxygen scavenger of the present invention is a compound according to one of the two following formulae (1) and (2)

(1)

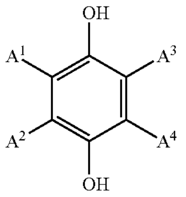

(2)

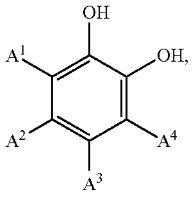

wherein $A^1$, $A^2$, $A^3$ and $A^4$ are independently from each other selected from the group consisting of hydrogen, a halide group, an organyl group and a functional group, and/or two adjacent residues of $A^1$ through $A^4$ are connected to form an annelated ring, with the proviso that at least one of $A^1$ through A4 is R as defined above.

A halide group in the meaning of the present invention is fluoride, chloride, bromide and iodide.

An annelated ring is understood to refer to a new ring formed from two adjacent residues, which shares two carbon atoms and one bond with the phenyl ring depicted in formula (1) or (2). Preferably, the two adjacent residues are selected from the group consisting of —CH═CH—CH═CH—, —C(═O)—O—$CH_2$—$CH_2$—, —C(═O)—O—CH═CH—, —C(═O)—$CH_2$—CH($C_6H_5$)—O— and —C(═O)—CH═C($C_6H_5$)—O—.

Preferably, the at least one oxygen scavenger of the present invention is a compound according to formula (1) or (2), wherein $A^1$, $A^2$, $A^3$ and $A^4$ are independently from each other selected from the group consisting of hydrogen, a hydroxyl group, an alkoxy group and an alkyl group, with the proviso that at least one of $A^1$ through $A^4$ is R as defined above. The alkyl group is preferably a methyl group and the alkoxy group is preferably a methoxy group.

In a preferred embodiment, the at least one oxygen scavenger is selected from the group consisting of phenolic acid derivatives bearing at least two phenolic hydroxyl groups arranged ortho or para relative to each other, cinnamic acid derivatives bearing at least two phenolic hydroxyl groups arranged ortho or para relative to each other, and mixtures thereof.

A "phenolic acid" in the meaning of the present invention is an aromatic compound comprising a carboxylic acid group attached to the aryl ring and at least one phenolic hydroxyl group. A "cinnamic acid" in the meaning of the present invention comprises a 3-phenylprop-2-enoic acid scaffold.

Consequently, a "phenolic acid derivative bearing at least two phenolic hydroxyl groups arranged ortho or para relative to each other" is a compound having at least one phenyl ring bearing at least two phenolic hydroxyl groups and at least one group R, wherein two of the at least two phenolic hydroxyl groups are arranged on the at least one phenyl ring in an ortho or para fashion relative to each other, and wherein R is a —Y—$R^1$ group, wherein Y is a direct bond, and $R^1$ is an alkoxycarbonyl group, an aryloxycarboxyl group or an essentially fully deprotonated carboxyl group.

Similarly, a "cinnamic acid derivative bearing at least two phenolic hydroxyl groups arranged ortho or para relative to each other" is a compound having at least one phenyl ring bearing at least two phenolic hydroxyl groups and at least one group R, wherein two of the at least two phenolic hydroxyl groups are arranged on the at least one phenyl ring in an ortho or para fashion relative to each other, and wherein R is a —Y—$R^1$ group, wherein Y is a —CH═CH— group, and $R^1$ is an alkoxycarbonyl group, an aryloxycarboxyl group or an essentially fully deprotonated carboxyl group.

Thus, in a particularly preferred embodiment, the at least one oxygen scavenger is selected from the group consisting of gallic acid (3,4,5-trihydroxybenzoic acid) derivatives, digallic acid (3,4-dihydroxy-5-[(3,4,5-trihydroxybenzoyl) oxy]benzoic acid) derivatives, protocatechuic acid (3,4-dihydroxybenzoic acid) derivatives, caffeic acid (3-(3,4-dihydroxyphenyl)-2-propenoic acid) derivatives, 5-hydroxyferulic acid (3-(3,4-dihydroxy-5-methoxyphenyl) prop-2-enoic acid) derivatives, gentisic acid (2,5-dihydroxybenzoic acid) derivatives, orsellinic acid (2,4-dihydroxy-6-methylbenzoic acid) derivatives, chebulic acid ((2R)-2-[(3S)-3-carboxy-5,6,7-trihydroxy-1-oxo-3,4-ihydroisochromen-4-yl]butanedioic acid) derivatives, phloroglucinol carboxylic acid (2,4,6-trihydroxybenzoic acid) derivatives, chicoric acid ((2R,3R)-2,3-bis{[(E)-3-(3,4-dihydroxyphenyl)prop-2-enoyl]oxy}butanedioic acid) derivatives, and mixtures thereof.

The term "acid derivative" in this context indicates that the at least one oxygen scavenger comprises an alkoxycarbonyl group, an aryloxycarboxyl group or an essentially fully deprotonated carboxyl group of the above-mentioned acids, i.e., the acid derivative is selected from the group consisting of alkyl esters, aryl esters and essentially fully deprotonated acids of the respective acid.

More preferably, the at least one oxygen scavenger is a gallic acid derivative, preferably selected from the group consisting of essentially fully deprotonated gallic acid, ethyl gallate, propyl gallate, octyl gallate and dodecyl gallate, and most preferably is an essentially fully deprotonated gallic acid. Gallic acid derivatives are considered food-safe and are approved in the European Union under the E numbers E310 to E313.

Consequently, in an exemplary embodiment of the present invention, the at least one oxygen scavenger is an essentially fully deprotonated gallic acid comprising a cation selected from the group consisting of ammonium, sodium, lithium, potassium, cesium, magnesium, calcium and mixtures thereof, preferably selected from the group consisting of sodium, potassium, calcium, magnesium and mixtures thereof and most preferably is a calcium cation.

The Substrate Layer

The inventive kit, the inventive activated sheet-like element, the inventive processes, the inventive supply device, the inventive food packaging and the inventive uses make use of a substrate layer.

The inventive coating layer is fixed onto the substrate layer, e.g., by an application step as described hereinbelow. The coating layer according to the present invention is fixed such it does not delaminate, e.g., during storage, loading of the aqueous alkaline component and/or usage of the sheet-like element. The skilled person knows how to compatibilize a given substrate layer and the inventive coating layer, e.g., by selecting an appropriate polymeric binder as described hereinabove and/or by providing a primer layer as described hereinbelow. Therefore, the present invention is not limited to any particular substrate layer.

The substrate layer comprises one or more individual substrate layers, i.e., the substrate layer may have a mono-layer or a multilayer structure. If the substrate layer comprises two or more individual substrate layers, the individual substrate layers may be made from the same or different material. There are no limitations to the thickness of the substrate layer and/or the individual substrate layers. For example, the substrate layer may have a thickness ranging from 1 μm to 10 mm, preferably from 10 μm to 1 mm and more preferably from 20 μm to 0.5 mm, for example from 50 to 150 μm. For example, the individual substrate layers may have a thickness ranging from 1 μm to 10 mm, preferably from 10 μm to 1 mm and more preferably from 20 μm to 0.5 mm, for example from 50 to 150 μm.

In a preferred embodiment of the present invention, the one or more individual substrate layers selected are selected from the group consisting of polymer material layers. Suitable polymer materials are those listed in part 177, 21 Code of Federal Regulations (CFR).

Preferably, the polymer material layer is made from polyethylene, polypropylene, polyethylene terephthalate, polylactic acid, polyhydroxybutyrate, polyethylene-2,5-furandicarboxylate or polystyrene, fibrous material layers, more preferably made from viscose, cellulose acetate, polypropylene or polyethylene terephthalate, paper layers, cardboard layers, textile layers, nonwoven layers, layers made from bio-based materials, wood layers, bamboo layers, metal foil layers, aluminum layers, print receptive coating layers, and mixtures of the foregoing. The one or more individual substrate layers optionally have been subjected to a corona treatment.

In a particularly preferred embodiment of the present invention, the one or more individual substrate layer is a polymer material layer. The polymer material layer may be provided in the form of a sheet or a film. The polymer material layer may be made from any polymeric material of natural or synthetic origin, and preferably is made from polyethylene (e.g., linear low density polyethylene, low density polyethylene or high density polyethylene), polypropylene, polycarbonate, polyvinylidene dichloride, polymethyl methacrylate, biaxially oriented polypropylene, copolymers of ethylene and propylene, polystyrene, polyester (e.g., polyethylene terephthalate, copolymers of ethylene terephthalate and ethylene isophthalate, polyethylene naphthalate, polylactic acid, polyhydroxybutyrate, polyethylene-2,5-furandicarboxylate), biaxially oriented polyesters (e.g., biaxially oriented polyethylene terephthalate), polyvinyl chloride, cellulose acetate, cellophane, or mixtures thereof, and more preferably, the polymer material layer is made from polyethylene, polypropylene, polyethylene terephthalate, polylactic acid, polyhydroxybutyrate, polyethylene-2,5-furandicarboxylate, polystyrene or mixtures thereof.

The polymer material layer may be produced by any method known to the skilled person, e.g., by an extrusion process, a coextrusion process, a casting process, a calendering process, a solution deposition process, or a skiving process. A substrate layer comprising two or more individual polymer material layers may be produced by a lamination process or an extrusion coating process. A substrate layer comprising at least one individual polymer material layer and at least one different individual substrate layer may be produced by a coating process or a lamination process, or, if the at least one different individual substrate layer is made from metal, by a vapor deposition process.

In another embodiment of the present invention, the one or more individual substrate layer is a fibrous material layer. The fibrous material layer may be a fabric layer, a textile layer or a cloth layer, which is formed from a filament, a yarn, a thread, or a staple fiber, e.g., by weaving, knitting, braiding, crocheting, knotting or felting. For example, the individual substrate layer may be a nonwoven layer. The production of a nonwoven fabric involves a web formation step, such as drylaying, airlaying, wetlaying, spunlaying, meltblown and submicron spinning, and a web bonding step, such as calendering, air through bonding, needle punching, hydroentanglement, stitchbonding and chemical bonding, and optionally a finishing treatment, such as embossing, stretching, perforating, crimping, or coating.

The fibrous material layer may be made from any polymeric material of natural or synthetic origin, e.g., wool, flax, cotton, hemp, sisal, mineral fibers, viscose, cellulose acetate, polyethylene, polyacrylonitrile, polypropylene, polyesters, polyethylene terephthalate, polylactic acid or mixtures thereof, and preferably the fibrous material layer is made from viscose, cellulose acetate, polypropylene, polyethylene terephthalate, polylactic acid or mixtures thereof.

In still another embodiment of the present invention, the one or more individual substrate layer is a paper layer or a cardboard layer. The paper layer or cardboard layer comprises cellulose fibers, e.g., formed from wood pulp, and may further comprise additives, e.g., those listed under part 176, 21 Code of Federal Regulations (CFR).

In yet another embodiment, the one or more individual substrate layer is a layer made from bio-based materials. For the purposes of the present invention, the term "bio-based" material is defined in accordance with European Standard EN 16575:2014 and relates to a material derived from biomass, i.e., a material of biological origin excluding material embedded in geological formations and/or fossilized material. In the manufacture of the biobased material, the biomass may have undergone physical, chemical or biological treatments. Thus, suitable layers include wood layers, bamboo layers, paper layers, cardboard layers, as well as layers made from biopolymers, such as polylactic acid, polybutylene succinate or polyhydroxybutyate.

In still another embodiment of the present invention, the one or more individual substrate layer is a metal foil layer, e.g., a tin layer or an aluminum layer. The metal foil layer may be formed by hammering or rolling, or may be deposited onto a different individual substrate layer by metal vapor deposition.

In one embodiment of the present invention, the one or more individual substrate layer is a print receptive coating layer. The print receptive coating may comprise an inorganic pigment, such as calcium carbonate or kaolin, and comprises a binder, e.g., a polymeric binder as described hereinabove. Optionally, the print receptive coating layer may comprise a cationic dye fixing agent, e.g., a water-soluble metal salt, preferably sodium chloride, aluminum sulfate, calcium chloride or magnesium chloride, or polydimethyldiallylammonium chloride. Thus, the sheet-like element can be printed with a pattern, a logo, a text, or other information, e.g., by offset printing or inkjet printing. Preferably, the ink receptive coating layer is positioned on the sheet-like element on the opposite side of the coating layer.

The substrate layer can be coated evenly with the inventive coating layer. Thus, an optimal adhesion of the coating layer to the substrate layer can be achieved regardless of the material of the food packaging. The so-obtained sheet-like element component can be loaded with the aqueous alkaline component and e.g. loosely placed into the food packaging. Furthermore, the substrate layer allows for "added functionality" of the sheet-like element, such as hosting additional printed information, hosting an adhesive layer for reversible or irreversible fixing of the sheet-like element within the food packaging, or hosting a spoilage indicator label.

The Coating Layer

The inventive kit, the inventive activated sheet-like element, the inventive processes, the inventive supply device, the inventive food packaging and the inventive uses make use of a coating layer.

The coating layer comprises a particulate filler in an amount from 25 to 70 wt.-%, based on the total dry weight of the coating layer, a polymeric binder in an amount from 5 to 25 wt.-%, based on the total dry weight of the coating layer, and at least one oxygen scavenger in an amount from 25 to 70 wt.-%, based on the total dry weight of the coating layer. The particulate filler comprises a surface-reacted calcium carbonate in an amount of at least 50 wt.-%, based on the total amount of the particulate filler, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source and wherein the surface-reacted calcium carbonate has a specific surface area in the range from 20 to 200 $m_2/g$, as measured by the BET method.

It is appreciated that the particulate filler, the surface-reacted calcium carbonate, the at least one oxygen scavenger and the polymeric binder are described hereinabove.

In a preferred embodiment, the coating layer comprises the polymeric binder in an amount from 10 to 20 wt.-%, based on the total dry weight of the coating layer, and/or the particulate filler in an amount from 30 to 60 wt.-%, based on the total dry weight of the coating layer, and/or the oxygen scavenger in an amount from 30 to 60 wt.-%, based on the total dry weight of the coating layer.

Furthermore, the coating layer may contain further additives, such as a rheology modifier, a viscosity enhancer, a wetting agent, a wax, an antistatic agent, and/or an antifoaming agent. Suitable viscosity modifiers include thickening agents.

In one embodiment of the present invention, the viscosity modifier is selected from the group comprising starch, modified starch, maltodextrin, dextran, vegetable gums, pectin, proteins (e.g., collagen, egg white, gelatin, casein, albumin), arrowroot, cornstarch, kuzu starch, katakuri starch, potato starch, sago, wheat flour, almond flour, tapioca, konyak, aiyu jelly, alginines (e.g., alginic acid, sodium alginate, potassium alginate, ammonium alginate, calcium alginate and propylene glycol alginate), guar gum, locust bean gum, oat gum, xanthan gum, acacia gum, karaya gum, tara gum, gellan gum, gum ghatti, agar, gum Arabic, baker's yeast glycan, arabinogalactan, tragacanth, cellulose, cellulose derivatives (e.g., carboxymethyl cellulose, sodium carboxymethyl cellulose, ethyl cellulose, methyl cellulose, hydroxypropylmethyl cellulose, hydroxymethyl cellulose, hydroxypropyl cellulose, ethyl methyl cellulose, microcrystalline cellulose, ethyl hydroxyethyl cellulose, croscarmellose), pectin, carrageenan, processed eucheuma seaweed, curdlan, konjac gum, cassia gum, fumed silica, polyacrylic acid, glycated gelatin gels, and/or salts thereof and mixtures thereof. Preferably, the viscosity modifier is a compound, which is approved for use in a foodstuff by the Scientific Committee on Food and/or the European Food Safety Authority.

In a preferred embodiment of the present invention, the viscosity modifier is selected from the group consisting of guar gum, starch, cellulose, carboxymethyl cellulose, locust bean gum, xanthan gum, pectin, carrageenan, agar, salts thereof, derivatives thereof and mixtures thereof.

The coating layer may comprise the further additive in an amount of from 0.05 to 5.0 wt. %, preferably from 0.1 to 2.0 wt. %, more preferably from 0.2 to 1.0 wt. %, based on the total dry weight of the coating layer.

In a preferred embodiment of the present invention, the coating layer contains a dispersant.

In one embodiment of the present invention, the dispersant is selected from the group comprising homopolymers or copolymers of a polycarboxylic acid and/or a salt and/or derivative thereof, based on, for example, acrylic acid, methacrylic acid, maleic acid, fumaric acid or itaconic acid and acrylamide or mixtures thereof. Homopolymers or copolymers of acrylic acid and/or a salt and/or derivative thereof are especially preferred. The molecular weight Mw of such products is preferably in the range of 1000 to 15000 g/mol, with a molecular weight Mw of 1500 to 6000 g/mol being especially preferred. The molecular weight of the dispersants is selected so that they do not act as a binder but instead act as a parting compound. The polymers and/or copolymers may be neutralized with monovalent and/or polyvalent cations or they may have free acid groups. Suitable monovalent cations include, for example, sodium, lithium, potassium or ammonium. Suitable polyvalent cations include, for example, calcium, magnesium, strontium or aluminum. The combination of sodium and magnesium is especially preferred.

In another embodiment of the present invention, the dispersant is selected from the group comprising starch, carboxymethyl cellulose, glycols, polyglycols, e.g., polyethylene glycols, ethylene oxide-propylene oxide-ethylene oxide block copolymers sodium polyphosphates and/or polyaspartic acid as well as their alkali and/or alkaline earth salts, sodium citrate and amines, alkanolamines, such as triethanolamine and triisopropanolamine and mixtures thereof. It is also possible to use other monomers or polymer additives such as ethylene-acrylic acid copolymers alone or in combination. The ratio of acrylic acid monomers in the copolymer with ethylene monomers is preferably 1:4 to 1:50, especially preferably 1:4 to 1:10, particularly 1:5. Dispersants based on organometallic compounds may also be employed. However, it is also possible to use any other dispersant.

In a preferred embodiment of the present invention, the dispersant is selected from polyacrylic acid having a molecular weight in the range of 1000 to 15000 g/mol, salts thereof, derivatives thereof, starch, carboxymethyl cellulose or mixtures thereof. More preferably, the dispersant is polyacrylic acid being partially or fully neutralized by alkali metal ions, such as lithium, sodium, potassium, cesium, and mixtures thereof, preferably sodium and having a molecular weight in the range of 1500 to 6000 g/mol.

For the purposes of the present invention, the term "partially neutralized" means that at least 10 mol-%, preferably at least 25 mol-%, more preferably at least 50 mol-% of the hydrogen atoms of the carboxylic groups of the polyacrylic acid are replaced by alkali metal ions. For the purposes of the present invention, the term “fully neutralized” means that at least 90 mol-%, preferably at least 95 mol-%, more preferably at least 98 mol-%, and most preferably at least 99 mol-% of the hydrogen atoms of the carboxylic groups of the polyacrylic acid are replaced by alkali metal ions.

Most preferably, the dispersant is polyacrylic acid being partially or fully neutralized by sodium ions and having a molecular weight in the range of 1500 to 6000 g/mol.

The coating layer may comprise the dispersant in an amount from 0.1 to 10 wt.-%, preferably from 0.5 to 7 wt.-% and more preferably from 1.0 to 4 wt.-%, based on the total dry weight of the coating layer.

The dispersant may be contained in the coating layer in order to improve dispersion of the particulate filler comprising the surface-reacted calcium carbonate evenly throughout the coating layer and in order to reduce the amount of aggregates of the particulate filler comprising the surface-reacted calcium carbonate. At the same time, the specified amount can help to retain the accessibility of the pores of the surface-reacted calcium carbonate to the oxygen scavenger and the aqueous alkaline component to a large extent. In a preferred embodiment of the present invention, the dispersant is selected from polyacrylic acid having a molecular weight in the range of 1000 to 15000 g/mol, salts thereof, derivatives thereof, starch, carboxymethyl cellulose or mixtures thereof, more preferably the dispersant is a polyacrylic acid being partially or fully neutralized by alkali metal ions, preferably lithium, sodium, potassium, and mixtures thereof, and having a molecular weight in the range of 1500 to 6000 g/mol, most preferably the dispersant is a polyacrylic acid being partially or fully neutralized by sodium ions and having a molecular weight in the range of 1500 to 6000 g/mol, and the dispersant is contained in the coating layer of any one of the aspects of the present invention in an amount from 0.1 to 10 wt.-%, preferably from 0.5 to 7 wt.-% and more preferably from 1.0 to 4 wt.-%, based on the total dry weight of the coating layer.

It is appreciated that the amount of the particulate filler, the binder, the at least one oxygen scavenger, the optional further additives and the optional dispersant add up to 100 wt.-%, based on the total dry weight of the coating layer. Thus, in one embodiment, the coating layer does not comprise further additives, and the amount of the particulate filler, the binder, the at least one oxygen scavenger and the optional dispersant add up to 100 wt.-%, based on the total dry weight of the coating layer.

The coating layer is adapted for the uptake of oxygen and uptake of the alkaline component. Therefore, it is preferred that the coating layer has a high porosity in order to host sufficiently high amounts of the alkaline component. For the purposes of the present invention, the porosity of the coating layer is represented by the total intruded specific pore volume of the coating layer, as measured by mercury intrusion porosimetry.

Thus, the coating layer of the present invention has a total intruded specific pore volume in the range from 0.1 to 2 $cm^3/g$, as measured by mercury intrusion porosimetry. In a preferred embodiment, the total intruded specific pore volume is in the range from 0.1 to 1.0 $cm^3/g$, and more preferably from 0.15 to 0.5 $cm^3/g$, as measured by mercury intrusion porosimetry.

In a preferred embodiment, the coating layer has a total intra particle intruded specific pore volume in the range from 0.05 to 1.0 $cm^3/g$, preferably from 0.08 to 0.5 $cm^3/g$, and more preferably from 0.1 to 0.4 $cm^3/g$, as measured by mercury intrusion porosimetry, a total inter particle intruded specific pore volume in the range from 0.05 to 0.5 $cm^3/g$, preferably from 0.08 to 0.4 $cm^3/g$, and more preferably from 0.1 to 0.3 $cm^3/g$, as measured by mercury intrusion porosimetry, and/or a total occlusion intruded specific pore volume in the range from 0.05 to 0.4 $cm^3/g$, preferably from 0.08 to 0.3 $cm^3/g$, and more preferably from 0.1 to 0.2 $cm^3/g$, as measured by mercury intrusion porosimetry.

The total intruded specific pore volume, the total inter particle intruded specific pore volume and the total occlusion intruded specific pore volume is determined as described in C. J. Ridgway, P. A. C. Gane, “On bulk density measurement and coating porosity calculation for coated paper samples”, Nordic Pulp and Paper Research Journal 2003, 18, 24-31. In brief, a sample is coated onto an impermeable substrate, such as aluminum foil or PET film, and characterized using a Micromeritics Autopore V mercury porosimeter in an equivalent Laplace diameter range from 208 μm to 0.004 μm. The specific pore volume is given relative to the weight of the coating layer excluding the impermeable substrate.

The total pore volume seen in the cumulative intrusion data can be separated into two regions with the intrusion data from 214 μm down to about 10 μm showing the scrolling method and the interface between the coating and the foil resulting in some initial pore volume contribution over the large pore diameter range. Below these diameters lies the fine interparticle pore volume of the coating. If these particles also have intraparticle pores, then this region appears bi-modal, and by taking the specific pore volume intruded by mercury into pores finer than the modal turning point, i.e. finer than the bi-modal point of inflection, the specific intraparticle pore volume is defined. The sum of these three regions gives the total overall pore volume of the coated sample.

By taking the first derivative of the cumulative intrusion curve, the pore size distributions based on equivalent Laplace diameter, inevitably including pore-shielding, are revealed. The differential curves clearly show the occlusion pore structure region, the interparticle pore region and the intraparticle pore region, if present. Knowing the intraparticle pore diameter range, it is possible to subtract the remainder interparticle and occlusion pore volume from the total pore volume to deliver the desired pore volume of the internal pores alone in terms of the pore volume per unit mass (specific pore volume). The same principle of subtraction, of course, applies for isolating any of the other pore size regions of interest.

The coating layer of the present invention has a high fluid receptivity. In a preferred embodiment, the coating layer has a fluid receptivity in the range from 1 to 50 wt.-%, more preferably from 10 to 45 wt.-%, and most preferably from 15 to 35 wt.-%. Thus, the coating layer may be loaded with high amounts of the aqueous alkaline component without delamination of the coating layer and without leakage of the aqueous alkaline component.

The “fluid receptivity” of a coating layer should be understood as the amount of fluid, e.g., water, which the coating layer can absorb without leaking of the fluid or delamination of the coating layer at room temperature. The fluid receptivity is determined visually. The fluid receptivity is given in wt.-%, and refers to the weight of the fluid per weight of the coating layer. Preferably, the fluid is water or an aqueous 1 M $K_2CO_3$ solution.

The particulate filler comprising the surface-reacted calcium carbonate is present in the coating layer in order to provide the high porosity of the coating layer. It is believed that the intra particle pores, inter particle pores and coarse agglomerate pores of the particulate filler, and especially the surface-reacted calcium carbonate are partially filled with the oxygen scavenger and partially retained in the coating layer, thus allowing for a high uptake of the aqueous alkaline component.

The polymeric binder is added in order to obtain a coating layer that can be evenly distributed on the substrate layer and adheres to the substrate layer. The amount of polymeric binder, which is added, is chosen high enough to allow for sufficient cohesion and adhesion of the layer, but low enough not to block or clog the pores of the surface-reacted calcium carbonate. In a preferred embodiment, the coating layer comprises the polymeric binder in an amount from 10 wt.-% to 20 wt.-%, more preferably from 12 to 18 wt.-%, based on the total dry weight of the coating layer.

The Kit for Improving Food Shelf Life

According to a first aspect of the present invention, a kit for improving food shelf life comprising a sheet-like element component and an alkaline component is provided.

The Sheet-Like Element Component

The sheet-like element comprises a coating layer and a substrate layer. The substrate layer and the coating layer are described hereinabove.

The coating layer is deposited on a substrate layer, wherein the substrate layer is as described hereinabove. The present invention is not limited to any particular substrate layers. The skilled person will adjust the composition of the coating layer to allow for an efficient adhesion of the coating layer to the selected substrate layer. Depending on the substrate layer used, the sheet-like element may be flexible, i.e., it can be bent without delamination of the coating layer, or rigid. The substrate layer allows for obtaining an evenly distributed coating layer. Thus, an optimal adhesion of the coating layer to the substrate layer can be achieved regardless of the material of the food packaging. Furthermore, the substrate layer allows for "added functionality" of the sheet-like element. Preferably, the coating layer is present on the substrate layer in an amount from 1 to 200 $g/m^2$, preferably from 2 to 150 $g/m^2$, more preferably from 10 to 120 $g/m^2$ and most preferably from 25 to 100 $g/m^2$. The coating layer may be applied to the substrate layer by a process as described hereinbelow, preferably by a roller coating step.

In another embodiment of the present invention, the sheet-like element further comprises one or more adhesive layers, being located on the substrate layer on the opposite side of the coating layer and/or between the individual substrate layers, wherein the adhesive layer preferably is selected from the group consisting of adhesives, sealants, rubber coatings, pressure-sensitive layers and mixtures of the foregoing. If the adhesive layer is present, the adhesive layer is used for temporarily or permanently fixing the sheet-like element on the inner surface of a food packaging, or for temporarily fixing the sheet-like element on a sheet-like element supply device as described hereinbelow. However, in the absence of an adhesive layer, the sheet-like element may be simply placed loosely into a food packaging. If the adhesive layer is present between the individual substrate layers, the adhesive layer allows for an improved adhesion of the individual substrate layers, thus improving the longevity and durability of the sheet-like element.

Suitable materials for the adhesive layer are known to the skilled person and include those listed under section 175.105, 21 Code of Federal Regulations (CFR). Specific examples include polyethylene imine, polyurethane, polyacrylates and starch. Suitable materials for pressure-sensitive layers include those listed under section 175.125, 21 CFR.

In another embodiment of the present invention, the sheet-like element further comprises one or more primer layers, being located between the substrate layer and the coating layer. The primer layer may be selected from any suitable material known to the skilled person and preferably is selected from the group comprising polyurethanes, ethylene vinyl acetates, polyvinyl chlorides, nitrocellulose, acrylates, ethylene acrylates, polyacrylonitriles (acrylics) and mixtures thereof. More preferably, the primer layer is formed from aqueous dispersions comprising acrylates, ethylene acrylates, polyacrylonitriles, polyurethanes and/or nitrocellulose. Optionally, the primer layer further comprises a polysicilic acid. If the primer layer is present between the substrate layer and the coating layer, the primer layer allows for an improved adhesion of the individual substrate layers and/or between the substrate layer and the coating layer, thus improving the longevity and durability of the sheet-like element.

In a preferred embodiment of the present invention, the sheet-like element further comprises one or more oxygen-permeable covering layers to permanently cover the coating layer. The term "oxygen-permeable" covering layer in the meaning of the present invention refers to a covering layer that allows the passage of oxygen, for example, due to the presence of micropores.

The oxygen-permeable covering layer allows an essentially unimpeded permeation of oxygen from the atmosphere of the foodstuff into the coating layer, but prevents the coating layer and the foodstuff from being in direct contact with each other. Thus, it is preferred that the breathable covering layer is selected from the group consisting of breathable film layers, fibrous material layers and nonwoven fabric layers. Breathable film layers may be made from materials such as polyethylene, polypropylene or polyethylene terephthalate. Suitable breathable film layers include those disclosed in WO 2016/023937 A[1]. Suitable fibrous material layers and nonwoven fabric layers for use as the breathable covering layers include those as described hereinabove within context of the substrate layer.

In a preferred embodiment, the oxygen-permeable covering layer at the same time prevents the passage of moisture or water vapor, such that water, which has been added in form of the aqueous alkaline component, does not evaporate from the coating layer. Thereby, the oxygen scavenging activity of the activated sheet-like element can be further improved in low humidity environments (e.g., below 50% rH). An exemplary oxygen-permeable, but moisture-impermeable coating layer is an LDPE film. Such layer is typically removed from the sheet-like element component for the application of the aqueous alkaline component or is added to the activated sheet-like element, i.e., after application of the aqueous alkaline component.

In another embodiment of the present invention, the sheet-like element further comprises one or more protective layers to temporarily seal the coating layer, and/or the adhesive layer, wherein the protective layer is preferably selected from polyethylene, polypropylene and/or coated paper. The protective layer shields the coating layer from environmental influences, such as contamination by dirt or grease, until the sheet-like element component is used, i.e., is activated by the alkaline component and placed into a food packaging. If the sheet-like element is already loaded with the alkaline component, the protective layer is an oxygen-impermeable layer that prevents premature reaction with oxygen prior to the intended use. Thus, it is a requirement that the protective layer can be removed from the coating layer without damaging said coating layer. Preferably, the protective layer is made from any polymeric material, such as polyethylene, polypropylene or polystyrene, or coated paper. If a breathable covering layer is present in the sheet-like element, the protective layer is placed onto the breathable covering layer.

The sheet-like element may have a size, which is adjusted according to the specific needs of the application, e.g., the size of the food packaging and/or the type and the amount of foodstuff within the package. The sheet-like element may e.g. be in the form of an angled or round patch or piece. The coated area or size of the sheet-like element may be in the range from 3 to 200 $cm^2$, preferably from 4 to 150 $cm^2$ and more preferably from 5 to 100 $cm^2$. The sheet-like elements according to one embodiment may have a coated area or size of from 3 to 8 or 5 to 10 $cm^2$.

In one embodiment of the present invention, two or more of the sheet-like elements as described hereinabove are combined to form a stacked sheet-like element. It is appreciated that the two or more sheet-like elements may be the same or different sheet-like elements. The two or more sheet-like elements are combined such that the coating layer of each individual sheet-like element is not obstructed or only slightly obstructed. The term "slightly obstructed" means that at most 25%, preferably at most 15%, more preferably at most 10% of the coated area of the sheet-like element are obstructed or sealed. Thus, it is preferred that the two or more sheet-like elements are combined by the use of an intermittent adhesive layer, e.g., by the use of glue points, which preferably are placed in between the two or more sheet like elements such that at most 25%, preferably at most 15%, more preferably at most 10% of the area of the coating layer of the sheet-like element are obstructed or sealed. Thus, the size of the stacked sheet-like element may be smaller than the overall active oxygen scavenging area.

In another embodiment of the present invention, one or more of the sheet-like elements as described hereinabove are combined with another functional coating layer. The one or more of the sheet-like elements is combined with the functional coating layer such that the coating layer of each individual sheet-like element and each functional coating layer is not obstructed or only slightly obstructed, e.g., by the use of an intermittent adhesive layer as defined above. The functional coating layer may be selected from the group comprising moisture control layers, corrosion inhibition layers, metal-chelating layers, antimicrobial active layers, temperature monitoring layers, radio-frequency identification (RFID) layers, security printing layers and metallized film layers, e.g., for microwavable packaging.

The sheet-like element component may be manufactured using a process as described hereinbelow.

The Alkaline Component

The inventive kit further comprises an alkaline component. The alkaline component comprises a base having a $pK_b$ value of 6 or lower.

The $pK_b$ represents a measure of the base strength and corresponds to the addition of a proton to the anion of the base, thus yielding the corresponding acid of the base. The $pK_b$ value can be calculated as follows: $pK_b=14-pK_a$. Both values can be gathered from standard textbooks and/or tables.

It is to be understood that the alkaline component of the kit may consist of the base, or may comprise further components, for example solvents, preferably water. An alkaline component comprising the base and water herein is referred to as "aqueous alkaline component". In a preferred embodiment of the present invention, the alkaline component is an aqueous alkaline component comprising the base and water.

The base activates the at least one oxygen scavenger by at least partially deprotonating the at least two phenolic hydroxyl groups. Therefore, the base must be sufficiently strong to at least partially deprotonate such phenolic hydroxyl groups. Without wishing to be bound by theory, it is believed that the resulting phenolate groups, which are strongly electron-donating, increase the electron density at the aryl ring of the at least one oxygen scavenger, thus enabling its reaction with oxygen. The at least one activated oxygen scavenger may undergo a variety of reactions with oxygen, leading to the formation of several by-products, such as dimers, ring-opened compounds and quinones, as well as hydrogen peroxide. Said reactions are mediated or enabled by the presence of water. Consequently, it is a requirement that the base is dissolved or suspended in water prior to activation.

Thus, if the alkaline component of the inventive kit does not comprise water, the alkaline component is dissolved or suspended in water at the point of use to form an aqueous alkaline component. It is advantageous to dissolve or suspend the alkaline component in water only at the point of use, as storing and shipping costs can be minimized, and since the handling of the alkaline component is facilitated prior to use.

In a preferred embodiment, the base has a $pK_b$ value of 5 or lower, more preferably a $pK_b$ value of 4 or lower. Most preferably, the base has a $pK_b$ in the range from 4 to 0.

The base may be selected from the group consisting of hydroxide bases, carbonate bases, ammonia bases and mixtures thereof, and preferably is selected from the group consisting of lithium hydroxide, sodium hydroxide, potassium hydroxide, lithium carbonate, sodium carbonate, potassium carbonate, caesium carbonate and mixtures thereof, and most preferably is selected from the group consisting of sodium hydroxide, potassium carbonate and sodium carbonate.

For the purposes of the present invention, a hydroxide base ($pK_b=0$) is considered to be a basic metal hydroxide, in particular alkali metal hydroxides and alkaline earth metal hydroxides. A carbonate base ($pK_b=3.6$) is considered to be a metal carbonate, in particular alkali metal carbonates and alkaline earth metal carbonates. An ammonia base is understood to be a base comprising a nitrogen atom, preferably ammonium hydroxide (or ammonia, $pK_b=4.75$), primary amines, secondary amines or tertiary amines.

In one embodiment of the present invention, the alkaline component is an aqueous alkaline component. In another embodiment of the present invention, the alkaline component is dissolved or suspended in water prior to use to form an aqueous alkaline component.

Preferably, the pH of the aqueous alkaline component is at least 8, more preferably at least 10, even more preferably at least 11, and most preferably at least 12.

In another preferred embodiment, the aqueous alkaline component comprises the base in an amount from 1 wt.-% to 75 wt.-%, more preferably 5 wt.-% to 60 wt.-%, and most preferably from 10 to 35 wt.-%, based on the total weight of the aqueous alkaline component.

In a preferred embodiment of the present invention, the kit for improving shelf life comprises:

a) a sheet-like element component having
  a1) a coating layer comprising
    i) a particulate filler in an amount from 25 to 70 wt.-%, based on the total dry weight of the coating layer,
      wherein the particulate filler comprises a surface-reacted calcium carbonate in an amount of at least 50 wt.-%, based on the total amount of the particulate filler,
      wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and
      wherein the surface-reacted calcium carbonate has a specific surface area in the range from 20 to 200 $m^2/g$, as measured by the BET method,
    ii) a polymeric binder in an amount from 5 to 25 wt.-%, based on the total dry weight of the coating layer, and
    iii) at least one oxygen scavenger in an amount from 25 to 70 wt.-%, based on the total dry weight of the coating layer,
      wherein the at least one oxygen scavenger is selected from the group consisting of phenolic acid derivatives bearing at least two phenolic hydroxyl groups arranged ortho or para relative to each other, cinnamic acid derivatives bearing at least two phenolic hydroxyl groups arranged ortho or para relative to each other, and mixtures thereof,
      wherein the acid derivatives are selected from the group consisting of alkyl esters, aryl esters and essentially fully deprotonated acids of the respective acid, and
  a2) a substrate layer, and
b) an alkaline component comprising a base having a $pK_b$ value of 6 or lower and being selected from the group consisting of hydroxide bases, carbonate bases, ammonia bases and mixtures thereof, preferably an aqueous alkaline component.

In another preferred embodiment of the present invention, the kit for improving shelf life comprises:

a) a sheet-like element component having
  a1) a coating layer comprising
    i) a particulate filler in an amount from 25 to 70 wt.-%, based on the total dry weight of the coating layer,
      wherein the particulate filler comprises a surface-reacted calcium carbonate in an amount of at least 70 wt.-%, based on the total amount of the particulate filler,
      wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and
      wherein the surface-reacted calcium carbonate has a specific surface area in the range from 20 to 200 $m^2/g$, as measured by the BET method,
    ii) a polymeric binder in an amount from 5 to 25 wt.-%, based on the total dry weight of the coating layer, wherein the polymeric binder is selected from the group consisting of polyacrylic acid, salts thereof, derivatives thereof, starch, proteins, styrene butadiene latices, polyvinyl alcohol, polyvinyl acetate and mixtures thereof, and
    iii) at least one oxygen scavenger in an amount from 25 to 70 wt.-%, based on the total dry weight of the coating layer,
      wherein the at least one oxygen scavenger is selected from the group consisting of gallic acid derivatives, digallic acid derivatives, protocatechuic acid derivatives, caffeic acid derivatives, 5-hydroxyferulic acid derivatives, gentisic acid derivatives, orsellinic acid derivatives, chebulic acid derivatives, phloroglucinol carboxylic acid derivatives, chicoric acid derivatives, and mixtures thereof, even more preferably the at least one oxygen scavenger is a gallic acid derivative,
      wherein the acid derivatives are selected from the group consisting of alkyl esters, aryl esters and essentially fully deprotonated acids of the respective acid, and
  a2) a substrate layer, and
b) an alkaline component comprising a base being selected from the group consisting of lithium hydroxide, sodium hydroxide, potassium hydroxide, lithium carbonate, sodium carbonate, potassium carbonate, caesium carbonate and mixtures thereof, preferably an aqueous alkaline component.

In yet another preferred embodiment of the present invention, the kit for improving shelf life comprises:

a) a sheet-like element component having
  a1) a coating layer comprising
    i) a particulate filler in an amount from 25 to 70 wt.-%, based on the total dry weight of the coating layer,
      wherein the particulate filler comprises a surface-reacted calcium carbonate in an amount of at least 90 wt.-%, based on the total amount of the particulate filler,
      wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and
      wherein the surface-reacted calcium carbonate has a specific surface area in the range from 20 to 200 $m^2/g$, as measured by the BET method,
    ii) a polymeric binder in an amount from 5 to 25 wt.-%, based on the total dry weight of the coating layer, wherein the polymeric binder is selected from the group consisting of polyacrylic acid, salts thereof, derivatives thereof, starch, proteins, styrene butadiene latices, polyvinyl alcohol, polyvinyl acetate and mixtures thereof, and
    iii) at least one oxygen scavenger in an amount from 25 to 70 wt.-%, based on the total dry weight of the coating layer,
      wherein the at least one oxygen scavenger is selected from the group consisting of gallic acid derivatives, digallic acid derivatives, protocatechuic acid derivatives, caffeic acid derivatives, 5-hydroxyferulic acid derivatives, gentisic acid derivatives, orsellinic acid derivatives, chebulic acid derivatives, phloroglucinol carboxylic acid derivatives, chicoric acid derivatives, and mixtures thereof, even more preferably the at least one oxygen scavenger is a gallic acid derivative, wherein the acid derivatives are essentially fully deprotonated acids of the respective acid and comprise a cation selected from the group consisting of sodium, potassium, calcium, magnesium and mixtures thereof, most preferably a calcium cation, and a2) a substrate layer, and b) an alkaline component comprising a base being selected from the group consisting of lithium hydroxide, sodium hydroxide, potassium hydroxide, lithium carbonate, sodium carbonate, potassium carbonate, caesium carbonate and mixtures thereof, preferably an aqueous alkaline component.

The Activated Sheet-Like Element

A second aspect of the present invention relates to an activated sheet-like element formed from the inventive kit by adding to the coating layer of the sheet-like element component the alkaline component, wherein the activated sheet-like element comprises reaction products of the at least one oxygen scavenger with the base.

It is to be understood that the kit, the sheet-like element component, the alkaline component, the base and the at least one oxygen scavenger are described in detail hereinabove.

The activated sheet-like element comprises reaction products of the at least one oxygen scavenger with the base. The phenolic hydroxyl groups of the at least one oxygen scavenger are at least partially deprotonated, whereby the phenolic hydrogen atom is replaced by the cation of the base. The term “at least partially deprotonated” means that at least 2 mol-%, preferably at least 5 mol-%, more preferably at least 10 mol-%, even more preferably at least 25 mol-% and most preferably at least 50 mol-% of all phenolic hydrogen atoms are replaced by the cation of the base. As an example, there are 3 phenolic hydrogen atoms if the at least one oxygen scavenger comprises three phenolic hydroxyl groups. The cation corresponds to the cation of the base, and thus, is preferably selected from alkali metal ions, alkaline earth metal ions and ammonium ions (i.e., NH4+, primary ammonium ions, secondary ammonium ions, or tertiary ammonium ions), more preferably is selected from lithium, sodium, potassium and cesium, and most preferably is selected from potassium and sodium.

In a preferred embodiment, the alkaline component is added in an amount such that the base is added in an amount of at least 0.01 molar equivalents, preferably at least 0.02 molar equivalents, more preferably at least 0.05 molar equivalents, even more preferably at least 0.1 molar equivalents, based on the molar amount of the oxygen scavenger.

The present inventors realized that comparatively small amounts, i.e., substoichiometric or catalytic amounts, of base are sufficient in order to activate the at least one oxygen scavenger. However, also higher amounts of base may be employed.

In another preferred embodiment, the alkaline component is added in an amount 10 to 70 wt.-%, preferably 20 to 65 wt.-% and more preferably from 35 to 60 wt.-%, based on the total weight of the coating layer. It is to be understood that the term “total weight of the coating layer” refers to the coating layer including the alkaline component.

Additionally, or alternatively, the alkaline component is added in an amount from 25 to 200 wt.-%, preferably from 50 to 150 wt.-%, based on the total weight of the dry coating layer.

The alkaline component preferably is an aqueous alkaline component as defined hereinabove. Thus, the alkaline component used for the formation of the activated sheet-like element comprises high amounts of water, which helps retain the activity of the activated sheet-like element for the duration of storage. The amount of alkaline component is selected sufficiently high that the oxygen scavenger is activated, but no delamination of the coating layer occurs.

The present inventors realized that the coating layer of the present invention can retain high amounts of liquid, for example water or the aqueous alkaline component. Therefore, the oxygen scavenging activity can be retained for a long period of time and even at low relative humidity.

In other words, the activated sheet-like element of the present invention preferably comprises a1) a coating layer comprising i) a particulate filler in an amount from 25 to 70 wt.-%, based on the total dry weight of the coating layer, wherein the particulate filler comprises a surface-reacted calcium carbonate in an amount of at least 50 wt.-%, based on the total amount of the particulate filler, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and wherein the surface-reacted calcium carbonate has a specific surface area in the range from 20 to 200 $m^2/g$, as measured by the BET method, ii) a polymeric binder in an amount from 5 to 25 wt.-%, based on the total dry weight of the coating layer, and iii) at least one activated oxygen scavenger in an amount from 25 to 70 wt.-%, based on the total dry weight of the coating layer, wherein the at least one activated oxygen scavenger is a compound having at least one phenyl ring bearing at least two at least partially deprotonated phenolic hydroxyl groups and at least one group R, wherein two of the at least two phenolic hydroxyl groups are arranged on the at least one phenyl ring in an ortho or para fashion relative to each other, and wherein R is selected from the group consisting of a hydrogen atom, a hydroxyl group, an alkoxy group, an aryloxy group, an amino group, an alkyl group, an aryl group and a —Y—$R^1$ group, preferably wherein R is a —Y—$R^1$ group, wherein —Y is selected from the group consisting of a direct bond, a linear or branched alkylene group having from 1 to 6 carbon atoms, and a —CH═CH— group, preferably Y is a direct bond, and —$R^1$ is an alkoxycarbonyl group, an aryloxycarboxyl group or an essentially fully deprotonated carboxyl group, and a2) a substrate layer.

Therein, the coating layer, the particulate filler, the surface-reacted calcium carbonate, the polymeric binder and the substrate layer are as described hereinabove. The at least one activated oxygen scavenger is a compound derived from the at least one oxygen scavenger as described hereinabove by reacting said at least one oxygen scavenger with a base as described hereinabove. The activated sheet-like element may comprise further layers described hereinabove within context of the sheet-like element component.

In a preferred embodiment, the activated sheet-like element has an oxygen scavenging rate (OSR) in the range from 5 to 200 mL $O_2$/(d $g_{OS}$), preferably from 10 to 150 mL $O_2$/(d $g_{OS}$), and more preferably from 20 to 100 mL $O_2$/(d $g_{OS}$). The OSR is given in mL oxygen adsorbed per day and per gram of oxygen scavenger. The OSR is determined by placing the activated sheet-like element into a sealed tray comprising a headspace of 250 $cm^3$ of a mixture of $N_2$ and $O_2$ (in a volume ratio of 98:2) and measuring the oxygen content of the tray headspace until the oxygen content is below 0.4 vol.-%. The amount of oxygen scavenged is divided by the time required for reducing the oxygen content below 0.4 vol.-% and the amount of oxygen scavenger in the activated sheet-like element.

In another preferred embodiment, the activated sheet-like element has an oxygen scavenging capacity (OSC) in the range from 75 to 400 mL $O_2/g_{OS}$. The OSC is given in mL oxygen adsorbed per gram of oxygen scavenger. The OSC is determined by placing the activated sheet-like element into a sealed tray comprising a headspace of 250 $cm^3$ of a mixture of $N_2$ and $O_2$ (in a volume ratio of about 80:20) and measuring the oxygen content of the tray headspace until the oxygen content is constant, e.g., does not change for more than 0.1 vol.-% over the course of 6 h. The amount of oxygen scavenged is divided by the amount of oxygen scavenger in the activated sheet-like element.

In a preferred embodiment of the present invention, the activated sheet-like element comprises:

a) a sheet-like element component having
  a1) a coating layer comprising
    i) a particulate filler in an amount from 25 to 70 wt.-%, based on the total dry weight of the coating layer,
      wherein the particulate filler comprises a surface-reacted calcium carbonate in an amount of at least 50 wt.-%, based on the total amount of the particulate filler,
      wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and
      wherein the surface-reacted calcium carbonate has a specific surface area in the range from 20 to 200 $m^2/g$, as measured by the BET method,
    ii) a polymeric binder in an amount from 5 to 25 wt.-%, based on the total dry weight of the coating layer, and
    iii) at least one activated oxygen scavenger in an amount from 25 to 70 wt.-%, based on the total dry weight of the coating layer,
      wherein the at least one oxygen scavenger is selected from the group consisting of phenolic acid derivatives bearing at least two at least partially deprotonated phenolic hydroxyl groups arranged ortho or para relative to each other, cinnamic acid derivatives bearing at least two phenolic hydroxyl groups arranged ortho or para relative to each other, and mixtures thereof,
      wherein the acid derivatives are selected from the group consisting of alkyl esters, aryl esters and essentially fully deprotonated acids of the respective acid, and
  a2) a substrate layer, and
b) an alkaline component comprising a base having a $pK_b$ value of 6 or lower and being selected from the group consisting of hydroxide bases, carbonate bases, ammonia bases and mixtures thereof.

In another preferred embodiment of the present invention, the activated sheet-like element comprises:

a) a sheet-like element component having
  a1) a coating layer comprising
    i) a particulate filler in an amount from 25 to 70 wt.-%, based on the total dry weight of the coating layer,
      wherein the particulate filler comprises a surface-reacted calcium carbonate in an amount of at least 70 wt.-%, based on the total amount of the particulate filler,
      wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and
      wherein the surface-reacted calcium carbonate has a specific surface area in the range from 20 to 200 $m^2/g$, as measured by the BET method,
    ii) a polymeric binder in an amount from 5 to 25 wt.-%, based on the total dry weight of the coating layer, wherein the polymeric binder is selected from the group consisting of polyacrylic acid, salts thereof, derivatives thereof, starch, proteins, styrene butadiene latices, polyvinyl alcohol, polyvinyl acetate and mixtures thereof, and
    iii) at least one activated oxygen scavenger in an amount from 25 to 70 wt.-%, based on the total dry weight of the coating layer,
      wherein the at least one activated oxygen scavenger is selected from the group consisting of gallic acid derivatives, digallic acid derivatives, protocatechuic acid derivatives, caffeic acid derivatives, 5-hydroxyferulic acid derivatives, gentisic acid derivatives, orsellinic acid derivatives, chebulic acid derivatives, phloroglucinol carboxylic acid derivatives, chicoric acid derivatives, and mixtures thereof, even more preferably the at least one oxygen scavenger is a gallic acid derivative,
      wherein the acid derivatives are selected from the group consisting of alkyl esters, aryl esters and essentially fully deprotonated acids of the respective acid,
      wherein the phenolic hydroxyl groups of the acid derivative are at least partially deprotonated, and
  a2) a substrate layer, and
b) an alkaline component comprising a base being selected from the group consisting of lithium hydroxide, sodium hydroxide, potassium hydroxide, lithium carbonate, sodium carbonate, potassium carbonate, caesium carbonate and mixtures thereof.

In yet another preferred embodiment of the present invention, the activated sheet-like element comprises:

a) a sheet-like element component having
  a1) a coating layer comprising
    i) a particulate filler in an amount from 25 to 70 wt.-%, based on the total dry weight of the coating layer,
      wherein the particulate filler comprises a surface-reacted calcium carbonate in an amount of at least 90 wt.-%, based on the total amount of the particulate filler,
      wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and
      wherein the surface-reacted calcium carbonate has a specific surface area in the range from 20 to 200 $m^2/g$, as measured by the BET method,
    ii) a polymeric binder in an amount from 5 to 25 wt.-%, based on the total dry weight of the coating layer, wherein the polymeric binder is selected from the group consisting of polyacrylic acid, salts thereof, derivatives thereof, starch, proteins, styrene butadiene latices, polyvinyl alcohol, polyvinyl acetate and mixtures thereof, and
    iii) at least one activated oxygen scavenger in an amount from 25 to 70 wt.-%, based on the total dry weight of the coating layer,
      wherein the at least one activated oxygen scavenger is selected from the group consisting of gallic acid derivatives, digallic acid derivatives, protocatechuic acid derivatives, caffeic acid derivatives, 5-hydroxyferulic acid derivatives, gentisic acid derivatives, orsellinic acid derivatives, chebulic acid derivatives, phloroglucinol carboxylic acid derivatives, chicoric acid derivatives, and mixtures thereof, even more preferably the at least one oxygen scavenger is a gallic acid derivative,
      wherein the acid derivatives are essentially fully deprotonated acids of the respective acid and comprise a cation selected from the group consisting of sodium, potassium, calcium, magnesium and mixtures thereof, most preferably a calcium cation, wherein the phenolic hydroxyl groups of the acid derivative are at least partially deprotonated, and
  a2) a substrate layer, and
b) an alkaline component comprising a base being selected from the group consisting of lithium hydroxide, sodium hydroxide, potassium hydroxide, lithium carbonate, sodium carbonate, potassium carbonate, caesium carbonate and mixtures thereof.

The activated sheet-like element may be manufactured in a process as described hereinbelow.

The Inventive Processes

A third aspect of the present invention relates to a process for the manufacture of a kit for improving food shelf life. The process comprises the steps of:

a) providing a particulate filler comprising a surface-reacted calcium carbonate in an amount of at least 50 wt.-%, based on the total amount of the particulate filler,
  wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and
  wherein the surface-reacted calcium carbonate has a specific surface area in the range from 20 to 200 $m^2/g$, preferably 50 to 120 $m^2/g$, as measured by the BET method,
b) providing at least one oxygen scavenger being a compound having at least one phenyl ring bearing at least two phenolic hydroxyl groups and at least one group R, wherein two of the at least two phenolic hydroxyl groups are positioned on the at least one phenyl ring in an ortho or para fashion relative to each other, and wherein R is selected from the group consisting of a hydrogen atom, a hydroxyl group, an alkoxy group, an aryloxy group, an amino group, an alkyl group, an aryl group and a —Y—$R^1$ group, preferably wherein R is a —Y—$R^1$ group, wherein
  —Y is selected from the group consisting of a direct bond, a linear or branched alkylene group having from 1 to 6 carbon atoms, and a —CH═CH— group, preferably Y is a direct bond, and
  —$R^1$ is an alkoxycarbonyl group, an aryloxycarboxyl group or an essentially fully deprotonated carboxyl group,
c) providing a polymeric binder,
d) providing a substrate layer comprising one or more individual substrate layers or a food packaging comprising the substrate layer,
e) mixing, in the order set out herein, the oxygen scavenger of step b), the particulate filler of step a) and the polymeric binder of step c) to obtain a coating composition,
f) applying the coating composition of step e) onto the substrate layer of step d) to obtain a sheet-like element precursor,
g) drying the sheet-like element precursor obtained in step f) to obtain a sheet-like element component,
h) providing an alkaline component comprising a base having a $pK_b$ value of 6 or lower, and optionally
i) mixing the alkaline component of step h) with water to obtain an aqueous alkaline component comprising the base and water, wherein preferably
  the pH of the aqueous alkaline component is at least 8, more preferably at least 10, even more preferably at least 11, and most preferably at least 12 and/or
  the aqueous alkaline component comprises the base in an amount from 1 wt.-% to 75 wt.-%, more preferably 5 wt.-% to 60 wt.-%, and most preferably 10 to 35 wt.-%, based on the total weight of the aqueous alkaline component.

In a fourth aspect of the present invention, a process for the manufacture of a sheet-like element component is provided. The process comprises the steps of:

a) providing a particulate filler comprising a surface-reacted calcium carbonate in an amount of at least 50 wt.-%, based on the total amount of the particulate filler,
  wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and wherein the surface-reacted calcium carbonate has a specific surface area in the range from 20 to 200 $m^2/g$, preferably 50 to 120 $m^2/g$, as measured by the BET method, b) providing at least one oxygen scavenger being a compound having at least one phenyl ring bearing at least two phenolic hydroxyl groups and at least one group R, wherein two of the at least two phenolic hydroxyl groups are positioned on the at least one phenyl ring in an ortho or para fashion relative to each other, and wherein R is a —Y—$R^1$ group, wherein —Y is selected from the group consisting of a direct bond, a linear or branched alkylene group having from 1 to 6 carbon atoms, and a —CH═CH— group, preferably Y is a direct bond, and —$R^1$ is an essentially fully deprotonated carboxyl group c) providing a polymeric binder, d) providing a substrate layer comprising one or more individual substrate layers or a food packaging comprising the substrate layer, e) mixing, in the order set out herein, the oxygen scavenger of step b), the particulate filler of step a), and the polymeric binder of step c) to obtain a coating composition, f) applying the coating composition of step e) onto the substrate layer of step d) to obtain a sheet-like element precursor, and g) drying the sheet-like element precursor obtained in step f) to obtain a sheet-like element component, wherein step b) of providing the at least one oxygen scavenger comprises the sub-steps of b1) providing at least one oxygen scavenger precursor being a compound having at least one phenyl ring bearing at least two phenolic hydroxyl groups and at least one group R, wherein two of the at least two phenolic hydroxyl groups are positioned on the at least one phenyl ring in an ortho or para fashion relative to each other, and wherein R is a —Y—$R^1$ group, wherein —Y is selected from the group consisting of a direct bond, a linear or branched alkylene group having from 1 to 6 carbon atoms, and a —CH═CH— group, preferably Y is a direct bond, and —R1 is a carboxyl group, b2) providing a basic compound, and b3) reacting the carboxyl group of the oxygen scavenger precursor of step b1) with the basic compound of step b2) to obtain the oxygen scavenger.

Steps a) to g) of both inventive processes will be described in the following.

It is appreciated that in step a) of the inventive processes, a particulate filler as described hereinabove is provided. Furthermore, the at least one oxygen scavenger provided in step b) of the inventive processes, the polymeric binder provided in step c) of the inventive processes and the substrate layer provided in step d) of the inventive processes are as described hereinabove. The particulate filler of step a), the at least one oxygen scavenger of step b) and/or the polymeric binder of step c) may be independently from each other provided in a pure form, or, alternatively, in the form of a solution or suspension, wherein at least one of the particulate filler of step a), the at least one oxygen scavenger of step b) and/or the polymeric binder of step c) is provided in the form of a solution or suspension or is dissolved or suspended in a solvent prior to mixing step e).

In a preferred embodiment of the present invention, the polymeric binder of step c) is provided in the form of a solution, more preferably an aqueous solution. In a particularly preferred embodiment of the present invention, the polymeric binder of step c) is provided in the form of an aqueous solution having a pH value of at least 7, preferably at least 8, for example from 8 to 12, such as from 8 to 10. The pH value may be adjusted using any acid or base known to the skilled person. If the pH value of the solution initially is below 7, it is preferred that the pH value is adjusted using an aqueous solution of a base, such as a sodium hydroxide solution. Adjusting the pH value to the specified range may improve the swelling properties of the polymeric binder.

In mixing step e), the at least one oxygen scavenger of step b), the particulate filler of step a) and the polymeric binder of step c) are mixed in said order to obtain a coating composition.

Preferably, the so-obtained coating composition comprises the particulate filler in an amount from 25 to 70 wt.-%, preferably from 30 to 60 wt.-% and more preferably from 40 to 60 wt.-%, based on the total dry weight of the coating composition, the at least one oxygen scavenger in an amount from 25 to 70 wt.-%, preferably from 30 to 60 wt.-% and more preferably from 40 to 60 wt.-%, based on the total dry weight of the coating composition and the binder in an amount of from 5 to 25 wt.-%, preferably from 10 to 20 wt.-%, more preferably from 12 to 18 wt.-%, based on the total dry weight of the coating composition.

The coating composition obtained in step e) may be stored under inert gas atmosphere, e.g. under nitrogen, when temporarily stored until its further processing or use.

It is appreciated that the amount of the particulate filler, the binder, the at least one oxygen scavenger, the optional further additives and the optional dispersant add up to 100 wt.-%, based on the total dry weight of the coating layer. Thus, in one embodiment, the coating layer does not comprise further additives, and the amount of the particulate filler, the binder, the at least one oxygen scavenger and the optional dispersant add up to 100 wt.-%, based on the total dry weight of the coating layer.

Preferably, mixing step e) is performed in the presence of a solvent. Thus, the coating composition is obtained in the form of a slurry. The solvent may be any solvent allowing for the dispersion of the particulate filler comprising the surface-reacted calcium carbonate, the at least one oxygen scavenger, and the polymeric binder within the coating composition, such as water, acetone, ethanol, methanol or butanone. In a particularly preferred embodiment, the solvent is water.

The solids content of the coating composition preferably is in the range from 10 to 80 wt.-%, more preferably 20 to 70 wt.-%, even more preferably 30 to 60 wt.-%, and most preferably 40 to 55 wt.-%, based on the total weight of the coating composition.

During mixing step e), optionally further additives such as a rheology modifier, a viscosity enhancer, a wetting agent, a wax, an antistatic agent, a dispersant and/or an antifoaming agent may be added. Suitable viscosity modifiers include thickening agents, such as the thickening agents described hereinabove. According to one embodiment, the further additive may be added in an amount of from 0.05 to 5.0 wt. %, preferably from 0.1 to 2.0 wt. %, more preferably from 0.2 to 1.0 wt. %, based on the total dry weight of the coating composition.

In a preferred embodiment of the present invention, a dispersant as described hereinabove is added during mixing step e) in an amount of from 0.1 to 10 wt. %, preferably from 0.5 to 7 wt. %, more preferably from 1 to 4 wt. %, based on the total dry weight of the coating composition. In this embodiment, it is a requirement that the dispersant is added to the at least one oxygen scavenger of step b) before the particulate filler of step a) is added.

In general, the polymeric binder, the particulate filler and the at least one oxygen scavenger can be brought into contact by any conventional means known to the skilled person. For example, the compounds may be mixed in the absence or presence of a solvent. Suitable mixing devices are known to the skilled person and may include mixers or blenders, e.g., a tumbling mixer, a vertical or horizontal ploughshare mixer, such as a Ploughshare® mixer available from Gebrüder Lödige Maschinenbau GmbH or a laboratory mixer, such as an MP mixer available from Somakon Verfahrenstechnik UG. The skilled person will adapt the mixing conditions (such as the configuration of mixing speed) according to his needs and available equipment.

The present inventors found that the order of mixing ensures that the finally obtained coating layer has a high porosity. The specified order also allows for the processing or mixing as high solids slurries, which is advantageous in comparison to low solids processing using large amounts of water or solvents.

In application step f), the coating composition of step e) is applied onto the substrate layer of step d) to form a sheet-like element precursor. Application step f) can be performed by any means known to the skilled person, e.g., by spraying or coating. Preferably, application step f) is performed by a coating step, more preferably by means of roller coating, dip coating, rod coating, grooved rod coating, curtain coating, stiff blade coating, applicator roll coating, fountain coating, jet coating, short dwell coating, slotted die coating, bent blade coating, bevel blade coating, air knife coating, bar coating, gravure coating, conventional or metering size press coating, spray application techniques, screen printing and/or wet stack coating, and most preferably by roller coating.

Preferably, the coating composition is applied to the substrate layer an amount sufficient to yield a coating weight of the final coating layer from 1 to 200 $g/m^2$, preferably from 2 to 150 $g/m^2$, more preferably from 10 to 120 $g/m^2$ and most preferably from 25 to 100 $g/m^2$.

If the sheet-like element further comprises a primer layer, the primer layer is applied to the substrate layer of step d) prior to application step f) in a priming step f1). The primer layer may be applied using any suitable application process known to the skilled person, either in an in-line process, that is, at the same manufacturing process step or using the same apparatus as for the application of the coating composition in application step f), or in an off-line process, that is, using separate equipment for the priming step f1) and the application step f).

Drying step g) may be performed by any method known to the skilled person. Preferably, drying step g) is performed at a temperature in the range from 50 to 150° C. at ambient pressure or at reduced pressure, preferably by hot air drying, IR radiation drying or UV radiation drying. The so-obtained sheet-like element comprises a coating layer, preferably having a total intruded specific pore volume in the range from 0.25 to 2 $cm^3/g$, as measured by mercury intrusion porosimetry. In a preferred embodiment, the total intruded specific pore volume is in the range from 0.1 to 1.5 $cm^3/g$, and more preferably from 0.1 to 1.0 $cm^3/g$, as measured by mercury intrusion porosimetry.

In a preferred embodiment, the coating layer has a total intra particle intruded specific pore volume in the range from 0.05 to 1.0 $cm^3/g$, preferably from 0.08 to 0.5 $cm^3/g$, and more preferably from 0.1 to 0.4 $cm^3/g$, as measured by mercury intrusion porosimetry, a total inter particle intruded specific pore volume in the range from 0.05 to 0.5 $cm^3/g$, preferably from 0.08 to 0.4 $cm^3/g$, and more preferably from 0.1 to 0.3 $cm^3/g$, as measured by mercury intrusion porosimetry, and/or a total occlusion intruded specific pore volume in the range from 0.05 to 0.4 $cm^3/g$, preferably from 0.08 to 0.3 $cm^3/g$, and more preferably from 0.1 to 0.2 $cm^3/g$, as measured by mercury intrusion porosimetry.

The inventive process for the manufacture of the kit for improving food shelf life further comprises a step h) of providing an alkaline component comprising a base having a $pK_b$ value of 6 or lower. In said step, an alkaline component as described hereinabove is provided.

Preferably, the inventive process for the manufacture of the kit for improving food shelf life further comprises a step i) of mixing the alkaline component of step h) with water to obtain an aqueous alkaline component comprising the base and water, wherein preferably the pH of the aqueous alkaline component is at least 8, more preferably at least 10, even more preferably at least 11, and most preferably at least 12 and/or the aqueous alkaline component comprises the base in an amount from 1 wt.-% to 75 wt.-%, more preferably 5 wt.-% to 60 wt.-%, and most preferably 10 to 35 wt.-%, based on the total weight of the aqueous alkaline component.

It is appreciated that the so-obtained aqueous alkaline component is described hereinabove. Step i) may be performed by any mixing means known to the skilled person, e.g., those described hereinabove for method step e).

Process step b) of the inventive processes may comprise the sub-steps of b1) providing at least one oxygen scavenger precursor being a compound having at least one phenyl ring bearing at least two phenolic hydroxyl groups and at least one group R, wherein two of the at least two phenolic hydroxyl groups are positioned on the at least one phenyl ring in an ortho or para fashion relative to each other, and wherein R is a —Y—$R^1$ group, wherein —Y is selected from the group consisting of a direct bond, a linear or branched alkylene group having from 1 to 6 carbon atoms, and a —CH═CH— group, preferably Y is a direct bond, and —$R^1$ is a carboxyl group, b2) providing a basic compound, and b3) reacting the carboxyl group of the oxygen scavenger precursor of step b1) with the basic compound of step b2) to obtain the oxygen scavenger.

Said sub-steps b1) to b3) are essential for the process for the manufacture of a sheet-like element component according to the fourth aspect of the present invention, and may be employed for the provision of the oxygen scavenger of step b) of the process for the manufacture of the kit for improving shelf life according to the third aspect of the present invention.

The present inventors surprisingly found that oxygen scavengers comprising free carboxylic acids are capable of reacting with the surface-reacted calcium carbonate, which may compromise its structure and finally lead to coating layers having a low porosity. Such coating layers cannot host suitably high amounts of an aqueous alkaline component, and therefore, cannot be used as oxygen scavenging elements. Therefore, oxygen scavenger precursors comprising free carboxylic acids have to be essentially fully deprotonated by reaction with a basic compound prior to their incorporation into a coating layer of the inventive sheet-like element component.

The basic compound may be any compound sufficiently basic to essentially fully deprotonate the carboxyl group of the oxygen scavenger precursor. Preferably, the basic compound is selected such that the reaction byproduct is water and optionally a gas. Therefore, preferred basic compounds include carbonate bases, hydroxide bases, bicarbonate bases, amine bases and mixtures thereof. More preferably, the basic compound is selected from the group consisting of sodium carbonate, sodium bicarbonate, sodium hydroxide, potassium carbonate, potassium bicarbonate, potassium hydroxide, calcium carbonate, calcium bicarbonate, calcium hydroxide, magnesium carbonate, magnesium bicarbonate, magnesium hydroxide, ammonia, and mixtures thereof, and most preferably is calcium carbonate.

It is understood that the calcium carbonate preferably is not a surface-treated calcium carbonate, i.e., does not contain a hydrophobizing treatment layer on its surface and/or no significant amounts of grinding aids are adhered.

During step b3), the basic compound preferably is added to the oxygen scavenger precursor in a molar amount from 50% to 110%, preferably from 80% to 100%, more preferably from 90% to 100%, even more preferably from 95% to 100%, still more preferably from 98% to 100%, and most preferably from 98% to 100%, relative to the oxygen scavenger precursor. Step b3) preferably is performed in a solvent, more preferably water. Step b3) may be performed under mixing as described hereinabove under step e).

In a preferred embodiment of the present invention, the process for the manufacture of a sheet-like element component comprises the steps of:

a) providing a particulate filler comprising a surface-reacted calcium carbonate in an amount of at least 50 wt.-%, based on the total amount of the particulate filler, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and
 wherein the surface-reacted calcium carbonate has a specific surface area in the range from 20 to 200 $m^2/g$, preferably 50 to 120 $m^2/g$, as measured by the BET method,
b) providing at least one oxygen scavenger selected from the group consisting of phenolic acid derivatives bearing at least two phenolic hydroxyl groups arranged ortho or para relative to each other, cinnamic acid derivatives bearing at least two phenolic hydroxyl groups arranged ortho or para relative to each other, and mixtures thereof, wherein the acid derivatives are essentially fully deprotonated acids of the respective acid,
c) providing a polymeric binder,
d) providing a substrate layer comprising one or more individual substrate layers or a food packaging comprising the substrate layer,
e) mixing, in the order set out herein, the oxygen scavenger of step b), the particulate filler of step a), and the polymeric binder of step c) to obtain a coating composition,
f) applying the coating composition of step e) onto the substrate layer of step d) to obtain a sheet-like element precursor, and
g) drying the sheet-like element precursor obtained in step f) to obtain a sheet-like element component, wherein step b) of providing the at least one oxygen scavenger comprises the sub-steps of b1) providing at least one oxygen scavenger precursor selected from the group consisting of phenolic acids bearing at least two phenolic hydroxyl groups arranged ortho or para relative to each other, cinnamic acids bearing at least two phenolic hydroxyl groups arranged ortho or para relative to each other, and mixtures thereof,
b2) providing a basic compound, and
b3) reacting the carboxyl group of the oxygen scavenger precursor of step b1) with the basic compound of step b2) to obtain the oxygen scavenger.

In another preferred embodiment of the present invention, the process for the manufacture of a sheet-like element component comprises the steps of:

a) providing a particulate filler comprising a surface-reacted calcium carbonate in an amount of at least 70 wt.-%, based on the total amount of the particulate filler,
 wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and
 wherein the surface-reacted calcium carbonate has a specific surface area in the range from 20 to 200 $m^2/g$, preferably 50 to 120 $m^2/g$, as measured by the BET method,
b) providing at least one oxygen scavenger selected from the group consisting of gallic acid derivatives, digallic acid derivatives, protocatechuic acid derivatives, caffeic acid derivatives, 5-hydroxyferulic acid derivatives, gentisic acid derivatives, orsellinic acid derivatives, chebulic acid derivatives, phloroglucinol carboxylic acid derivatives, chicoric acid derivatives, and mixtures thereof, even more preferably the at least one oxygen scavenger is a gallic acid derivative, wherein the acid derivatives are essentially fully deprotonated acids of the respective acid,
c) providing a polymeric binder,
d) providing a substrate layer comprising one or more individual substrate layers or a food packaging comprising the substrate layer,
e) mixing, in the order set out herein, the oxygen scavenger of step b), the particulate filler of step a), and the polymeric binder of step c) to obtain a coating composition,
f) applying the coating composition of step e) onto the substrate layer of step d) to obtain a sheet-like element precursor, and
g) drying the sheet-like element precursor obtained in step f) to obtain a sheet-like element component, wherein step b) of providing the at least one oxygen scavenger comprises the sub-steps of b1) providing at least one oxygen scavenger precursor selected from the group consisting of gallic acid, digallic acid, protocatechuic acid, caffeic acid, 5-hydroxyferulic acid, gentisic acid, orsellinic acid, chebulic acid, phloroglucinol carboxylic acid, chicoric acid, and mixtures thereof, even more preferably the at least one oxygen scavenger is gallic acid, b2) providing a basic compound selected from the group consisting of carbonate bases, hydroxide bases, bicarbonate bases, amine bases and mixtures thereof, and preferably selected from the group consisting of sodium carbonate, sodium bicarbonate, sodium hydroxide, potassium carbonate, potassium bicarbonate, potassium hydroxide, calcium carbonate, calcium bicarbonate, calcium hydroxide, magnesium carbonate, magnesium bicarbonate, magnesium hydroxide, ammonia, and mixtures thereof, and most preferably calcium carbonate, and b3) reacting the carboxyl group of the oxygen scavenger precursor of step b1) with the basic compound of step b2) to obtain the oxygen scavenger.

A fifth aspect of the present invention relates to a process for activating the inventive sheet-like element component of the inventive kit. The process comprises the steps of j) mixing the alkaline component with water to obtain an aqueous alkaline component comprising the base and water, and k) applying the aqueous alkaline component onto at least a part of the surface of the coating layer.

It is to be understood that the inventive sheet-like element component is as described hereinabove and can be obtained by any one of the processes described herein. Furthermore, the kit, the alkaline component the aqueous alkaline component, the base and the coating layer are as described hereinabove. The process leads to the obtention of an activated sheet-like element preferably as described hereinabove.

Preferably, the alkaline component is added or applied in an amount such that the base is added in an amount of at least 0.01 molar equivalents, preferably at least 0.02 molar equivalents, more preferably at least 0.05 molar equivalents, even more preferably at least 0.1 molar equivalents, based on the molar amount of the oxygen scavenger, and/or the alkaline component is added in an amount from 10 to 70 wt.-%, preferably 20 to 65 wt.-% and more preferably from 35 to 60 wt.-%, based on the total weight of the coating layer.

Application step k) may be performed by any means known to the skilled person, preferably by inkjet printing, spraying, coating, vapor deposition, and/or dripping, on at least a part of the surface of the coating layer. In one embodiment, application step k) is performed by coating. It is to be understood that the aqueous alkaline component may be applied by any coating means known to the skilled person, including, but not limited to roller coating, dip coating, rod coating, grooved rod coating, curtain coating, stiff blade coating, applicator roll coating, fountain coating, jet coating, short dwell coating, slotted die coating, bent blade coating, bevel blade coating, air knife coating, bar coating, gravure coating, conventional or metering size press coating, spray application techniques, spin coating, screen printing and/or wet stack coating, preferably dip coating, slotted die coating and/or spin coating.

In a preferred embodiment, application step k) is performed by inkjet printing, spraying, coating, and/or dripping. In a particularly preferred embodiment, application step k) is performed by spraying.

Application step k) may be performed directly after the production of the sheet-like element, i.e., already at the manufacturing site. In this case, it is preferred that an oxygen-impermeable protective layer as described hereinabove is applied to the activated sheet-like element or the activated sheet-like element is stored in a supply device as described hereinbelow in order to prevent the scavenging of oxygen prior to the incorporation of the activated sheet-like element into the food packaging.

However, it is particularly preferred that application step k) is performed immediately before or shortly before the activated sheet-like element is placed inside the food packaging. Thus, premature oxygen scavenging is efficiently avoided. In other words, it is preferred that the sheet-like element and the kit is shipped and stored in the non-activated state.

Optionally, the inventive processes further comprise a printing step l). The sheet-like element may be printed with a pattern, a logo, a text or other information. The printing ink may be applied to the inventive coating layer and/or on the opposite side of the inventive coating layer on the substrate layer. In the latter alternative, it is preferred that the outermost individual substrate layer is a print receptive coating layer as described hereinabove. Printing methods suitable for use in the present invention include inkjet, offset, flexographic and gravure printing.

Optionally, the inventive processes further comprise a cutting step m). The sheet-like element may be cut into several pieces having a predetermined size. The size of the pieces is adjusted according to the specific needs of the application, e.g., the size of the food packaging or the type of foodstuff. The coated area or size of the pieces may be in the range from 3 to 200 cm2, preferably from 4 to 150 cm2 and more preferably from 5 to 100 cm2. The sheet-like elements according to one embodiment may have a coated area or size of from 3 to 8 or 5 to 10 $cm^2$.

The Inventive Supply Device

The inventive kit may further comprise a supply device comprising the inventive sheet-like element component, wherein the supply device preferably comprises a roll or a magazine. Additionally, a sixth aspect of the present invention relates to a supply device comprising the inventive activated sheet-like element, wherein the supply device protects the activated sheet-like element from oxygen and preferably comprises a roll, a stack, a magazine, or a packaging, such as a box.

The supply device comprises the sheet-like element component or the activated sheet-like element of any of the foregoing aspects of the present invention. Preferably, the supply device comprises a roll or a magazine comprising the sheet-like elements. The supply device may be a label dispenser or a label applicator comprising said roll and/or magazine. However, the supply device may also be a sheet comprising at least two of the inventive sheet-like elements. Thus, it is preferred that the sheet-like elements can be reversibly and non-destructively removed from the supply device.

Thus, the sheet-like element can be easily dispensed and provided at the point of use.

The Inventive Food Packaging

The inventive kit may further comprise a food packaging comprising the sheet-like element component, wherein the coating layer is present within the food packaging. Additionally, a seventh aspect of the present invention relates to a food packaging comprising the inventive activated sheet-like element, wherein the coating layer is present within the food packaging. It is appreciated that the sheet-like element and the coating layer are as defined hereinabove.

The aqueous alkaline composition is applied to the sheet-like element or to the coating layer within the inventive food packaging before, during or after the foodstuff is packed into the inventive food packaging. The activated sheet-like element is placed inside the food packaging before, during or after the foodstuff is packed into the food packaging.

In a preferred embodiment, the food packaging comprising the inventive activated sheet-like element further comprises a modified atmosphere. Modified atmosphere packaging (MAP) of foodstuffs is well-known to the skilled person. The atmosphere in the food packaging initially comprises reduced levels of oxygen, i.e., less than 20 vol.-%, based on the total volume of the packaging atmosphere, more preferably less than 5 vol.-% and most preferably less than 2 vol.-%, which are further reduced by the oxygen-scavenging activity of the inventive activated sheet-like element. The modified atmosphere preferably consists essentially of nitrogen and carbon dioxide, preferably in a volume ratio from 10:90 to 90:10, more preferably 20:80 to 80:20, and most preferably 30:70 to 70:30, for example about 70:30, or about 60:40 or about 50:50. It is appreciated that the inventive food packaging is closed or sealed after the food packaging is filled with the activated sheet-like element, the foodstuff, and optionally the modified atmosphere. The food packaging may be closed or sealed by any means known to the skilled person.

Alternatively or additionally, the atmosphere of the food packaging comprises a relative humidity in the range from >0 to 100% rH. The inventive activated sheet-like element efficiently scavenges oxygen at relative humidity in the range from 30 to 100% rH, preferably 50 to 100% rH.

In a preferred embodiment of the present invention, the food packaging is sealed, preferably by heat-sealing, pressure sealing and/or ultrasonic welding, more preferably in combination with a sealing agent. Preferred sealing agents for use in the present invention include pressure-sensitive adhesives selected from the group consisting of permanent pressure-sensitive adhesives, removable pressure-sensitive adhesives, and resealable pressure-sensitive adhesives, preferably resealable pressure-sensitive adhesives.

Within the inventive food packaging, the activated sheet-like element scavenges oxygen and, thus, prevents or retards food spoilage and/or increases the shelf life of the foodstuff.

The present invention is not limited to any particular kinds of foodstuffs. In an embodiment of the present invention, the foodstuff is selected from the group comprising liquid and solid foodstuff, including raw and processed meat, such as poultry, beef, pork, ham, sausage; dried meat; raw and processed fish; dairy products, such as cheese, e.g., sliced cheese or grated cheese; bakery products, such as bread, toast bread, cakes, cookies; snacks; nuts and oil seeds; vegetables; sweets, ready-to-eat foods, beverages, such as juices, especially orange juice, and the like.

The present inventors found that the combined use of the inventive activated sheet-like element and MAP has a synergistic effect on the shelf life increase of the foodstuff. Most importantly, it was surprisingly found that the inventive activated sheet-like element retains its oxygen scavenging activity in the presence of CO2, although CO2 tends to deactivate the oxygen scavengers used in the present invention, if not in the form of the inventive sheet-like element.

In a preferred embodiment of the present invention, the inventive food packaging is a kit comprising a) a sheet-like element component having
  a1) a coating layer present within the food packaging comprising
    i) a particulate filler in an amount from 25 to 70 wt.-%, based on the total dry weight of the coating layer,
      wherein the particulate filler comprises a surface-reacted calcium carbonate in an amount of at least 50 wt.-%, based on the total amount of the particulate filler,
      wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and
      wherein the surface-reacted calcium carbonate has a specific surface area in the range from 20 to 200 $m^2/g$, as measured by the BET method,
    ii) a polymeric binder in an amount from 5 to 25 wt.-%, based on the total dry weight of the coating layer, and
    iii) at least one oxygen scavenger in an amount from 25 to 70 wt.-%, based on the total dry weight of the coating layer,
      wherein the at least one oxygen scavenger is selected from the group consisting of phenolic acid derivatives bearing at least two phenolic hydroxyl groups arranged ortho or para relative to each other, cinnamic acid derivatives bearing at least two phenolic hydroxyl groups arranged ortho or para relative to each other, and mixtures thereof,
      wherein the acid derivatives are selected from the group consisting of alkyl esters, aryl esters and essentially fully deprotonated acids of the respective acid, and
  a2) a substrate layer, and
b) an alkaline component comprising a base having a $pK_b$ value of 6 or lower and being selected from the group consisting of hydroxide bases, carbonate bases, ammonia bases and mixtures thereof, preferably an aqueous alkaline component.

In another preferred embodiment of the present invention, the inventive food packaging is a kit comprising a) a sheet-like element component having
  a1) a coating layer present within the food packaging comprising
    i) a particulate filler in an amount from 25 to 70 wt.-%, based on the total dry weight of the coating layer,
      wherein the particulate filler comprises a surface-reacted calcium carbonate in an amount of at least 70 wt.-%, based on the total amount of the particulate filler,
      wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and wherein the surface-reacted calcium carbonate has a specific surface area in the range from 20 to 200 $m^2/g$, as measured by the BET method, ii) a polymeric binder in an amount from 5 to 25 wt.-%, based on the total dry weight of the coating layer, wherein the polymeric binder is selected from the group consisting of polyacrylic acid, salts thereof, derivatives thereof, starch, proteins, styrene butadiene latices, polyvinyl alcohol, polyvinyl acetate and mixtures thereof, and iii) at least one oxygen scavenger in an amount from 25 to 70 wt.-%, based on the total dry weight of the coating layer, wherein the at least one oxygen scavenger is selected from the group consisting of gallic acid derivatives, digallic acid derivatives, protocatechuic acid derivatives, caffeic acid derivatives, 5-hydroxyferulic acid derivatives, gentisic acid derivatives, orsellinic acid derivatives, chebulic acid derivatives, phloroglucinol carboxylic acid derivatives, chicoric acid derivatives, and mixtures thereof, even more preferably the at least one oxygen scavenger is a gallic acid derivative, wherein the acid derivatives are selected from the group consisting of alkyl esters, aryl esters and essentially fully deprotonated acids of the respective acid, and a2) a substrate layer, and b) an alkaline component comprising a base being selected from the group consisting of lithium hydroxide, sodium hydroxide, potassium hydroxide, lithium carbonate, sodium carbonate, potassium carbonate, caesium carbonate and mixtures thereof, preferably an aqueous alkaline component.

In yet another preferred embodiment of the present invention, the inventive food packaging is a kit comprising a) a sheet-like element component having a1) a coating layer present within the food packaging comprising i) a particulate filler in an amount from 25 to 70 wt.-%, based on the total dry weight of the coating layer, wherein the particulate filler comprises a surface-reacted calcium carbonate in an amount of at least 90 wt.-%, based on the total amount of the particulate filler, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and wherein the surface-reacted calcium carbonate has a specific surface area in the range from 20 to 200 $m^2/g$, as measured by the BET method, ii) a polymeric binder in an amount from 5 to 25 wt.-%, based on the total dry weight of the coating layer, wherein the polymeric binder is selected from the group consisting of polyacrylic acid, salts thereof, derivatives thereof, starch, proteins, styrene butadiene latices, polyvinyl alcohol, polyvinyl acetate and mixtures thereof, and iii) at least one oxygen scavenger in an amount from 25 to 70 wt.-%, based on the total dry weight of the coating layer, wherein the at least one oxygen scavenger is selected from the group consisting of gallic acid derivatives, digallic acid derivatives, protocatechuic acid derivatives, caffeic acid derivatives, 5-hydroxyferulic acid derivatives, gentisic acid derivatives, orsellinic acid derivatives, chebulic acid derivatives, phloroglucinol carboxylic acid derivatives, chicoric acid derivatives, and mixtures thereof, even more preferably the at least one oxygen scavenger is a gallic acid derivative, wherein the acid derivatives are essentially fully deprotonated acids of the respective acid and comprise a cation selected from the group consisting of sodium, potassium, calcium, magnesium and mixtures thereof, most a calcium cation, and a2) a substrate layer, and b) an alkaline component comprising a base being selected from the group consisting of lithium hydroxide, sodium hydroxide, potassium hydroxide, lithium carbonate, sodium carbonate, potassium carbonate, caesium carbonate and mixtures thereof, preferably an aqueous alkaline component.

The Inventive Uses

An eighth aspect of the present invention relates to the use of the inventive kit and/or the inventive activated sheet-like element in a food packaging. A ninth aspect of the present invention relates to the use of the inventive kit or the inventive activated sheet-like element for prolonging food shelf life.

It is appreciated that the kit, the activated sheet-like element and the food packaging are as described hereinabove.

As described in detail hereinabove, the inventive activated sheet-like element loaded with the alkaline component efficiently and quickly scavenges oxygen from the headspace atmosphere of the food packaging. The presence of oxygen may be associated with an increased growth of pathogenic microorganisms, in particular bacteria, fungi, and molds, e.g., *Campylobacter jejuni, Escherichia coli, Listeria monocytogenes, Salmonella* spp., *Salmonella enterica, Listeria innocua, Lactobacillus sakei, Bronchotrix thermosphacta, Clostridium perfringens, Clostridium botulinum, Campylobacter* spp., *Staphylococcus aureus, Streptococcus, Norovirus, Toxoplasma gondii, Cyclospora* spp., *Bacillus cereus, Cronobacter sakazakii, Shigella* spp., *Vibrio* spp., *Vibrio cholerae, Vibrio parahaemolyticus, Vibrio vulnificus, Yersinia enterocolitica, Yersinia pseudotuberculosis, Brucella* spp., *Corynebacterium ulcerans, Coxiella burnetii, Plesiomonas shigelloides, Aeromonas hydrophila, Aeromonas caviae, Aeromonas sobria, Rhizopus stolonifer, Penicillium commune, Aspergillus parasiticus, Aspergillus flavus, Alternaria* spp., *Fusarium moniliforme, Cephalosporium, Fusarium, Myrothecium, Stachybotrys*, and *Trichoderma*, Hepatitis A, *Cyclospora cayetanensis*, and *Trichinella spiralis*. The presence of oxygen may also lead to decomposition of flavors by oxidation or to rancidification and to the discoloration of food products, e.g., a decrease in redness of meat products. The discoloration is especially relevant when the foodstuff is stored under illumination. Said negative effects of the presence of oxygen compromise the edibility as well as appearance, texture and taste, and therefore, also compromise consumer acceptance, which in turn limits or reduces the food shelf life. The oxygen scavenging activity, for example, also prevents or reduces vitamin C degradation in juices, like orange juice.

The inventive activated sheet-like element comprises the oxygen scavenger in an amount sufficient for obtaining the desired reduction of oxygen in the food packaging. The skilled person will adjust, e.g., the size of the sheet-like element, the composition and the amount of the coating layer present on the substrate layer, and the amount of the base loaded onto the inventive sheet-like element as taught herein in order to obtain the desired effect in the food packaging.

For example, the respective amounts may be adjusted such that the at least one oxygen scavenger is present within the food packaging in an amount from 0.0005 to 10 mg/$cm^3$ headspace, preferably from 0.001 to 5 mg/$cm^3$ headspace, more preferably from 0.005 to 2 mg/$cm^3$ headspace or from 0.01 to 1 mg/$cm^3$ headspace. Additionally or alternatively, the respective amounts may be adjusted such that the coating layer is present from 0.05 to 10 $cm^2$/$cm^3$ headspace, preferably from 0.1 to 5 $cm^2$/$cm^3$ headspace, more preferably from 0.2 to 2 $cm^2$/$cm^3$ headspace, e.g., about 0.25 $cm^2$/$cm^3$ headspace. For the purposes of the present invention, the "headspace" of a food packaging is considered to be the amount of gas (e.g., air or modified atmosphere) present in the food packaging.

Preferably, the foodstuff is stored at common temperatures for the storage of cooled or refrigerated foodstuffs, that is, from 0° C. to 14° C., preferably from 3 to 10° C., more preferably from 4 to 7° C., e.g., at 7±1° C. However, the foodstuff may also be stored at room temperature, that is, from 15° C. to 30° C., preferably from 18° C. to 25° C., for example from 18° C. to 22° C. Thus, the shelf life of the foodstuff in the food packaging can be extended.

In a preferred embodiment of the present invention, the inventive activated sheet-like element scavenges at least 90%, preferably at least 95% of oxygen from the headspace of a food packaging within 12 h at 20±2° C.

In another preferred embodiment of the present invention, the inventive activated sheet-like element scavenges at least 90%, preferably at least 95% of oxygen from the headspace of a food packaging within 48 hours, preferably within 24 hours, more preferably within 12 h and most preferably within 6 hours at 4±2° C.

In another preferred embodiment, the inventive activated sheet-like element is used for keeping the oxygen content within the headspace of a food packaging below 0.5 vol.-%, preferably below 0.2 vol.-%, more preferably below 0.1 vol.-% during storage for at least 21 days.

In yet another embodiment of the present invention, the inventive activated sheet-like element is used in combination with modified atmosphere packaging as described above in order to achieve a synergistic oxygen scavenging effect and a synergistic effect on the shelf life extension. Thus, in a particularly preferred embodiment of the present invention, the inventive activated sheet-like element scavenges at least 90%, preferably at least 95% of residual oxygen from the modified atmosphere headspace of a food packaging within 12 h at 20±2° C.

In another preferred embodiment, the inventive activated sheet-like element is used for keeping the oxygen content within the modified atmosphere headspace of a food packaging below 0.5 vol.-%, preferably below 0.2 vol.-%, more preferably below 0.1 vol.-% during storage for at least 21 days.

The scope and interest of the invention will be better understood based on the following examples which are intended to illustrate certain embodiments of the present invention and are non-limitative.

EXAMPLES

Materials and Methods

Gallic acid was purchased from Acros Organics as monohydrate. Acronal 500D was purchased from BASF.

SRCC: SRCC was obtained by preparing 350 litres of an aqueous suspension of ground calcium carbonate in a mixing vessel by adjusting the solids content of a ground limestone calcium carbonate from Omya SAS, Orgon having a mass based median particle size of 1.3 μm, as determined by sedimentation, such that a solids content of 10 wt.-%, based on the total weight of the aqueous suspension, is obtained.

Whilst mixing the slurry at a speed of 6.2 m/s, 11.2 kg phosphoric acid was added in form of an aqueous solution containing 30 wt.-% phosphoric acid to said suspension over a period of 20 minutes at a temperature of 70° C. After the addition of the acid, the slurry was stirred for additional 5 minutes, before removing it from the vessel and drying using a jet-dryer.

The SRCC had a volume median particle size of 6.6 μm, a volume-based top cut ($d_{98}$) of 14.5 μm, a BET specific surface area of 60 $m^2$/g, and an intra-particle intruded specific pore volume of 0.939 $cm^3$/g (for the pore diameter range of 0.004 to 0.51 μm) was used as the particulate filler.

Untreated calcium carbonate 1: marble from Italy; $d_{50}$ (vol)=1.83 μm, $d_{98}$(vol)=7 μm (Malvern 3000; dry).

Dispersant: $A^{100}$% sodium neutralised polyacrylate dispersing agent with a molecular weight MW of about 4500 g/mol and a polydispersity index IP of 1.6 (2 g, 42% solid content)

Binder: Acronal 500D: Polyacrylate binder (15 g, 46 wt.-% solid content).

Coating Formulation Preparation

Gallic acid (50 g, 0.26 mol) was suspended in water (978 mL) and untreated calcium carbonate 1 (13 g, 0.13 mol) was slowly added. The mixture was stirred for 15 min. The dispersant (2 g) was added and the SRCC (50 g) was step by step dispersed into the formulation. The pH of the binder (15 g) was adjusted to pH 8.5 and was added into the previous formulation. The coating formulation was stirred for 15 more minutes until use. Typically, the coating formulation is characterized by a solids content of 40%, pH 6.2, viscosity of 170 mPas (100 RPM).

Preparation of the Sheet-Like Element Precursor

Hand Made

PET folio (Hostaphan RN 100, 100 microns, PützFolien) was coated with a K303 Multicoater from the company Erichsen using a Rod type 9, with a speed set to 5. The sample were dried with IR and Air dryer (set to 110° C.) to obtain a coating of 55 g/$m^2$.

The total intruded specific pore volume of the coating layer was determined to be 0.232 $cm^3$/g.

Machine

PET folio (Hostaphan RN 100, 100 microns, PützFolien) was coated with a Durrer coating machine (see FIG. 2). To apply the coating formulation, the following parameters were used: Rod C50, rod pressure (1 bar), IR and Air dryer (set to 150° C.) and a speed of 5 m/m in. The coating was applied with 30 g/$m^2$.

Example 1—Oxygen Scavenging Activity (OSA) of the Sheet-Like Elements Activated with Different Aqueous Alkaline Components A sheet-like element comprising the Gallic acid-based coating layer at a coating weight of 22 $g/m^2$ was produced following the machine coating method described above and cut into rectangular pieces of 6×11 cm. The sheet-like elements were separately packed with a tray sealer T200 (MULTIVAC (Hünenberg, Switzerland) in empty high barrier trays (PS-EVOH-PE with peel, 0.5 mm, 204×147 mm, 14 mm height, Stäger & Co AG, Muri, Switzerland; volume of 350 $cm^3$) together with an oxygen sensor spot (type PSt 6, PreSens Precision Sensing GmbH, Regensburg, Germany) under an atmosphere containing 98 vol.-% $N_2$ and 2 vol.-% $O_2$. A glass petri dish containing water was also added to the tray in order to provide a relative humidity of approx. 100%. The headspace volume was set to 250 $cm^3$ by the addition of glass beads. The relative humidity was monitored by a humidity meter (testo 174H, Testo SE & Co. KGaA, Lenzkirch, Germany).

Prior to sealing, different aqueous alkaline solutions (130 µL±10 µL each) were added to each sheet-like element via an E2 EUR spray tablesystem (Nordson EFD). The packed and sealed trays were stored at 21° C. and the oxygen concentration was measured non-destructively using a fibre optic Fibox 4 trace (PreSens Precision Sensing GmbH, Regensburg, Germany). Each measurement was performed in quadruplicate. The results were averaged and are summarized in Table 1 and FIG. 1. The oxygen scavenging rate OSR refers to the total amount of oxygen scavenged (in mL) during the time of measurement (in days) per gram of calcium gallate (CGA).

TABLE 1

OSA of the sheet-like elements activated with different aqueous alkaline components.

| Aqueous alkaline component | | | OSA | |
|---|---|---|---|---|
| | | | OSR | Time to reduce $O_2$ concentration |
| Base | Amount | pH value | [mL $O_2$/(d $g_{CGA}$)] | to below 0.01% [h] |
| $K_2CO_3$ | 0.1M | 11.32 | 4.07 | >1142.0[a] |
| $K_2CO_3$ | 0.5M | 11.75 | 29.12 | 11.14 |
| $K_2CO_3$ | 1.0M | 12.02 | 43.66 | 5.92 |
| $Na_2CO_3$ | 0.1M | 11.23 | 6.40 | >282.3[b] |
| $Na_2CO_3$ | 0.5M | 11.57 | 30.83 | 9.69 |
| $Na_2CO_3$ | 1.0M | 11.71 | 24.30 | 6.92 |
| NaOH | 0.1M | 12.94 | 2.17 | >1142.0[c] |
| NaOH | 0.5M | 13.49 | 18.65 | 61.22 |
| NaOH | 1.0M | 13.68 | 17.68 | 19.33 |

[a]residual oxygen content after 1142 h: 0.23 vol.-%,
[b]residual oxygen content after 282.3 h: 0.053 vol.-%,
[c]residual oxygen content after 1142 h: 0.37 vol.-%.

The sheet-like elements were able to efficiently scavenge oxygen from the surrounding headspace once activated with a sufficiently high amount of base (in Example 1 more than 4 mol-%, relative to the oxygen scavenger). The best results were achieved with potassium carbonate, which scavenged essentially all oxygen present within the tray in less than 6 h.

Example 2—Influence of the Amount of Alkaline Aqueous Solution on the OSA

The trials of example 1 using 1 M K2CO3 were repeated, except that different amounts of the aqueous alkaline component were applied onto the sheet-like element. The results are summarized in Table 2.

TABLE 2

Oxygen Content over time with different amounts of base at a temperature of 21° C.

| Amount of 1M | Oxygen content [vol.- %] after | | | | |
|---|---|---|---|---|---|
| $K_2CO_3$ | 0 h | 1 h | 3 h | 6 h | 10 h |
| 112 µl | 2.134 | 0.999 | 0.207 | 0.001 | n.d. |
| 116 µl | 2.050 | 1.043 | 0.248 | 0.008 | n.d. |
| 131 µl | 2.068 | 1.047 | 0.218 | 0.010 | n.d. |
| 158 µl | 2.050 | 1.324 | 0.543 | 0.156 | 0.007 |
| 165 µl | 2.132 | 1.368 | 0.572 | 0.150 | 0.013 |
| 187 µl | 2.108 | 1.453 | 0.642 | 0.174 | 0.012 |
| 204 µl | 2.117 | 1.394 | 0.591 | 0.159 | 0.013 |

The results show that the amount of the aqueous alkaline component only slightly affects the oxygen scavenging rate.

Example 3—OSA of the Activated Sheet-Like Elements Under Different Environmental Conditions The trials of example 1 using 1 M K2CO3 were repeated, except that a petri dish containing a saturated solution of magnesium chloride was placed inside the tray to provide a relative humidity of approx. 37%. The trays were stored at 21° C. and 5° C., respectively. The results are summarized in Table 3.

TABLE 3

OSA of the sheet-like elements activated with 1M $K_2CO_3$ at 37% rH at different temperatures.

| Storage | Oxygen content [vol.- %] after | | | | | |
|---|---|---|---|---|---|---|
| Temperature | 0 h | 1 h | 3 h | 6 h | 12 h | 18 h |
| 21° C. | 2.108 | 1.192 | 0.410 | 0.200 | 0.171 | 0.156 |
| 5° C. | 2.848 | 1.752 | 1.251 | 0.839 | 0.527 | 0.479 |

As can be gathered, the activated sheet-like elements were able to reduce the amount of oxygen present within the trays to levels below 0.5 vol.-% at low relative humidity, even at lower temperatures, which are commonly employed for the storage of foodstuffs.

Example 4—OSA of the Activated Sheet-Like Elements Under MAP

The trials of example 1 using 1 M $K_2CO_3$ were repeated, except that the tray was packaged under modified atmosphere containing varying amounts of $CO_2$ and $N_2$ and 2 vol.-% 02. The results are summarized in Table 4.

TABLE 4

OSA of the activated sheet-like elements under MAP and at a temperature of 21° C.

| $CO_2$ amount | Oxygen content [vol.- %] after | | | | | | Time to reduce $O_2$ concentration to below |
|---|---|---|---|---|---|---|---|
| (vol.- %) | 0 h | 3 h | 12 h | 24 h | 36 h | 42 h | 0.01% [h] |
| 30 | 1.839 | 1.200 | 0.324 | 0.064 | 0.011 | 0.003 | 37 |
| 40 | 1.610 | 1.174 | 0.307 | 0.040 | >0.001 | n.d. | 31 |

It can be gathered that the activated sheet-like element maintains its oxygen scavenging activity in the presence of 30 vol.-% carbon dioxide, an amount commonly employed in MAP, and even at 40 vol.-% carbon dioxide.

Example 5—Application of the Activated Sheet-Like Elements to Processed Meat Products A sheet-like element comprising the coating layer at a coating weight of 23 $g/m^2$ was produced following the machine coating method described above and cut into pieces of 75 $cm^2$. The sheet-like element was packed into a tray containing different meat products (6 slices of cooked turkey ham, 4.5 slices of ham, or 5.5 slices of meat loaf (100±2.8 g each)), and having a residual headspace volume of 150 mL. The sheet-like element was activated by applying 150 μL of a 5M $K_2CO_3$ solution and the trays were sealed under an atmosphere containing 1 vol.-% $O_2$, 30 vol.-% $CO_2$ and $N_2$. After packaging, the samples were stored in darkness at 4° C. and a rH of 78%. After 24 h, the samples were stored under continuous illumination. All measurements were performed in triplicates. The packaging and measurement of oxygen content was performed as described in Example 1.

The color of the meat products was determined with a tristimulus colorimeter (Chroma Meter CR-410). Prior to usage, the instrument was calibrated against a white tile (Y=85.4, x=0.3176, y=0.3341). The CIE L*a*b* color space was used for the measurements. Per sample, at least 3 different packages were used to measure the lightness, redness and blueness (CIE values L*, a* and b* respectively) three times at one location each. The samples were measured with a lense (526 =8 mm) through the packaging film, on which the exact location of measurement was marked. The location of measurement was selected regarding the highest homogeneity of the visible meat in the package. Measurement at a location where the meat product has contact with the top foil of the package was avoided due to the distortion of the discoloration behavior of the meat product. Since CIE a* value (redness) gives the best correlation with the visual evaluation of the color of the meat products, the discoloration is described herein by the change of redness (Δa* value). Based on the results of the color measurement, the change in redness (Δa*) is calculated by using the following formula:

$$(\Delta a^* = a_t^* - a_{t=0}^*)$$

The results are summarized in Table 5.

TABLE 5

OSA of the activated sheet-like elements with processed meat products at a temperature of 4° C.

| Sample | Packaging | Oxygen content [vol.- %] after 4 h | 24 h | 21 d | Change in redness Δa* after 24 h | 48 h | 21 d |
|---|---|---|---|---|---|---|---|
| Cooked turkey ham | As described | 1.367 | 0.091 | 0.150 | 0.22 | 1.57 | −0.07 |
| | No sheet-like element | 1.612 | 1.621 | 0.090 | −0.19 | −4.04 | −5.56 |
| Ham | As described | 1.324 | 0.315 | 0.028 | 0.05 | −0.70 | −0.72 |
| | No sheet-like element | 1.372 | 1.456 | 0.025 | 0.17 | −6.53 | −6.32 |
| Meat loaf | As described | 1.264 | 0.160 | 0.068 | −0.32 | −1.15 | −0.95 |
| | No sheet-like element | 1.294 | 1.390 | 0.043 | −0.37 | −7.24 | −7.98 |

As can be gathered, the oxygen content in the headspace initially increased due to oxygen present in the meat samples. During the storage in dark conditions, the activated sheet-like elements efficiently scavenged oxygen from the headspace, whereas the oxygen content remained constant in the absence of the sheet-like elements during the same storage period. Thus, the activated sheet-like element efficiently prevented the discoloration of the meat products, as indicated by a loss of redness, during the 21 day storage period. The sheet-like elements were able to maintain low oxygen levels in the packaging for at least 21 days. It is noted that the oxygen content of the trays not containing the sheet-like element was also reduced once the meat samples were illuminated. However, the reduction of the oxygen content is believed to be due to microbial activity and in this case, indicates spoilage of the meat samples. Therefore, the activated sheet-like element efficiently prevented discoloration of meat products and prolonged its shelf-life under industrially relevant conditions.

Further aspects and embodiments of the invention are described in the following:

Aspect or Embodiment 1: A kit for improving food shelf life, comprising a) a sheet-like element component having a1) a coating layer comprising i) a particulate filler in an amount from 25 to 70 wt.-%, based on the total dry weight of the coating layer, wherein the particulate filler comprises a surface-reacted calcium carbonate in an amount of at least 50 wt.-%, based on the total amount of the particulate filler, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and wherein the surface-reacted calcium carbonate has a specific surface area in the range from 20 to 200 $m^2/g$, as measured by the BET method, ii) a polymeric binder in an amount from 5 to 25 wt.-%, based on the total dry weight of the coating layer, and iii) at least one oxygen scavenger in an amount from 25 to 70 wt.-%, based on the total dry weight of the coating layer, wherein the at least one oxygen scavenger is a compound having at least one phenyl ring bearing at least two phenolic hydroxyl groups and at least one group R, wherein two of the at least two phenolic hydroxyl groups are arranged on the at least one phenyl ring in an ortho or para fashion relative to each other, and wherein R is selected from the group consisting of a hydrogen atom, a hydroxyl group, an alkoxy group, an aryloxy group, an amino group, an alkyl group, an aryl group and a —Y—$R^1$ group, preferably wherein R is a —Y—$R^1$ group, wherein —Y is selected from the group consisting of a direct bond, a linear or branched alkylene group having from 1 to 6 carbon atoms, and a —CH═CH— group, preferably Y is a direct bond, and —$R^1$ is an alkoxycarbonyl group, an aryloxycarboxyl group or an essentially fully deprotonated carboxyl group, and a2) a substrate layer, and b) an alkaline component comprising a base having a $pK_b$ value of 6 or lower.

2. The kit of embodiment 1, wherein the sheet-like element component comprises a coating layer having a total intruded specific pore volume in the range from 0.1 to 1.5 $cm^3/g$, preferably from 0.1 to 1.0 $cm^3/g$, as measured by mercury intrusion porosimetry, and/or having a total intra particle intruded specific pore volume in the range from 0.05 to 1.0 $cm^3/g$, preferably from 0.08 to 0.5 $cm^3/g$, and more preferably from 0.1 to 0.4 $cm^3/g$, as measured by mercury intrusion porosimetry, and/or having a total inter particle intruded specific pore volume in the range from 0.05 to 0.5 $cm^3/g$, preferably from 0.08 to 0.4 $cm^3/g$, and more preferably from 0.1 to 0.3 $cm^3/g$, as measured by mercury intrusion porosimetry, and/or having a total occlusion intruded specific pore volume in the range from 0.05 to 0.4 $cm^3/g$, preferably from 0.08 to 0.3 $cm^3/g$, and more preferably from 0.1 to 0.2 $cm^3/g$, as measured by mercury intrusion porosimetry, and/or being present on the substrate layer in an amount from 1 to 200 $g/m^2$, preferably 2 to 150 $g/m^2$, more preferably 10 to 120 $g/m^2$.

3. The kit of any of the preceding embodiments, wherein the coating layer comprises the polymeric binder in an amount from 10 to 20 wt.-%, based on the total dry weight of the coating layer, and/or the particulate filler in an amount from 30 to 60 wt.-%, based on the total dry weight of the coating layer, and/or the oxygen scavenger in an amount from 30 to 60 wt.-%, based on the total dry weight of the coating layer.

4. The kit of any of the preceding embodiments, wherein the particulate filler comprises the surface-reacted calcium carbonate in an amount of at least 70 wt.-%, preferably at least 90 wt.-%, based on the total weight of the at least one particulate filler, and most preferably the particulate filler consists of the surface-reacted calcium carbonate, and wherein any optionally present further particulate filler material is selected from the group consisting of dolomite, ground calcium carbonate, precipitated calcium carbonate, magnesium hydroxide, talc, gypsum, titanium dioxide, kaolin, silicate, mica, barium sulphate, calcined clay, non-calcined (hydrous) clay, bentonite and mixtures thereof, and preferably is selected from the group consisting of ground calcium carbonate, precipitated calcium carbonate and mixtures thereof, and most preferably wherein the particulate filler consists of the optionally present further particulate filler material and the surface-reacted calcium carbonate.

5. The kit of any of the preceding embodiments, wherein the surface-reacted calcium carbonate has a specific surface area in the range from 50 to 120 $m^2/g$, as measured by the BET method, and/or has a total intra particle intruded specific pore volume in the range from 0.1 to 2.5 $cm^3/g$, preferably from 0.2 to 2.2 $cm^3/g$, more preferably from 0.4 to 2.0 $cm^3/g$ and most preferably from 0.6 to 1.8 $cm^3/g$, as measured by mercury intrusion porosimetry.

6. The kit of any of the preceding embodiments, wherein the at least one oxygen scavenger is selected from the group consisting of phenolic acid derivatives bearing at least two phenolic hydroxyl groups arranged ortho or para relative to each other, cinnamic acid derivatives bearing at least two phenolic hydroxyl groups arranged ortho or para relative to each other, and mixtures thereof, preferably wherein the at least one oxygen scavenger is selected from the group consisting of gallic acid derivatives, digallic acid derivatives, protocatechuic acid derivatives, caffeic acid derivatives, 5-hydroxyferulic acid derivatives, gentisic acid derivatives, orsellinic acid derivatives, chebulic acid derivatives, phloroglucinol carboxylic acid derivatives, chicoric acid derivatives, and mixtures thereof, even more preferably the at least one oxygen scavenger is a gallic acid derivative, wherein the acid derivatives are selected from the group consisting of alkyl esters, aryl esters and essentially fully deprotonated acids of the respective acid, and most preferably the at least one oxygen scavenger is an essentially fully deprotonated gallic acid, and/or the at least one oxygen scavenger comprising an essentially fully deprotonated carboxyl group comprises a cation selected from the group consisting of ammonium, sodium, lithium, potassium, cesium, magnesium, calcium and mixtures thereof, preferably wherein the at least one oxygen scavenger comprises a cation selected from the group consisting of sodium, potassium, calcium, magnesium and mixtures thereof and most preferably wherein the at least one oxygen scavenger comprises a calcium cation.

7. The kit of any of the preceding embodiments, wherein the polymeric binder is selected from the group consisting of polyacrylic acid, salts thereof, derivatives thereof, starch, proteins, styrene butadiene latices, polyvinyl alcohol, polyvinyl acetate and mixtures thereof, preferably wherein the polymeric binder is selected from polyacrylic acid, salts thereof, derivatives thereof and mixtures thereof.

8. The kit of any of the preceding embodiments, wherein the substrate layer comprises one or more individual substrate layers selected from the group consisting of polymer material layers, preferably made from polyethylene, polypropylene, polyethylene terephthalate, polylactic acid, polyhydroxybutyrate, polyethylene-2,5-furandicarboxylate, polystyrene or mixtures thereof, fibrous material layers, preferably made from cellulose acetate, viscose, polypropylene, polyethylene terephthalate, polylactic acid, or mixtures thereof, paper layers, cardboard layers, textile layers, nonwoven layers, layers made from bio-based materials, wood layers, bamboo layers, metal foil layers, aluminum layers, print receptive coating layers, and mixtures of the foregoing, wherein the one or more individual substrate layers optionally have been subjected to a corona treatment, and wherein preferably the one or more individual substrate layers is selected from polymer material layers.

9. The kit of any of the preceding embodiments, wherein the sheet-like element component further comprises one or more adhesive layers, being located on the substrate layer on the opposite side of the coating layer and/or between the individual substrate layers, wherein the adhesive layer preferably is selected from the group consisting of adhesives, sealants, rubber coatings, pressure-sensitive layers and mixtures of the foregoing; and/or one or more primer layers, being located between the substrate layer and the coating layer, and/or one or more oxygen-permeable covering layers to cover the coating layer, preferably selected from the group consisting of oxygen-permeable film layers, fibrous material layers and nonwoven fabric layers, and/or one or more protective layers to temporarily seal the coating layer, and/or the adhesive layer, preferably selected from polyethylene, polypropylene and/or coated paper.

10. The kit of any of the preceding embodiments, wherein the alkaline component comprises a base selected from the group consisting of hydroxide bases, carbonate bases, ammonia bases and mixtures thereof, preferably is selected from the group consisting of lithium hydroxide, sodium hydroxide, potassium hydroxide, lithium carbonate, sodium carbonate, potassium carbonate, caesium carbonate and mixtures thereof, and most preferably is selected from the group consisting of sodium hydroxide, potassium carbonate and sodium carbonate.

11. The kit of any of the preceding embodiments, wherein the alkaline component is an aqueous alkaline component comprising the base and water, wherein preferably the pH of the aqueous alkaline component is at least 8, more preferably at least 10, even more preferably at least 11, and most preferably at least 12, and/or the aqueous alkaline component comprises the base in an amount from 1 wt.-% to 75 wt.-%, more preferably 5 wt.-% to 60 wt.-%, and most preferably from 10 to 35 wt.-%, based on the total weight of the aqueous alkaline component.

Aspect or Embodiment 12. An activated sheet-like element formed from the kit of any of the preceding embodiments by adding to the coating layer of the sheet-like element component the alkaline component, wherein the activated sheet-like element comprises reaction products of the at least one oxygen scavenger with the base, wherein preferably the alkaline component is added in an amount such that the base is added in an amount of at least 0.01 molar equivalents, preferably at least 0.02 molar equivalents, more preferably at least 0.05 molar equivalents and even more preferably at least 0.1 molar equivalents, based on the molar amount of the oxygen scavenger, and/or the alkaline component is added in an amount from 10 to 70 wt.-%, preferably 20 to 65 wt.-% and more preferably from 35 to 60 wt.-%, based on the total weight of the coating layer.

Aspect or Embodiment 13. A process for the manufacture of a kit for improving food shelf life, the process comprising the steps of:

a) providing a particulate filler comprising a surface-reacted calcium carbonate in an amount of at least 50 wt.-%, based on the total amount of the particulate filler, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and wherein the surface-reacted calcium carbonate has a specific surface area in the range from 20 to 200 $m^2/g$, preferably 50 to 120 $m^2/g$, as measured by the BET method, b) providing at least one oxygen scavenger being a compound having at least one phenyl ring bearing at least two phenolic hydroxyl groups and at least one group R, wherein two of the at least two phenolic hydroxyl groups are positioned on the at least one phenyl ring in an ortho or para fashion relative to each other, and wherein R is selected from the group consisting of a hydrogen atom, a hydroxyl group, an alkoxy group, an aryloxy group, an amino group, an alkyl group, an aryl group and a —Y—$R^1$ group, preferably wherein R is a —Y—$R^1$ group, wherein —Y is selected from the group consisting of a direct bond, a linear or branched alkylene group having from 1 to 6 carbon atoms, and a —CH═CH— group, preferably Y is a direct bond, and —$R^1$ is an alkoxycarbonyl group, an aryloxycarboxyl group or an essentially fully deprotonated carboxyl group, c) providing a polymeric binder, d) providing a substrate layer comprising one or more individual substrate layers or a food packaging comprising the substrate layer, e) mixing, in the order set out herein, the oxygen scavenger of step b), the particulate filler of step a) and the polymeric binder of step c) to obtain a coating composition, f) applying the coating composition of step e) onto the substrate layer of step d) to obtain a sheet-like element precursor, g) drying the sheet-like element precursor obtained in step f) to obtain a sheet-like element component, h) providing an alkaline component comprising a base having a $pK_b$ value of 6 or lower, and optionally i) mixing the alkaline component of step h) with water to obtain an aqueous alkaline component comprising the base and water, wherein preferably the pH of the aqueous alkaline component is at least 8, more preferably at least 10, even more preferably at least 11, and most preferably at least 12 and/or the aqueous alkaline component comprises the base in an amount from 1 wt.-% to 75 wt.-%, more preferably 5 wt.-% to 60 wt.-%, and most preferably 10 to 35 wt.-%, based on the total weight of the aqueous alkaline component.

Aspect or Embodiment 14. A process for the manufacture of a sheet-like element component, the process comprising the steps of:

a) providing a particulate filler comprising a surface-reacted calcium carbonate in an amount of at least 50 wt.-%, based on the total amount of the particulate filler, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and wherein the surface-reacted calcium carbonate has a specific surface area in the range from 20 to 200 $m^2/g$, preferably 50 to 120 $m^2/g$, as measured by the BET method, b) providing at least one oxygen scavenger being a compound having at least one phenyl ring bearing at least two phenolic hydroxyl groups and at least one group R, wherein two of the at least two phenolic hydroxyl groups are positioned on the at least one phenyl ring in an ortho or para fashion relative to each other, and wherein R is a —Y—$R^1$ group, wherein —Y is selected from the group consisting of a direct bond, a linear or branched alkylene group having from 1 to 6 carbon atoms, and a —CH═CH— group, preferably Y is a direct bond, and —$R^1$ is an essentially fully deprotonated carboxyl group c) providing a polymeric binder, d) providing a substrate layer comprising one or more individual substrate layers or a food packaging comprising the substrate layer, e) mixing, in the order set out herein, the oxygen scavenger of step b), the particulate filler of step a), and the polymeric binder of step c) to obtain a coating composition, f) applying the coating composition of step e) onto the substrate layer of step d) to obtain a sheet-like element precursor, and g) drying the sheet-like element precursor obtained in step f) to obtain a sheet-like element component, wherein step b) of providing the at least one oxygen scavenger comprises the sub-steps of b1) providing at least one oxygen scavenger precursor being a compound having at least one phenyl ring bearing at least two phenolic hydroxyl groups and at least one group R, wherein two of the at least two phenolic hydroxyl groups are positioned on the at least one phenyl ring in an ortho or para fashion relative to each other, and wherein R is a —Y—$R^1$ group, wherein —Y is selected from the group consisting of a direct bond, a linear or branched alkylene group having from 1 to 6 carbon atoms, and a —CH═CH— group, preferably Y is a direct bond, and —R1 is a carboxyl group, b2) providing a basic compound, and b3) reacting the carboxyl group of the oxygen scavenger precursor of step b1) with the basic compound of step b2) to obtain the oxygen scavenger.

15. The process of embodiment 14, wherein the basic compound of step b2) is selected from the group consisting of carbonate bases, hydroxide bases, bicarbonate bases, amine bases and mixtures thereof, and more preferably is selected from the group consisting of sodium carbonate, sodium bicarbonate, sodium hydroxide, potassium carbonate, potassium bicarbonate, potassium hydroxide, calcium carbonate, calcium bicarbonate, calcium hydroxide, magnesium carbonate, magnesium bicarbonate, magnesium hydroxide, ammonia, and mixtures thereof, and most preferably is calcium carbonate.

16. The process of any one of embodiments 13 to 15, wherein mixing step e) is performed in the presence of a solvent, preferably water, and/or application step f) is performed by means of roller coating, dip coating, grooved rod coating, curtain coating, stiff blade coating, applicator roll coating, fountain coating, jet coating, short dwell coating, slotted die coating, bent blade coating, bevel blade coating, air knife coating, bar coating, gravure coating, conventional or metering size press coating, spray application techniques, screen printing and/or wet stack coating, preferably roller coating, and/or drying step g) is performed at a temperature in the range from 50 to 150° C. at ambient pressure, or at reduced pressure, preferably by hot air drying, IR radiation drying or UV radiation drying.

17. The process of any one of embodiments 13 to 16, wherein the sheet-like element component comprises a coating layer having a total intruded specific pore volume in the range from 0.1 to 1.5 $cm^3/g$, preferably from 0.1 to 1.0 $cm^3/g$, as measured by mercury intrusion porosimetry, and/or having a total intra particle intruded specific pore volume in the range from 0.05 to 1.0 $cm^3/g$, preferably from 0.08 to 0.5 $cm^3/g$, and more preferably from 0.1 to 0.4 $cm^3/g$, as measured by mercury intrusion porosimetry, and/or having a total inter particle intruded specific pore volume in the range from 0.05 to 0.5 $cm^3/g$, preferably from 0.08 to 0.4 $cm^3/g$, and more preferably from 0.1 to 0.3 $cm^3/g$, as measured by mercury intrusion porosimetry, and/or having a total occlusion intruded specific pore volume in the range from 0.05 to 0.4 $cm^3/g$, preferably from 0.08 to 0.3 $cm^3/g$, and more preferably from 0.1 to 0.2 $cm^3/g$, as measured by mercury intrusion porosimetry, and/or being present on the substrate layer in an amount from 1 to 200 $g/m^2$, preferably 2 to 150 $g/m^2$, more preferably 10 to 120 $g/m^2$.

18. The process of any one of embodiments 13 to 17, wherein the coating layer comprises the polymeric binder in an amount from 10 to 20 wt.-%, based on the total dry weight of the coating layer, and/or the particulate filler in an amount from 30 to 60 wt.-%, based on the total dry weight of the coating layer, and/or the oxygen scavenger in an amount from 30 to 60 wt.-%, based on the total dry weight of the coating layer.

19. The process of any one of embodiments 13 to 18, wherein the particulate filler comprises the surface-reacted calcium carbonate in an amount of at least 70 wt.-%, preferably at least 90 wt.-%, based on the total weight of the at least one particulate filler, and most preferably the particulate filler consists of the surface-reacted calcium carbonate, and wherein any optionally present further particulate filler material is selected from the group consisting of dolomite, ground calcium carbonate, precipitated calcium carbonate, magnesium hydroxide, talc, gypsum, titanium dioxide, kaolin, silicate, mica, barium sulphate, calcined clay, non-calcined (hydrous) clay, bentonite and mixtures thereof, and preferably is selected from the group consisting of ground calcium carbonate, precipitated calcium carbonate and mixtures thereof, and most preferably wherein the particulate filler consists of the optionally present further particulate filler material and the surface-reacted calcium carbonate.

20. The process of any one of embodiments 13 to 19, wherein the surface-reacted calcium carbonate has a specific surface area in the range from 50 to 120 $m^2/g$, as measured by the BET method, and/or has a total intra particle intruded specific pore volume in the range from 0.1 to 2.5 $cm^3/g$, preferably from 0.2 to 2.2 $cm^3$/g, more preferably from 0.4 to 2.0 $cm^3$/g and most preferably from 0.6 to 1.8 $cm^3$/g, as measured by mercury intrusion porosimetry.

21. The process of any one of embodiments 13 to 20, wherein the at least one oxygen scavenger is selected from the group consisting of phenolic acid derivatives bearing at least two phenolic hydroxyl groups arranged ortho or para relative to each other, cinnamic acid derivatives bearing at least two phenolic hydroxyl groups arranged ortho or para relative to each other, and mixtures thereof, preferably wherein the at least one oxygen scavenger is selected from the group consisting of gallic acid derivatives, digallic acid derivatives, protocatechuic acid derivatives, caffeic acid derivatives, 5-hydroxyferulic acid derivatives, gentisic acid derivatives, orsellinic acid derivatives, chebulic acid derivatives, phloroglucinol carboxylic acid derivatives, chicoric acid derivatives, and mixtures thereof, even more preferably the at least one oxygen scavenger is a gallic acid derivative, wherein the acid derivatives are selected from the group consisting of alkyl esters, aryl esters and essentially fully deprotonated acids of the respective acid, and most preferably the at least one oxygen scavenger is an essentially fully deprotonated gallic acid, and/or the at least one oxygen scavenger comprising an essentially fully deprotonated carboxyl group comprises a cation selected from the group consisting of ammonium, sodium, lithium, potassium, cesium, magnesium, calcium and mixtures thereof, preferably wherein the at least one oxygen scavenger comprises a cation selected from the group consisting of sodium, potassium, calcium, magnesium and mixtures thereof and most preferably wherein the at least one oxygen scavenger comprises a calcium cation.

22. The process of any one of embodiments 13 to 21, wherein the polymeric binder is selected from the group consisting of polyacrylic acid, salts thereof, derivatives thereof, starch, proteins, styrene butadiene latices, polyvinyl alcohol, polyvinyl acetate and mixtures thereof, preferably wherein the polymeric binder is selected from polyacrylic acid, salts thereof, derivatives thereof and mixtures thereof.

23. The process of any one of embodiments 13 to 22, wherein the substrate layer comprises one or more individual substrate layers selected from the group consisting of polymer material layers, preferably made from polyethylene, polypropylene, polyethylene terephthalate, polylactic acid, polyhydroxybutyrate, polyethylene-2,5-furandicarboxylate, polystyrene or mixtures thereof, fibrous material layers, preferably made from cellulose acetate, viscose, polypropylene, polyethylene terephthalate, polylactic acid, or mixtures thereof, paper layers, cardboard layers, textile layers, nonwoven layers, layers made from bio-based materials, wood layers, bamboo layers, metal foil layers, aluminum layers, print receptive coating layers, and mixtures of the foregoing, wherein the one or more individual substrate layers optionally have been subjected to a corona treatment, and wherein preferably the one or more individual substrate layers is selected from polymer material layers.

24. The process of any one of embodiments 13 to 23, wherein the sheet-like element component further comprises one or more adhesive layers, being located on the substrate layer on the opposite side of the coating layer and/or between the individual substrate layers, wherein the adhesive layer preferably is selected from the group consisting of adhesives, sealants, rubber coatings, pressure-sensitive layers and mixtures of the foregoing; and/or one or more primer layers, being located between the substrate layer and the coating layer, and/or one or more oxygen-permeable covering layers to cover the coating layer, preferably selected from the group consisting of oxygen-permeable film layers, fibrous material layers and nonwoven fabric layers, and/or one or more protective layers to temporarily seal the coating layer, and/or the adhesive layer, preferably selected from polyethylene, polypropylene and/or coated paper.

25. The process of any one of embodiments 13 to 24, wherein the alkaline component comprises a base selected from the group consisting of hydroxide bases, carbonate bases, ammonia bases and mixtures thereof, preferably is selected from the group consisting of lithium hydroxide, sodium hydroxide, potassium hydroxide, lithium carbonate, sodium carbonate, potassium carbonate, caesium carbonate and mixtures thereof, and most preferably is selected from the group consisting of sodium hydroxide, potassium carbonate and sodium carbonate.

26. The process of any one of embodiments 13 to 25, wherein the alkaline component is an aqueous alkaline component comprising the base and water, wherein preferably the pH of the aqueous alkaline component is at least 8, more preferably at least 10, even more preferably at least 11, and most preferably at least 12, and/or the aqueous alkaline component comprises the base in an amount from 1 wt.-% to 75 wt.-%, more preferably 5 wt.-% to 60 wt.-%, and most preferably from 10 to 35 wt.-%, based on the total weight of the aqueous alkaline component.

Aspect or Embodiment 27. An activated sheet-like element formed from the kit of any of the preceding embodiments by adding to the coating layer of the sheet-like element component the alkaline component, wherein the activated sheet-like element comprises reaction products of the at least one oxygen scavenger with the base, wherein preferably the alkaline component is added in an amount such that the base is added in an amount of at least 0.01 molar equivalents, preferably at least 0.02 molar equivalents, more preferably at least 0.05 molar equivalents and even more preferably at least 0.1 molar equivalents, based on the molar amount of the oxygen scavenger, and/or the alkaline component is added in an amount from 10 to 70 wt.-%, preferably 20 to 65 wt.-% and more preferably from 35 to 60 wt.-%, based on the total weight of the coating layer.

28. An activated sheet-like element according to embodiment 27, wherein the alkaline component comprises a base selected from the group consisting of hydroxide bases, carbonate bases, ammonia bases and mixtures thereof, preferably is selected from the group consisting of lithium hydroxide, sodium hydroxide, potassium hydroxide, lithium carbonate, sodium carbonate, potassium carbonate, caesium carbonate and mixtures thereof, and most preferably is selected from the group consisting of sodium hydroxide, potassium carbonate and sodium carbonate.

Aspect or Embodiment 29. A process for activating the sheet-like element of the kit of any one of embodiments 1 to 11, comprising the steps of j) mixing the alkaline component with water to obtain an aqueous alkaline component comprising the base and water, and k) applying the aqueous alkaline component onto at least a part of the surface of the coating layer, wherein preferably the alkaline component is added in an amount such that the base is added in an amount of at least 0.01 molar equivalents, preferably at least 0.02 molar equivalents, more preferably at least 0.05 molar equivalents, even more preferably at least 0.1 molar equivalents, based on the molar amount of the oxygen scavenger, and/or the alkaline component is added in an amount from 10 to 70 wt.-%, preferably 20 to 65 wt.-% and more preferably from 35 to 60 wt.-%, based on the total weight of the coating layer, and/or application step k) is performed by inkjet printing, spraying, coating, and/or dripping.

30. The process of embodiment 29, wherein the alkaline component comprises a base selected from the group consisting of hydroxide bases, carbonate bases, ammonia bases and mixtures thereof, preferably is selected from the group consisting of lithium hydroxide, sodium hydroxide, potassium hydroxide, lithium carbonate, sodium carbonate, potassium carbonate, caesium carbonate and mixtures thereof, and most preferably is selected from the group consisting of sodium hydroxide, potassium carbonate and sodium carbonate.

31. The kit of any one of embodiments 1 to 11, further comprising a supply device comprising the sheet-like element component, wherein the supply device preferably comprises a roll or a magazine, or a food packaging comprising the sheet-like element component, wherein the coating layer is present within the food packaging.

32. A supply device comprising the activated sheet-like element of embodiment 27 or 28, wherein the supply device protects the activated sheet-like element from oxygen and preferably comprises a roll, a stack, a magazine, or a packaging, such as a box.

Aspect or Embodiment 33. A food packaging comprising the activated sheet-like element of embodiment 27 or 28, wherein the coating layer is present within the food packaging.

Aspect or Embodiment 34. Use of a kit according to any one of embodiments 1 to 11 or an activated sheet-like element according to embodiment 27 or 28 in a food packaging.

Aspect or Embodiment 35. Use of a kit according to any one of embodiments 1 to 11 or an activated sheet-like element according to embodiment 27 or 28 for prolonging food shelf life.

The invention claimed is:

1. A kit for improving food shelf life, comprising a) a sheet-like element component having a1) a coating layer comprising i) a particulate filler in an amount from 25 to 70 wt.-%, based on the total dry weight of the coating layer, wherein the particulate filler comprises a surface-reacted calcium carbonate in an amount of at least 50 wt.-%, based on the total amount of the particulate filler, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and wherein the surface-reacted calcium carbonate has a specific surface area in the range from 20 to 200 m2/g, as measured by the BET method, ii) a polymeric binder in an amount from 5 to 25 wt.-%, based on the total dry weight of the coating layer, and iii) at least one oxygen scavenger in an amount from 25 to 70 wt.-%, based on the total dry weight of the coating layer, wherein the at least one oxygen scavenger is a compound having at least one phenyl ring bearing at least two phenolic hydroxyl groups and at least one group R, wherein two of the at least two phenolic hydroxyl groups are arranged on the at least one phenyl ring in an ortho or para fashion relative to each other, and wherein R is selected from the group consisting of a hydrogen atom, a hydroxyl group, an alkoxy group, an aryloxy group, an amino group, an alkyl group, an aryl group and a —Y—$R^1$ group, wherein Y is selected from the group consisting of a direct bond, a linear or branched alkylene group having from 1 to 6 carbon atoms, and a —CH═CH— group, and $R^1$ is an alkoxycarbonyl group, an aryloxycarboxyl group or an essentially fully deprotonated carboxyl group, and a2) a substrate layer, and b) an alkaline component comprising (i) a base having a $pK_b$ value of 6 or lower and (ii) water.

2. The kit of claim 1, wherein the coating layer of the sheet-like element component has a total intruded specific pore volume in the range from 0.1 to 1.5 $cm^3/g$, and/or a total intra particle intruded specific pore volume in the range from 0.05 to 1.0 $cm^3/g$, and/or a total inter particle intruded specific pore volume in the range from 0.05 to 0.5 $cm^3/g$, and/or a total occlusion intruded specific pore volume in the range from 0.05 to 0.4 $cm^3/g$, and wherein the coating layer is present on the substrate layer in an amount from 1 to 200 $g/m^2$.

3. The kit of claim 1, wherein the coating layer comprises the polymeric binder in an amount from 10 to 20 wt.-%, based on the total dry weight of the coating layer, and the particulate filler in an amount from 30 to 60 wt.-%, based on the total dry weight of the coating layer, and the oxygen scavenger in an amount from 30 to 60 wt.-%, based on the total dry weight of the coating layer.

4. The kit of claim 1, wherein the particulate filler comprises the surface-reacted calcium carbonate in an amount of at least 70 wt.-%, based on the total weight of the at least one particulate filler, and wherein any optionally present further particulate filler material is selected from the group consisting of dolomite, ground calcium carbonate, precipitated calcium carbonate, magnesium hydroxide, talc, gypsum, titanium dioxide, kaolin, silicate, mica, barium sulphate, calcined clay, non-calcined (hydrous) clay, bentonite and mixtures thereof.

5. The kit of claim 1, wherein the surface-reacted calcium carbonate has a specific surface area in the range from 50 to 120 $m^2/g$, as measured by the BET method, and has a total intra particle intruded specific pore volume in the range from 0.1 to 2.5 $cm^3/g$, as measured by mercury intrusion porosimetry.

6. The kit of claim 1, wherein the at least one oxygen scavenger is selected from the group consisting of phenolic acid derivatives bearing at least two phenolic hydroxyl groups arranged ortho or para relative to each other, cinnamic acid derivatives bearing at least two phenolic hydroxyl groups arranged ortho or para relative to each other, and mixtures thereof, wherein the acid derivatives are selected from the group consisting of alkyl esters, aryl esters and essentially fully deprotonated acids of the respective acid, and/or the at least one oxygen scavenger comprising an essentially fully deprotonated carboxyl group comprises a cation selected from the group consisting of ammonium, sodium, lithium, potassium, cesium, magnesium, calcium and mixtures thereof.

7. The kit of claim 1, wherein the polymeric binder is selected from the group consisting of polyacrylic acid, salts thereof, derivatives thereof, starch, proteins, styrene butadiene latices, polyvinyl alcohol, polyvinyl acetate and mixtures thereof.

8. The kit of claim 1, wherein the substrate layer comprises one or more individual substrate layers selected from the group consisting of polymer material layers, wherein the one or more individual substrate layers optionally have been subjected to a corona treatment.

9. The kit of claim 1, wherein the sheet-like element component further comprises one or more adhesive layers, being located on the substrate layer on the opposite side of the coating layer and/or between the individual substrate layers; and/or one or more primer layers, being located between the substrate layer and the coating layer, and/or one or more oxygen-permeable covering layers to cover the coating layer, and/or one or more protective layers to temporarily seal the coating layer, and/or the adhesive layer.

10. The kit of claim 1, wherein the alkaline component comprises a base selected from the group consisting of hydroxide bases, carbonate bases, ammonia bases and mixtures thereof.

11. The kit of claim 1, wherein the alkaline component is an aqueous alkaline component comprising the base and the water, wherein the pH of the aqueous alkaline component is at least 8.

12. An activated sheet-like element formed from the kit of claim 1 by adding to the coating layer of the sheet-like element component the alkaline component, wherein the activated sheet-like element comprises reaction products of the at least one oxygen scavenger with the base, wherein the alkaline component is added in an amount such that the base is added in an amount of at least 0.01 molar equivalents, based on the molar amount of the oxygen scavenger, and/or the alkaline component is added in an amount from 10 to 70 wt.-%, based on the total weight of the coating layer.

13. A process for the manufacture of a kit for improving food shelf life, the process comprising the steps of:

a) providing a particulate filler comprising a surface-reacted calcium carbonate in an amount of at least 50 wt.-%, based on the total amount of the particulate filler, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and wherein the surface-reacted calcium carbonate has a specific surface area in the range from 20 to 200 $m^2/g$, as measured by the BET method, b) providing at least one oxygen scavenger being a compound having at least one phenyl ring bearing at least two phenolic hydroxyl groups and at least one group R, wherein two of the at least two phenolic hydroxyl groups are positioned on the at least one phenyl ring in an ortho or para fashion relative to each other, and wherein R is selected from the group consisting of a hydrogen atom, a hydroxyl group, an alkoxy group, an aryloxy group, an amino group, an alkyl group, an aryl group and a —Y—$R^1$ group, wherein Y is selected from the group consisting of a direct bond, a linear or branched alkylene group having from 1 to 6 carbon atoms, and a —CH═CH— group, and $R^1$ is an alkoxycarbonyl group, an aryloxycarboxyl group or an essentially fully deprotonated carboxyl group, c) providing a polymeric binder, d) providing a substrate layer comprising one or more individual substrate layers or a food packaging comprising the substrate layer, e) mixing, in the order set out herein, the oxygen scavenger of step b), the particulate filler of step a) and the polymeric binder of step c) to obtain a coating composition, f) applying the coating composition of step e) onto the substrate layer of step d) to obtain a sheet-like element precursor, g) drying the sheet-like element precursor obtained in step f) to obtain a sheet-like element component, and h) providing an alkaline component comprising (i) a base having a $pK_b$ value of 6 or lower and (ii) water.

14. A process for the manufacture of a sheet-like element component, the process comprising the steps of:

a) providing a particulate filler comprising a surface-reacted calcium carbonate in an amount of at least 50 wt.-%, based on the total amount of the particulate filler, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donors treatment and/or is supplied from an external source, and wherein the surface-reacted calcium carbonate has a specific surface area in the range from 20 to 200 $m^2/g$, as measured by the BET method, b) providing at least one oxygen scavenger being a compound having at least one phenyl ring bearing at least two phenolic hydroxyl groups and at least one group R, wherein two of the at least two phenolic hydroxyl groups are positioned on the at least one phenyl ring in an ortho or para fashion relative to each other, and wherein R is a —Y—$R^1$ group, wherein Y is selected from the group consisting of a direct bond, a linear or branched alkylene group having from 1 to 6 carbon atoms, and a —CH≡CH— group, and $R^1$ is an essentially fully deprotonated carboxyl group c) providing a polymeric binder, d) providing a substrate layer comprising one or more individual substrate layers or a food packaging comprising the substrate layer, e) mixing, in the order set out herein, the oxygen scavenger of step b), the particulate filler of step a), and the polymeric binder of step c) to obtain a coating composition, f) applying the coating composition of step e) onto the substrate layer of step d) to obtain a sheet-like element precursor, and g) drying the sheet-like element precursor obtained in step f) to obtain a sheet-like element component, wherein step b) of providing the at least one oxygen scavenger comprises the sub-steps of b1) providing at least one oxygen scavenger precursor being a compound having at least one phenyl ring bearing at least two phenolic hydroxyl groups and at least one group R, wherein two of the at least two phenolic hydroxyl groups are positioned on the at least one phenyl ring in an ortho or para fashion relative to each other, and wherein R is a —Y—$R^1$ group, wherein Y is selected from the group consisting of a direct bond, a linear or branched alkylene group having from 1 to 6 carbon atoms, and a —CH≡CH— group, preferably abend, and R1 is a carboxyl group, b2) providing a basic compound, and b3) reacting the carboxyl group of the oxygen scavenger precursor of step b1) with the basic compound of step b2) to obtain the oxygen scavenger.

15. The process of claim 14, wherein the basic compound of step b2) is selected from the group consisting of carbonate bases, hydroxide bases, bicarbonate bases, amine bases and mixtures thereof.

16. The process of claim 13, wherein mixing step e) is performed in the presence of a solvent, preferably water, and/or application step f) is performed by means of roller coating, dip coating, grooved rod coating, curtain coating, stiff blade coating, applicator roll coating, fountain coating, jet coating, short dwell coating, slotted die coating, bent blade coating, bevel blade coating, air knife coating, bar coating, gravure coating, conventional or metering size press coating, spray application techniques, screen printing and/or wet stack coating, and/or drying step g) is performed at a temperature in the range from 50 to 150° C. at ambient pressure, or at reduced pressure.

17. A process for activating the sheet-like element of the kit of claim 1 comprising the steps of A) mixing the base with the water to obtain an aqueous alkaline component comprising the base and the water, and B) applying the aqueous alkaline component onto at least a part of the surface of the coating layer, wherein the alkaline component is added in an amount such that the base is added in an amount of at least 0.01 molar equivalents, based on the molar amount of the oxygen scavenger, and/or the alkaline component is added in an amount from 10 to 70 wt.-%, based on the total weight of the coating layer, and/or application step B) is performed by inkjet printing, spraying, coating, and/or dripping.

18. The kit of claim 1, further comprising a supply device comprising the sheet-like element component, or a food packaging comprising the sheet-like element component, wherein the coating layer is present within the food packaging.

19. A supply device comprising the activated sheet-like element of claim 12, wherein the supply device protects the activated sheet-like element from oxygen.

20. A food packaging comprising the activated sheet-like element of claim 12, wherein the coating layer is present within the food packaging.

21. A food packing according to claim 20, wherein the food packing comprises a food or foodstuff, wherein the food is selected from the group consisting of liquid and solid food, including raw and processed meat, poultry, beef, pork, ham, sausage, dried meat, raw and processed fish, dairy products, bakery products, snacks, nuts and oil seeds, vegetables; sweets, ready-to-eat foods and beverages.

22. A packaged food comprising a food and a food packaging having an activated sheet-like element of claim 12, wherein the coating layer of the activated sheet-like element is present within the food packaging.

23. A packaged food according to claim 22, wherein the food is selected from the group consisting of liquid and solid food, including raw and processed meat, poultry, beef, pork, ham, sausage, dried meat, raw and processed fish, dairy products, bakery products, snacks, nuts and oil seeds, vegetables; sweets, ready-to-eat foods and beverages.

24. The kit of claim 1, wherein the coating layer has a fluid receptivity in the range of 15 to 35 wt.-% based on the based on the total weight of the coating layer.

25. The process of claim 13, further comprising the step of:

(i) mixing the alkaline component of step h) with water to obtain an aqueous alkaline component comprising the base and water, wherein the pH of the aqueous alkaline component is at least 8 and the aqueous alkaline component comprises the base in an amount from 1 wt.-% to 75 wt.-% based on the total weight of the aqueous alkaline component.

* * * * *